US009692459B2

(12) United States Patent
Maltsev et al.

(10) Patent No.: US 9,692,459 B2
(45) Date of Patent: Jun. 27, 2017

(54) USING MULTIPLE FREQUENCY BANDS WITH BEAMFORMING ASSISTANCE IN A WIRELESS NETWORK

(71) Applicant: Intel Corporation, Santa Clara, CA (US)

(72) Inventors: Alexander Maltsev, Nizhny Novgorod (RU); Ali S. Sadri, San Diego, CA (US); Vadim Sergeyev, Nizhny Novgorod (RU); Alexei Davydov, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 51 days.

(21) Appl. No.: 13/687,214

(22) Filed: Nov. 28, 2012

(65) Prior Publication Data

US 2014/0148107 A1   May 29, 2014

(51) Int. Cl.
| *H04B 15/00* | (2006.01) |
| *H04B 1/00* | (2006.01) |
| *H04B 17/00* | (2015.01) |
| *H04B 1/02* | (2006.01) |
| *H04B 7/06* | (2006.01) |
| *H04L 27/26* | (2006.01) |

(52) U.S. Cl.
CPC ............ *H04B 1/02* (2013.01); *H04B 7/0617* (2013.01); *H04L 27/2626* (2013.01)

(58) Field of Classification Search
CPC .... H04B 7/0408; H04B 7/0617; H04W 16/28
USPC ........ 455/101, 103, 104, 552.1, 553.1, 63.4, 455/562.1, 575.7, 67.11, 67.14
See application file for complete search history.

(56) References Cited

U.S. PATENT DOCUMENTS

| 5,907,816 | A | * | 5/1999 | Newman et al. ........... 455/562.1 |
| 6,208,299 | B1 | * | 3/2001 | Lindmark et al. ...... 343/700 MS |
| 6,856,284 | B1 | * | 2/2005 | Cangiani ....................... 342/372 |
| 7,623,868 | B2 | | 11/2009 | Judd |
| 7,893,862 | B2 | * | 2/2011 | Holly et al. ..................... 342/22 |
| 8,007,968 | B2 | * | 8/2011 | Yamada .............. H01L 21/0274 356/636 |
| 8,116,694 | B2 | * | 2/2012 | Kaaja et al. .................... 455/70 |
| 8,134,503 | B2 | | 3/2012 | Na |
| 8,526,528 | B2 | * | 9/2013 | Ravid et al. .................. 375/267 |
| 8,953,542 | B2 | * | 2/2015 | Kim ...................... H04L 5/0091 370/329 |
| 2004/0063468 | A1 | * | 4/2004 | Frank ............................ 455/561 |
| 2004/0077379 | A1 | * | 4/2004 | Smith et al. ............... 455/562.1 |
| 2006/0068719 | A1 | * | 3/2006 | Hairapetian .................... 455/69 |

(Continued)

FOREIGN PATENT DOCUMENTS

| JP | 2011145133 | 7/2011 |
| WO | 2012146313 | 11/2012 |

OTHER PUBLICATIONS

PCT International Search Report and Written Opinion issued in corresponding PCT/US2013/048029 dated Oct. 22, 2013, (10 pages).

(Continued)

*Primary Examiner* — Simon Nguyen
(74) *Attorney, Agent, or Firm* — Trop Pruner & Hu, P.C.

(57) ABSTRACT

A communication device communicates with other communication devices in a wireless network using a first and a second frequency band. In accordance with some embodiments, inter-band beamforming assistance may be provided by the lower frequency band.

30 Claims, 28 Drawing Sheets

(56) References Cited

U.S. PATENT DOCUMENTS

| | | | |
|---|---|---|---|
| 2010/0008317 A1 | 1/2010 | Bhattad | |
| 2010/0203890 A1 | 8/2010 | Nagaraja | |
| 2010/0279689 A1 | 11/2010 | Tinnakornsrisuphap | |
| 2010/0329206 A1 | 12/2010 | Thome | |
| 2010/0332822 A1* | 12/2010 | Liu ..................... | H04W 12/04 |
| | | | 713/151 |
| 2011/0116423 A1* | 5/2011 | Rousu et al. ................. | 370/297 |
| 2011/0261755 A1* | 10/2011 | Cordeiro ................ | H04L 5/001 |
| | | | 370/328 |
| 2012/0058772 A1* | 3/2012 | Kazmi ............... | H04W 72/048 |
| | | | 455/450 |
| 2012/0142288 A1* | 6/2012 | Hosoya et al. ................ | 455/84 |
| 2012/0220315 A1* | 8/2012 | Karttaavi et al. ............ | 455/457 |
| 2012/0243638 A1 | 9/2012 | Maltsev | |
| 2013/0057432 A1* | 3/2013 | Rajagopal et al. ........... | 342/368 |
| 2013/0077554 A1* | 3/2013 | Gauvreau et al. ............ | 370/312 |
| 2013/0116011 A1* | 5/2013 | Lee et al. ................... | 455/562.1 |
| 2013/0235807 A1* | 9/2013 | Lee et al. ...................... | 370/329 |
| 2013/0272217 A1* | 10/2013 | Negus et al. ................. | 370/329 |
| 2013/0286960 A1* | 10/2013 | Li et al. ........................ | 370/329 |

OTHER PUBLICATIONS

PCT International Search Report and Written Opinion issued in corresponding PCT/US2012/031169 dated Nov. 30, 2012 (9 pages).

\* cited by examiner

1. D = DCF INTER FRAME SPACE (DISF)
2. S = SHORT INTER FRAME SPACE (SIFS)
3. CW = CONTENTION WINDOW
4. MPDU = MAC PROTOCOL DATA UNIT
5. A = ACK

US 9,692,459 B2

USING MULTIPLE FREQUENCY BANDS WITH BEAMFORMING ASSISTANCE IN A WIRELESS NETWORK

BACKGROUND

Embodiments of the present disclosure relate to the field of data communication, more specifically, to data communication in a wireless network.

In the current state of wireless communication, an increasing number of communication devices are able to wirelessly communicate with each other. These communication devices include a variety of devices having many different form factors varying from personal computers, mobile or desktop, displays, storage devices, handheld devices, telephones, and so forth. A number of these communication devices are packaged as "purpose" devices, such as set-top boxes, personal digital assistants (PDAs), web tablets, pagers, text messengers, game devices, smart appliances, and wireless mobile phones. Such devices may communicate with each other in various different wireless environments such as wireless wide area networks (WWANs), wireless metropolitan area networks (WMANs), wireless local area networks (WLANs), and wireless personal area networks (WPANs), Global System for Mobile Communications (GSM) networks, code division multiple access (CDMA), and so forth.

The growing demand for high throughput applications such as video streaming, real-time collaboration, video content download, and the like, imposes stringent requirements on wireless communications to provide better, faster, and lower cost communications systems. In recent years, unlicensed frequency bands such as 2.4 GHz (Industrial, Scientific, Medical (ISM)) and 5.0 GHz (Universal National Information Infrastructure (UNII)) bands have been utilized for communications up to few hundred Mbps. To achieve these bit rates, relatively complex modulation techniques such as multiple-input/multiple-output (MIMO) orthogonal frequency division multiplexing (OFDM) have been proposed to the Institute of Electrical and Electronics Engineers (IEEE). Due to the popularity of the ISM and UNII bands, these bands are becoming crowded, resulting in substantial interference for users of these bands.

In a fourth generation (4G) wireless standard, such as the Institute of Electrical and Electronics Engineers (IEEE) 802.16m, 802.16p, and the 3rd Generation Partnership Project (3GPP) Long Term Evolution (LTE) and LTE Advanced (LTE ADV) standards, multi-carrier operation may support larger bandwidths and meet International Mobile Telecommunications Advanced (IMT-ADV) specifications for system capacity.

To provide an interference limited Gbps communications, IEEE committees have recently begun looking at communications at higher frequencies such as frequency bands greater than 20 GHz. FIG. 1 shows the currently available unlicensed frequency bands in selected major industrialized countries/regions.

BRIEF DESCRIPTION OF THE DRAWINGS

Embodiments of the present disclosure will be readily understood by the following detailed description in conjunction with the accompanying drawings. To facilitate this description, like reference numerals designate like structural elements. Embodiments are illustrated by way of example and not by way of limitation in the figures of the accompanying drawings.

Some embodiments are described with respect to the following figures.

DETAILED DESCRIPTION

Figure 1:
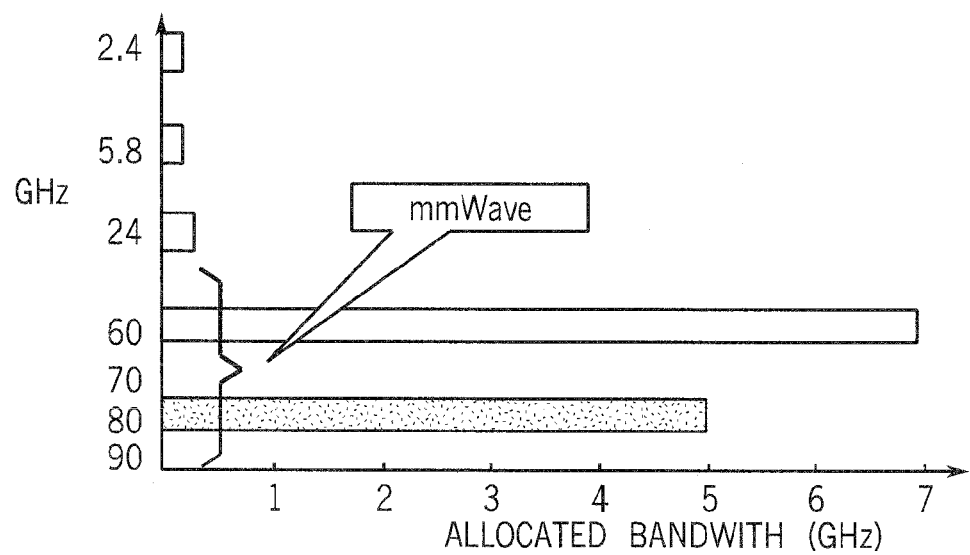
FIG. 1 illustrates currently available unlicensed frequency bands in selected major industrialized countries/regions.
Figure 1:
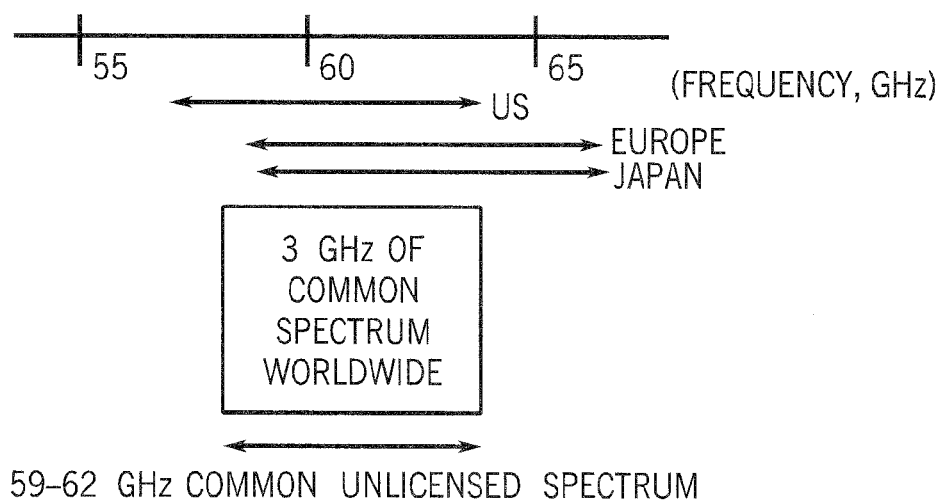

According to various embodiments of the present disclosure, methods and systems are provided in which a communication device communicates with other communication devices in a wireless network using a first and a second frequency band. For the embodiments, the first frequency band may be associated with a first beamwidth while the second frequency band may be associated with a second beamwidth, the first beamwidth being greater than the second beamwidth. In accordance with some embodiments inter-band beamforming assistance may be provided by the lower band.

Although the following description describes using two frequency bands, in alternative embodiments, more than two frequency bands may be employed.

In various embodiments, the first frequency band may be employed to communicate (i.e., transmit and/or receive) first signals to facilitate initial communication between the communication device and the other communication devices of the wireless network, including initial communication of first signals containing signals and/or control information for coarse configuration of the other communication devices to wirelessly communicate with the communication device. The subsequent communication of second signals between the devices may be transmitted using the second frequency band. The second signals further include signals and/or control information for finer configuration of the other communication devices to wirelessly communicate with the communication device.

In some embodiments, the first signals may be adapted for signal detection, initial beam forming, and/or initial carrier frequency offset (CFO) estimation, to facilitate subsequent communication using the second frequency band. The second signals communicated through the second frequency band may be adapted for more precise beam forming that supplements the initial beam forming and/or signals that are adapted for fine CFO estimation that may supplement the initial CFO estimation. The second signals may further facilitate timing synchronization of the other communication devices to the communication device. The second signals communicated using the second frequency band, as previously alluded to, may facilitate further communication using the second frequency band in order to facilitate the communication of third signals using the second frequency band. The third signals to be communicated using the second frequency band may include various types of data including, for example, data relating to video streaming, realtime and/or non-realtime collaboration, video content download, audio and text content download and/or upload, and so forth.

Various approaches may be used in various alternative embodiments in order to communicate via the first frequency band associated with the first beamwidth (herein "first frequency band") and the second frequency band associated with the second beamwidth (herein "second frequency band"). For example, in some embodiments, communication using the first frequency band may be as a result of using a relatively low frequency band such as those bands less than about 20 GHz while communication using the second frequency band may be as a result of using a higher frequency band such as those bands centered above about 20 GHz. Various antenna systems that may include various combinations of antennas and/or multi-element antennas may be employed in various alternative embodiments in order to communicate using the first and the second frequency bands.

The first frequency band may be a lower frequency band than the second frequency band. For these embodiments, the first frequency band may be the 2.4 GHz ISM band or the 5.0 GHz UNII band, or some other band less than about 20 GHz while the second frequency band may be a higher frequency band such as a band greater than about 20 GHz, including for example, the 24 GHz band, 28 to 31 GHz band, or a band centered in the 59 to 62 GHz spectra. Note that for purposes of this description, the process of communicating using the first lower frequency band may be referred to as out-of-band (OOB) communications and the process of communicating using the second higher frequency band may be referred to as in-band communications. Note further that other frequency bands may also be used as the first and second frequency bands in alternative embodiments and that the demarcation between the first lower frequency band and the second higher frequency band may not be at 20 GHz. In still other alternative embodiments, the first and the second frequency bands may be centered at the same frequencies but may be associated with different beamwidths by using, for example, antennas of different aperture sizes.

The first frequency band may be used by the communication device to communicate with the other communication devices of the wireless network, OOB control information signals or simply "first control signals" to facilitate data communication using the second frequency band. The first control signals may be comprised of "signals" and/or "control information" to facilitate initial or coarse beamforming. CFO estimation, timing synchronization, and so forth, of the device or the other communication devices. In some embodiments, the communication device may use the second frequency band to transmit and/or receive to and/or from the other communication devices of the wireless network, in-band control information signals or simply "second control signals" to further facilitate data communication using the second frequency band. The second control signals may be comprised of signals and control information to facilitate fine beamforming. CFO estimation, timing synchronization, and so forth, of the communication device or the other communication devices. The subsequent data or data signals to be communicated (i.e., transmitted and/or received) using the second frequency band may include signals for tracking of the beamforming. CFO, timing, and so forth, as well as various types of data including, for example, data relating to video streaming, realtime and/or non-realtime collaboration, video content download, audio and text content download and/or upload, and so forth.

In order to appreciate various aspects of embodiments described herein, the characteristics of a frequency band associated with a relative broad beamwidth and the characteristics of a frequency band associated with a relatively narrow beamwidth will now be discussed. This discussion will also describe the characteristics of various types of antennas including, for example, omnidirectional and directional antennas. In addition, a discussion relating to the impact of using a lower as opposed to a higher frequency band will also be provided.

A beamwidth is a spatial characteristic typically associated with antennas or dishes. The beamwidth of an antenna may be determined by the ratio of the antenna aperture size to the wavelength of the signals to be transmitted (or received). That is, the greater the aperture size, the narrower the beamwidth if the wavelengths of the signals to be transmitted (or received) are held constant. Alternatively, the beamwidth may also be made narrower by transmitting (or receiving) signals of shorter wavelengths (i.e., higher frequency) while maintaining a constant aperture size. Thus when an antenna or antennas having similar sized apertures transmit signals of different frequency bands, different beamwidths may result. Note that although the above discussion relates to, among other things, the relationship between aperture size and beamwidth, multi-element antennas may be employed to selectively control the beamwidth of the signals to be transmitted, in which case aperture size may not be relevant as to beamwidth of the signals to be transmitted. That is, antenna systems may be employed that have multi-element antennas that may be adaptively configured to selectively transmit (or receive) signals associated with different beamwidths.

Thus, in order to obtain a relatively broad beamwidth, one approach is to use an antenna having a small aperture, such as an omnidirectional antenna, instead of or in addition to using a relatively low frequency band (e.g., ISM or UNII bands). In contrast, in order to obtain a narrower beamwidth, one approach is to use an antenna having a large aperture, such as a directional antenna, instead of or in addition to using a relatively high frequency band. Of course, alternatively, a single antenna may provide varying beamwidths simply by varying the frequency bands (i.e., either higher or lower frequency bands) of the signals to be transmitted and/or received. In still other alternative approaches, and as previously alluded to, multi-element antennas may be employed to provide frequency bands with varying beamwidths. That is, a single set of multi-element antennas may be adaptively controlled using, for example, special procedures or protocols to provide specific beam directions and specific beam shapes. Thus, a single set of multi-element antennas may be employed to provide multiple frequency bands of varying beamwidths. Note that in the following description, the phrase "antenna" may refer to a single antenna or multi-element antennas.

Referring now to comparing the beamwidths of various frequency bands using antennas with about the same aperture size. As previously alluded to, one of the properties of using a lower frequency band such as the 2.4 GHz (ISM) band or the 5.0 GHz (UNII) band instead of a higher frequency band such as an in-band frequency band (e.g., bands greater than 20 GHz) for communicating in a, for example, wireless network is that the lower frequency bands may be associated with a greater beamwidth. Because of the greater beamwidth, signals transmitted via the lower frequency bands will likely reach more devices in the wireless network. However, because of the greater beamwidth, the drawback in using a lower frequency band is that because of the broader wedge, there is a greater risk of interference and interception.

Figure 2:
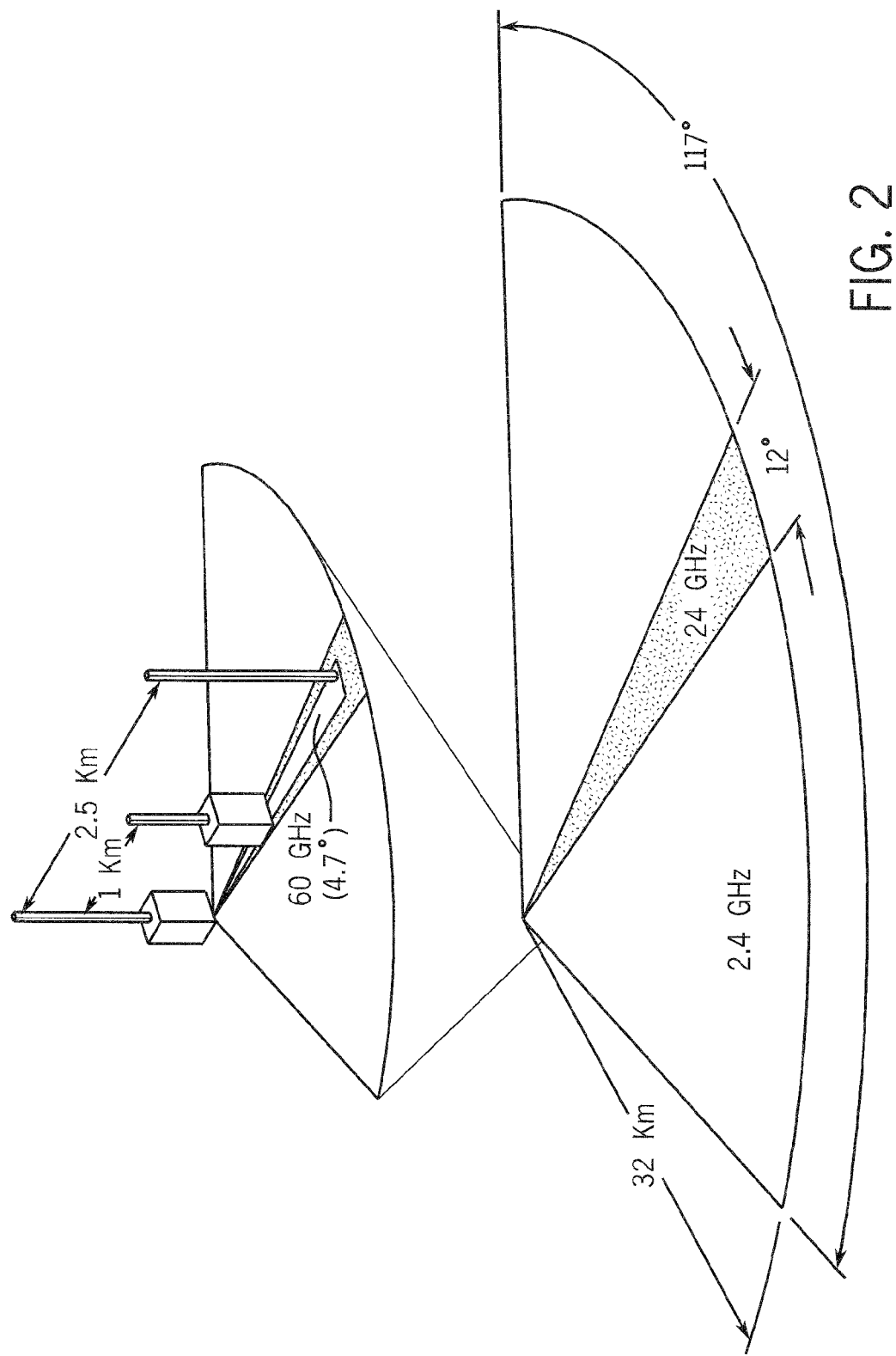
FIG. 2 illustrates exemplary beamwidths of different frequency bands using antennae with about the same aperture size.

In contrast to the lower frequency bands, when higher frequency bands are used for communicating in a wireless network a narrower beamwidth may result as previously described. As a result, there may be less likelihood of interference. In addition to the narrower beamwidth, another property of a higher frequency band is that if a higher frequency band (such as the 24 or the 60 GHz band) is used then there may be an additional attenuation with distance due to, for example, oxygen absorption. That is, and as depicted in FIG. 2, a higher frequency band (e.g., 60 GHz band) may have a smaller beamwidth and a shorter "range" or "reach" than a lower frequency band (e.g., 2.4 or 5.0 GHz bands). Thus, devices operating in the 60 GHz band instead of a lower band such as the 2.4 or 5.0 GHz bands may typically have less interference risk from other remote devices.

Another characteristic of using a higher frequency band for communicating in a wireless network is that the higher frequency band may allow higher signal bandwidth to be used (as more spectra is typically available at higher frequencies) which may consequently allow greater data throughput. At the same time, using the larger bandwidth may decrease the power spectral density of the transmit signal and potentially decrease the reliable communication range due to less signal-to-noise ratio at the receiver side.

The use of higher frequency bands for communicating in a wireless network may mean that a directional antenna rather than an omnidirectional antenna may be used for such communication. The use of such an antenna by itself may offer certain advantages and disadvantages when used to communicate in a wireless network. For example, one advantage of using a directional antenna and the higher frequency band for transmitting signals is that less power may be needed in comparison to using an omnidirectional antenna to achieve the same level of received power. Thus, less efficient (and less expensive) radio frequency (RF) components may be used with the directional antenna, which may be a significant factor in some situations as costs of RF parts may be significantly higher for higher frequency communication.

Of course, there may be certain drawbacks when communicating in a wireless network using a higher frequency band with a directional antenna. For example, adapted or multiple fixed antenna setting that spans 360 degrees may be needed in order to register all of the communication devices in the network. This may be very time-consuming and synchronizing the communication device in the network using, for example, protocols such as carrier sense multiple access and collision avoidance (CSMA/CA) or carrier sense multiple access and collision detection (CSMA/CD) may be very difficult and may not be feasible when a higher frequency band using a directional antenna is employed.

In accordance with various embodiments, the characteristics of frequency bands associated with different beamwidths as described above may be combined and used in a wireless communication network in accordance with various embodiments as described below.

Figure 3:
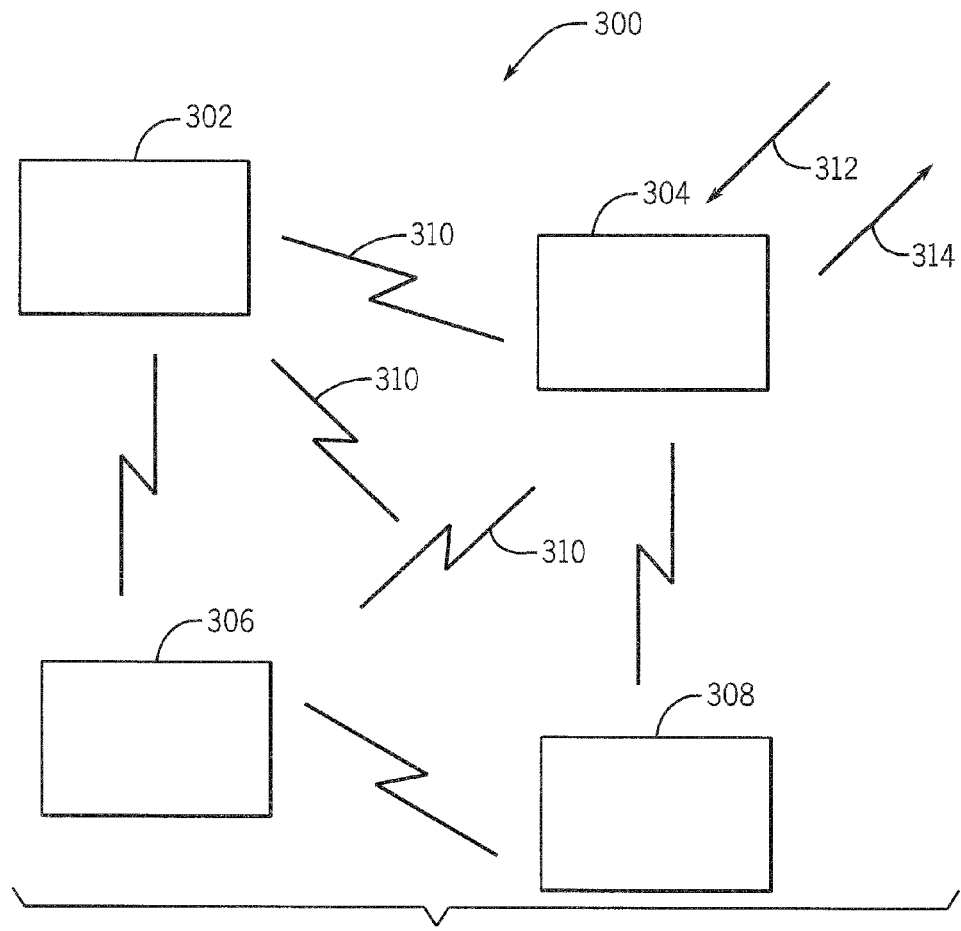
FIG. 3 illustrates a wireless network in accordance with various embodiments.

FIG. 3 illustrates a wireless network that includes multiple communication devices (CDs) that are in communication with each other via multiple communication links in accordance with various embodiments. For the embodiments, the network 300 may be WWAN, WMAN, WLAN, WPAN, or other types of wireless networks. The communication devices (CDs) 302-308 may be desktop computers, laptop computers, set-top boxes, personal digital assistants (PDAs), web tablets, pagers, text messengers, game devices, smart appliances, wireless mobile phones or any other types of computing or communication devices. In some embodiments, at least one of the CDs 302-308 may be a master or an access point, while the other CDs may be the client or slave devices. Note that in alternative embodiments, the network 300 may include more or fewer CDs. Each of the CDs 302-308 may communicate with the other CDs of the network 300 via links 310 that may be bidirectional. Communication between the CDs may be in accordance with standards such as 802.11a, 802.11b, and other derivatives of these standards as well as WiMAX, and 3GPP LTE-Advanced technologies.

For ease of understanding, embodiments of the present disclosure will be further described assuming that the network 300 is a WPAN and that CD 302 is the access point and that the other CDs 304-308 are the client devices. Note that in alternative embodiments, the network 300 may not include an access point. For example, the network 300 may be an ad-hoc mesh network in alternative embodiments, in which case, the access point is not needed. Returning to FIG. 3, in some embodiments, at least some of the client CDs 304-308 may arbitrarily and randomly join and/or leave the network 300. Each time a client CD 304-308 enters the network 300, it may authenticate or associate (herein "associate") with the network 300 so that the various client CDs of the network 300 may "know" that the client CD is present in the network 300. In some embodiments, a client CD 304-308 may associate with the network 300 by associating with the access point CD 302. Note that in this illustration, client CD 304 has just entered the network 300 as indicated by reference 312.

The CD 304 upon entering the network 300 may associate itself with the network (e.g., via access point CD 302). In accordance with various embodiments, association with the network 300 may be accomplished using, for example, a first frequency band associated with a relatively broad beamwidth. By transmitting the association signals using a frequency band associated with a relatively broad beamwidth (herein "first beamwidth"), the other CDs 302, 306, and 308 in the network 300 may be more likely to receive the authentication signals (e.g., beacons) from CD 304. In some embodiments, the first frequency band may be a 2.4 GHz (ISM), a 5.0 GHz (UNII), or other bands that may be less than, for example, 20 GHz. Note that the access point CD 302 may listen for (i.e., authentication or association) an entering CD 304 through signals transmitted in the first frequency band. After successfully registering or associating with the network 300 (which may be effectuated via any one of a number of association and/or authentication protocols), the components of CD 304 may then "sleep" until it receives data transmission from one of the other CDs in the network or is ready to transmit data to the network 300 (i.e., to one or more of the other CDs in the network 300).

When the client CD 304 is ready to transmit signals to one or more of the other CDs 302, 306, and 308 in the network 300 (including the access point CD 302), it may initially transmit first control signals that include control information using again the first frequency band associated with the first beamwidth. In using the first frequency band associated with the first beamwidth, the other CDs 302, 306, and 308 in the network 300 are more likely to "hear" or receive the signals transmitted by the client CD 304. This may provide the opportunity to reduce the interference in the second frequency band because the devices are now aware of intentions of the CD 304 and may therefore defer their transmission for the appropriate time period. In various embodiments, the other CDs 302, 306, and 308 may determine the signal parameters of the first control signals transmitted by the client CO 304. By measuring the signal parameters, the other CDs 302, 306, and 308 may determine the signal strength and the angle of arrival of the first control signals. As a result, the other CDs 302, 306, and 308 may be facilitated in determining the distance between the other CDs 302, 306, and 308, and the client CD 304.

Further, the location, at least in part of CD 304 relative to the other CDs (e.g., in terms of azimuth and elevation) may be determined by the other CDs 302, 306, and 308 based at least in part on the angle of arrival of the initial signals using the first frequency band. These determinations, in effect, may facilitate further communication using a second frequency band associated with a relatively narrow beamwidth. That is, the antenna systems employed by the other CDs 302, 306, and 308 may be properly configured and/or aligned based on the determinations to facilitate further communication using the second frequency band between the CDs 302, 306, and 308, and the client CD 304.

The first control signals transmitted through the first frequency band may facilitate initial communication between the CO 304 and the other CDs 302, 306, and 308 of the network 300; including signals and/or control information for coarse configuration by the other CDs 302, 306, and 308 to communicate with CD 304. The devices subsequently communicate using a second frequency band that is associated with a second beamwidth that may be a narrower beamwidth than the first beamwidth of the first frequency band. In some embodiments, the first control signals may include signals for medium access control (MAC) mechanism data such as data associated with CSMA/CA or CSMA/CD. Again, by using the first frequency band associated with the relatively broad beamwidth for communicating data, such as MAC mechanism data, each of the other CDs 302, 306, and 308 are more likely to receive the MAC mechanism data. The first control signals may further include signals as well as control information for initial beam forming parameters such as beam forming coefficients, synchronization parameters, initial CFO estimation, detection, and so forth. In particular, in some embodiments, the first control signals may be adapted to facilitate beam forming, CFO estimation, and/or synchronization of the other CDs 302, 306, and 308.

In some embodiments, where one or more of the CDs 302-304 employ antenna systems that include multi-element antennas, the first control signals transmitted using the first frequency band may include signals that facilitate different diversity techniques (e.g., antenna selection and maximum ratio combining), space-time codes (e.g., Alamouti code), and MIMO techniques.

The second frequency band may be a higher frequency band than the first frequency band. For example, the second frequency band may be an in-band band (i.e., greater than 20 GHz) such as the 24 GHz band or a frequency band in the 59-62 GHz spectra. The higher frequency bands, such as those greater than 20 GHz, may provide greater bandwidth than lower frequency bands (e.g., 2.4 GHz and 5.0 GHz). In various embodiments, communication using the second frequency band may be in accordance with a particular technique such as OFDM or other modulation techniques. Note that in some alternative embodiments, the first and the second frequency bands may be substantially the same frequency bands but may be associated with different beamwidth by using, for example, antennas of different aperture sizes or using an antenna system that employs multi-element antennas. Further note that if CD 304 is unable to communicate using the second frequency band, then CD 304 may operate in a fall-back operation mode in which communication is entirely via first frequency band at least until the second frequency band is made available. Such a fall-back mode may be needed, for instance, if the transmitting and receiving devices cannot "see" each other using the second frequency band.

After the first control signal has been transmitted using the first frequency band to facilitate communication, second control signals may be transmitted using the second frequency band to further establish communication. The second control signals may include signals and/or control information to facilitate fine beam forming, fine CFO estimation, synchronization, and so forth, by the other CDs 302, 306, and 308. Once further communication using the second frequency band has been established, signals for tracking of beam forming, CFO, timing, and so forth, as well as signals that include data such as video streaming, real-time collaboration, video content download, and the like may be communicated using the second frequency band.

When client CD 304 is to leave the network 300 as indicated by reference 314, the client CD 304 may exchange various exit information or parameters with the network 300 (e.g., access point CD 302) prior to exiting the network 300. Upon exiting the network 300, CD 304 may transmit exit information through the first frequency band. The exit information may include the reason code such as bad signal quality, or just does not want to communicate any more (the application has closed), or was not authorized to enter the network, and so forth.

Figure 4:
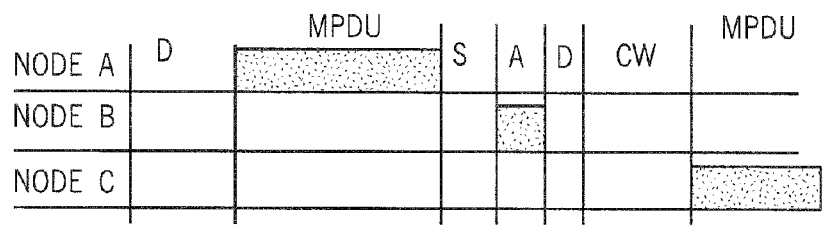
FIG. 4 illustrates various types of CSMA/CA protocol data that may be transmitted and/or received using a first and a second frequency bands in accordance with various embodiments.

FIG. 4 illustrates some types of CSMA/CA data that may be communicated via a first and a second frequency band in a wireless network in accordance with various embodiments. In particular, FIG. 4 shows three nodes A, B, and C communicating with each other in accordance with the CSMA/CA protocol. The first frequency band is associated with a first beamwidth and the second frequency band is associated with a second beamwidth, and the first beamwidth is wider or larger than the second beamwidth. For the embodiments, the Distributed Coordination Function (DCF) Inter Frame Space (DIFS), the Short Inter Frame Space (SIFS), and the Contention Window (CW) may be facilitated using the first and the second frequency band, while the MAC Protocol Data Unit (MPDU) and the Acknowledge (Ack) may be communicated using the first and/or the second frequency bands.

Figure 5:
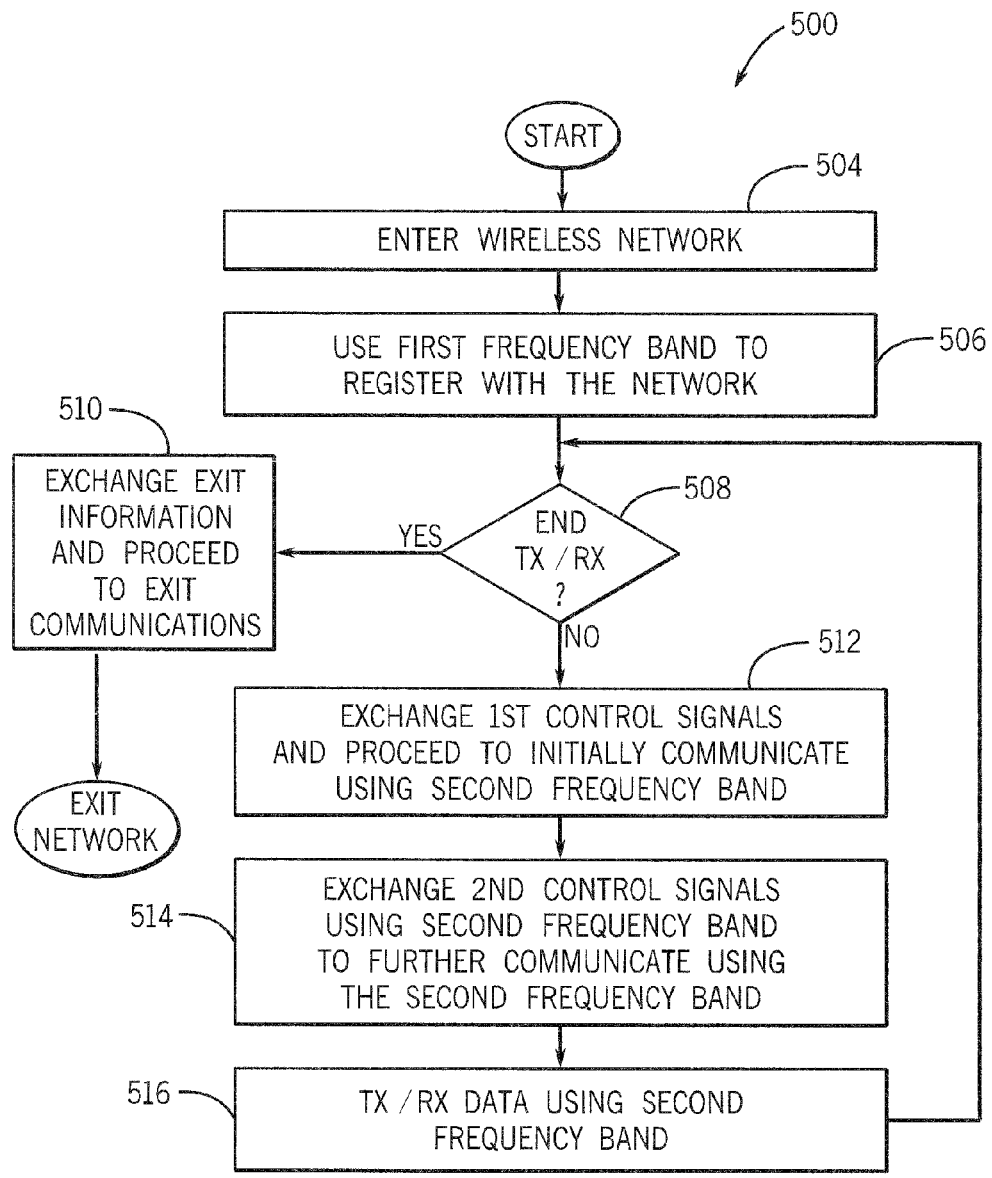
FIG. 5 illustrates a process for communicating by a communication device in a wireless network in accordance with various embodiments.

FIG. 5 illustrates a process for communication between devices of a wireless network using a first and a second frequency band, where the first frequency band has a first beamwidth that is broader than a second beamwidth associated with the second frequency band. The process 500 may be practiced by various communication devices and may begin with a communication device entering the network at 504. After entering the network, the communication device may use a first frequency band (e.g., 2.4 GHz ISM band or 5.0 GHz UNII band) associated with a first beamwidth to register with the network at 506. If the communication device has finished communicating (e.g., transmitting and/or receiving) at 508 then that device may exchange exit information with the network and proceed to exit the network at 510.

On the other hand, if the communication device is not yet finished communicating with the network (i.e., one or more communication devices of the network) at 508, then the communication device may exchange control signals with other devices using the first frequency band, and then communicate with the other devices using a second frequency band associated with a second beamwidth at 512. Note that the term "exchange" as used herein may be a bidirectional or a unidirectional exchange of signals. The second frequency band may then be used to communicate second control signals having signals and/or control information that facilitate further communication using the second frequency band at 514. The second control signals may include, for example, signals and/or control information for fine beam forming, fine CFO estimation, and/or synchronization, that may supplement the first control signals that were exchanged using the first frequency band in order to further establish communication using the second frequency band. Once communication has been further established using the second frequency band, signals carrying various data may be exchanged at 516. After the communication device has finished communicating with the devices of the network using the second frequency band, the process 500 may repeat itself by returning to 508.

Figure 6:
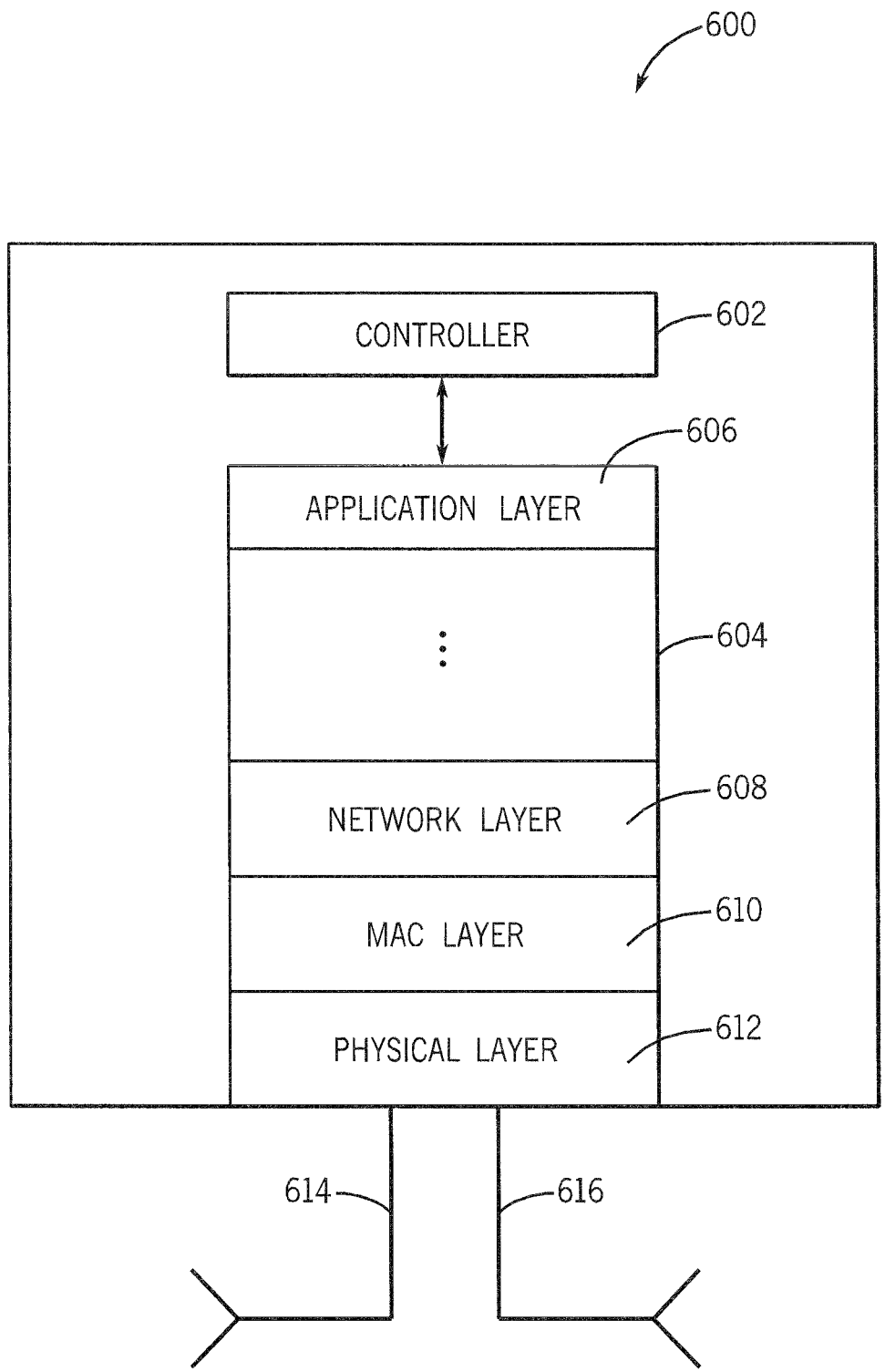
FIG. 6 illustrates a communication device in accordance with various embodiments.

FIG. 6 depicts portions of a communication device (CD) 600 that includes a protocol stack 604 having a number of layers including an application layer 606, a network layer 608, a medium access control (MAC) layer 610, and a physical (PHY) layer 612. The CD 600 may further include a controller 602 such as a processor or microcontroller to coordinate the activities of various components associated with the various layers of the CD 600. The components of PHY layer 612 may be coupled to two antennae 614 and 616. In some embodiments, one antenna 614 may be an omnidirectional antenna while the other antenna 616 may be a directional antenna. For these embodiments, the omnidirectional antenna may be adapted to transmit and/or receive signals of a first frequency band associated with a first beamwidth while the directional antenna may be adapted to transmit and/or receive signals of a second frequency band associated with a second beamwidth. Again, the first beamwidth may be greater than the second beamwidth. In some embodiments, the first frequency band may be a lower frequency band than the second frequency band. In alternative embodiments, only a single antenna may be coupled to the PHY layer 612. In still other alternative embodiments, the PHY layer 612 may include or may be coupled to an antenna system that may employ, for example, one or more multi-element antennas to transmit and/or receive signals using the first and the second frequency bands associated with the first and the second beamwidths, respectively.

Various embodiments described herein may be practiced by the components of the MAC and PHY layers 610 and 612 of the CD 600 (hereinafter, simply MAC and PHY layers). PHY layer 612 may be adapted to transmit and/or receive first signals (i.e., first control signals) using a first frequency band to facilitate establishment of initial communication using a second frequency band. The PHY layer 612 may be further adapted to transmit and/or receive second signals (i.e., second control signals) using the second frequency band to facilitate further communication using the second frequency band to communicate third signals carrying data. The MAC layer 610, in contrast, may be adapted to select the first or the second frequency bands to be used by the PHY layer 612 to transmit and/or receive the first, the second and/or the third signals.

The omnidirectional antenna 614 may be used to transmit and/or receive the first signals via the first frequency band to facilitate initial communication between the CD 600 and other CDs of a wireless network using the second frequency band. In contrast, the directional antenna 616 may be used to transmit and/or receive the second and third signals using the second frequency band, the communication using the directional antenna 616 at least in part being initially established via the first signal transmitted and/or received using the omnidirectional antenna 614. In order to practice the various functions described above for CD 600 as well as the functions described previously, the CD 600 may include a physical storage medium adapted to store instructions that enables the CD 600 to perform the previously described functions.

Figure 7:
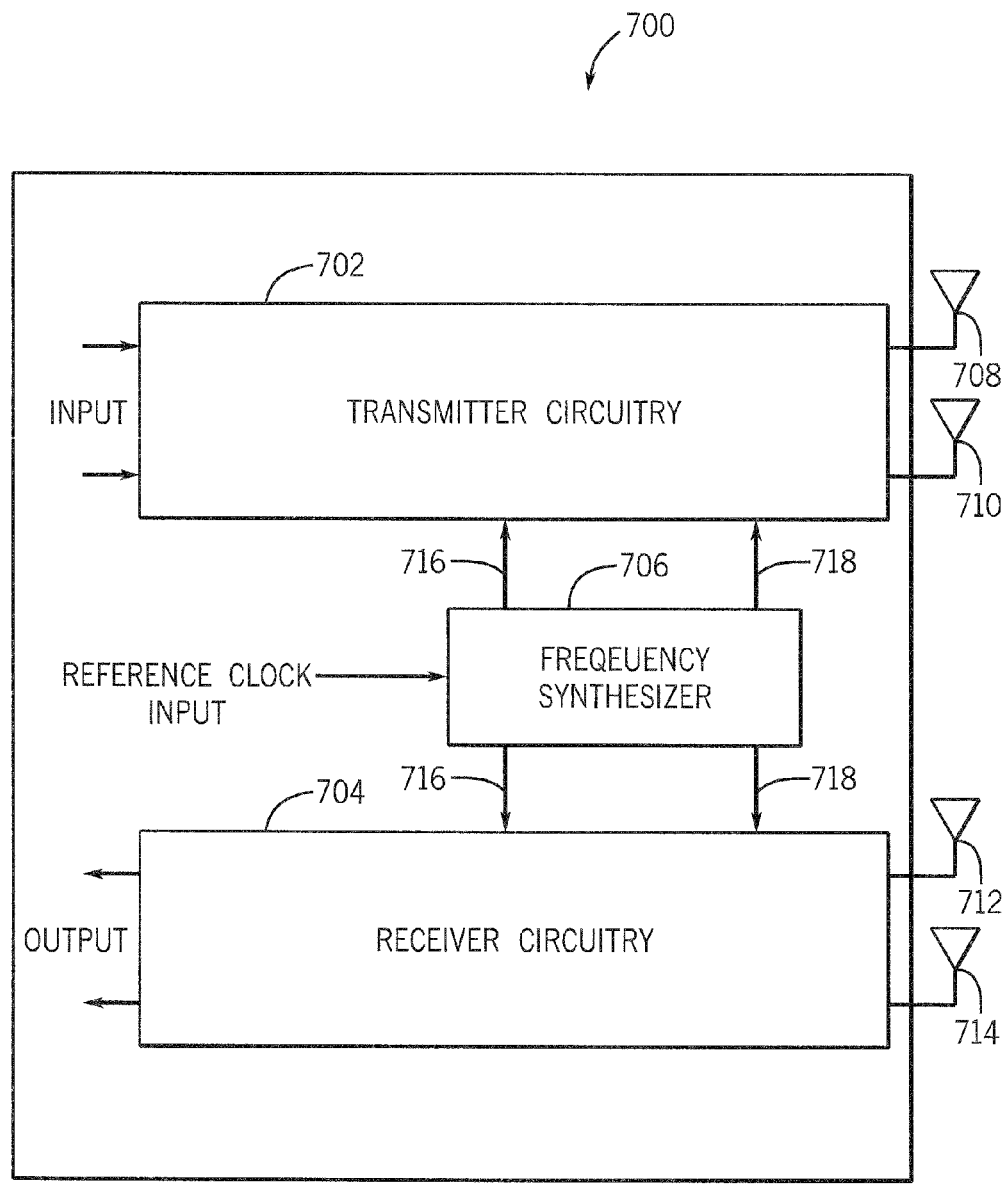
FIG. 7 illustrates a circuitry for transmitting and receiving signals using two frequency bands in accordance with various embodiments.

FIG. 7 illustrates a circuitry for transmitting and/or receiving signals using a first and a second frequency band in accordance with various embodiments. The circuitry 700 may operate in a wireless network environment and may include, among other things, transmitter circuitry 702, receiver circuitry 704, frequency synthesizer 706, and antennae 708-714. Note that in alternative embodiments, the circuitry 700 may employ any number of antennas. Note further that the term "antennae" and "antennas" as used herein are synonymous.

In various embodiments, the circuitry 700 may operate in an Orthogonal Frequency Multiple Access (OFMA) environment. The circuitry 700 may include zero intermediate frequency (ZIF) circuitry, super heterodyne circuitry, direct conversion circuitry, or other types of circuitry. In some embodiments, the circuitry 700 may be one of the circuitries as disclosed in U.S. patent application Ser. No. 11/394,600, entitled "Systems For Communicating Using Multiple Frequency Bands In A Wireless Network."

The frequency synthesizer 706, in some embodiments, may be a frequency synthesizer that provides both a first lower modulation frequency signal 716 and a second higher modulation frequency signal 718, such as a 2.4/60 GHz frequency synthesizer, to the transmitter and receiver circuitries 702 and 704. The first and the second modulation frequency signals 716 and 718 may be used to modulate and/or demodulate signals to be transmitted or received using the first and the second frequency bands, respectively. The transmitter circuitry 702 may be coupled to a first antenna 708 that may be an omnidirectional antenna, and a second antenna 710 that may be a directional antenna. The receiver circuitry 704 may be coupled to a third antenna 712 that may be a directional antenna, and a fourth antenna 714 that may be an omnidirectional antenna.

In various embodiments, the relative CFO for circuitry 700 may be defined by the reference oscillator stability. Thus the same oscillator may be employed for both the OOB (e.g., first frequency band) and the in-band (e.g., second frequency band) operations. Accordingly, the absolute value of the CFO may be much higher for the in-band (second frequency band) operations.

The initial CFO estimation and compensation problem for such a system is solved using the OOB operations. For example, the frequency synthesizer 706 is designed in such a way that both the in-band frequency synthesis circuitry and OOB frequency synthesis circuitry use the same reference clock oscillator. In this case, the signals transmitted at both OOB frequency and in-band frequency may have the same relative (in ppm) CFOs. An initial estimation of the CFO at the receiving end may be done for the OOB signal, and after that, an estimate may be recalculated and used for the coarse frequency offset compensation at the in-band frequency. The entire system may also use OOB signaling for tracking of, for example, timing, carrier frequency offset and so forth.

Figure 8:
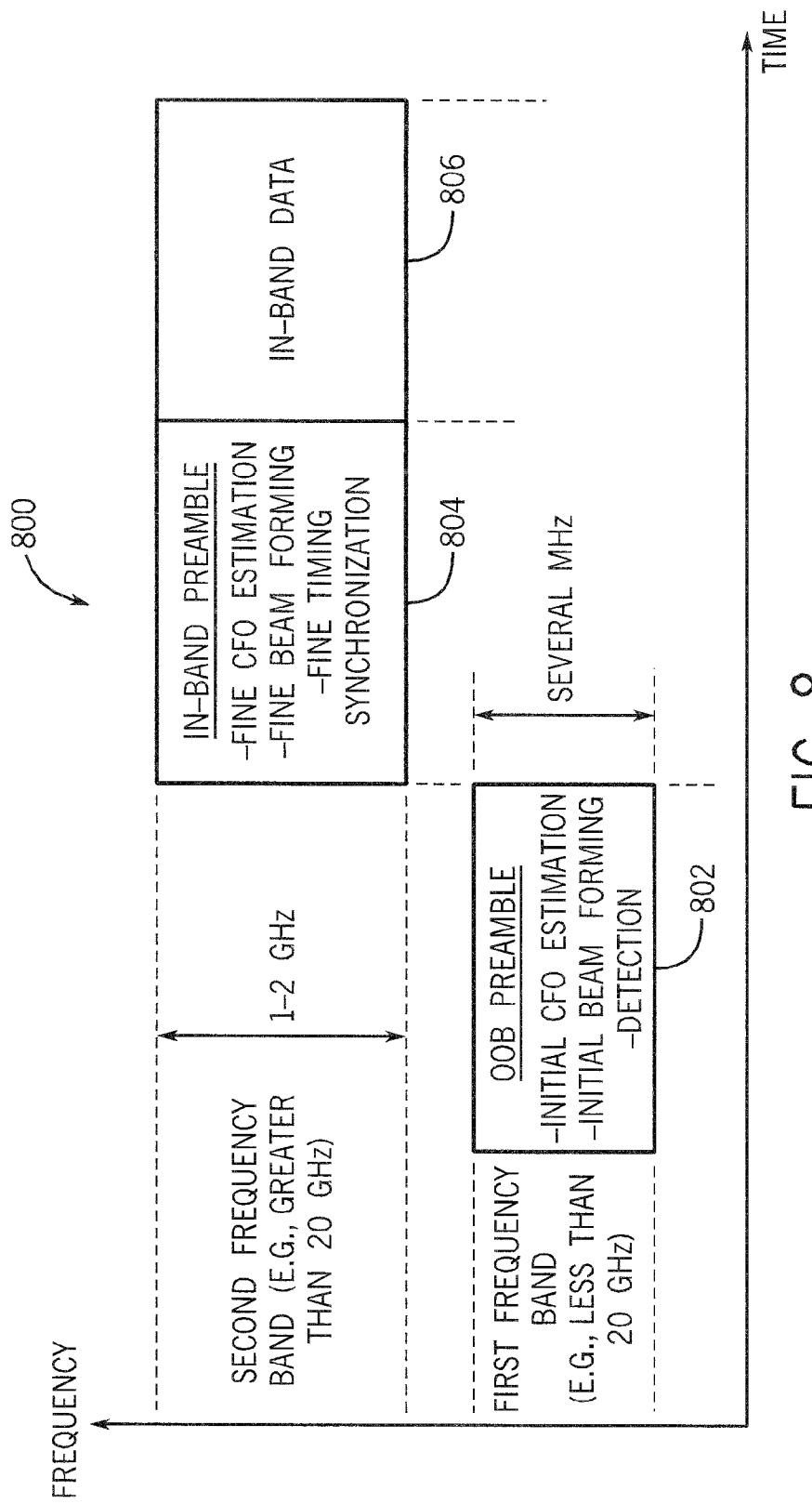
FIG. 8 illustrates a frame format in accordance with various embodiments.

FIG. 8 illustrates a frame format for communicating in a wireless network using a first and a second frequency band in accordance with various embodiments. Frame format 800 may represent the format of the signals to be transmitted and/or received by a communication device to and/or from another communication device of a wireless network. The first frequency band (i.e., out-of-band (OOB) frequency band) may be a lower frequency band such as a frequency band less than about 20 GHz while the second frequency band (i.e., in-band frequency band) may be a frequency band above about 20 GHz. Further note that because of the greater spectra available in the higher frequency bands, the second higher frequency band may have a bandwidth of about 1-2 GHz or more while the first lower frequency band may only have a bandwidth of several MHz.

The frame format 800 includes an OOB preamble 802 to be communicated via the first frequency band that may be embodied in signals adapted for signal detection, initial carrier frequency offset (CFO) estimation, and/or initial beam forming. Note that the term "preamble" as used herein is to be broadly interpreted and may mean any type of data packet or portion of a data packet. In some embodiments, the OOB preamble may include medium access control data such as data relating to CSMA/CA or CSMA/CD data.

The frame format 800 may further include an in-band preamble 804 and in-band data 806 to be communicated using the second frequency band. The in-band preamble 804 may be embodied in signals that are adapted for finer timing synchronization, finer CFO estimation, and/or finer beam forming. The signals for the in-band preamble 804 may supplement the control signals (e.g., initial CFO estimation, initial beam forming, and so forth) exchanged using the first frequency band. As a result, the in-band preamble 804 may further facilitate communication using the second frequency band in order to facilitate communication of the in-band data 806. Special field symbols may be placed after the OOB preamble 802 to provide encoded service information that may be needed for consequent data symbols and in-band packet decoding (e.g., modulation and coding scheme used, and so forth).

In order to appreciate certain aspects of the signals that embody the frame format 800, a more detailed explanation of CFO will now be provided. CFO is the difference between the carrier frequencies that the transmitter and the receiver are tuned at. Although CFO estimation may be more accurately determined when it is determined using the preamble (i.e., preamble signals) of a higher frequency band such as the in-band preamble 804, an initial CFO estimation may be initially determined using the OOB preamble 802 (i.e., OOB preamble signals) to partially determine the CFO prior to fine estimation of the CFO using the in-band preamble 804. As a result, by including signals for initial CFO estimation in the signals embodying the OOB preamble 802, the task of fine CFO estimation may be simplified.

The in-band preamble 804 (i.e., in-band preamble signals) may be adapted for fine CFO estimation, which may supplement the initial CFO estimation performed using the OOB preamble 802. The CFO is the frequency difference between the reference clock oscillator in the transmitting device and the reference clock oscillator in the receiving device. Since the reference oscillators determine the "time scales" of the transmitting device and the receiving device, the CFO may be determined by the product of the difference of the reference oscillator frequencies expressed in percent with respect to the absolute value of those frequencies, and the value of carrier frequency expressed in Hertz. CFO estimating schemes are typically more sensitive to the absolute value of the difference between the carrier frequencies of the receiver and the transmitter, noting that the greater the carrier frequency, the higher the achievable CFO values. Thus, improved accuracy may be obtained for CFO estimates when they are determined using preamble signals that are communicated using a higher frequency band such as an in-band frequency band.

The signals embodying the OOB preamble 802 may be adapted for initial beam forming. As used herein, initial beam forming refers to an initial process in beam forming calculations that may include preliminary estimation of angle of arrival of a signal wave front from a remote transmitting device. This operation may facilitate preliminary adjustments of the antenna system of the receiving device in order for the receiving device to receive the subsequent in-band preamble. This operation may also reduce the search interval for angle of arrival of the in-band signals. For example, initial beam forming may point to a sector where the remote transmitting device is operating. If the antenna of the receiving device has multiple substantially narrow sectors, than the initial beam forming may reduce the number of sectors to search for the subsequent in-band signals.

In order to supplement the initial beam forming, signals embodying the in-band preamble 804 may be adapted for fine beam forming. Fine beam forming may refer to the process of fine or precise antenna adjustment to improve the receiving quality of, for example, in-band signals (i.e., signals transmitted through second frequency band). Depending on the beam forming algorithm used, this may include choosing the optimal antenna or optimal sector within the antenna where the signal quality metrics are the best. Fine beam forming may also include calculations of complex coefficients (or only phase shift values) for combining the signals coming from different antennae or from different sectors within the sectored antenna.

The signals embodying the OOB preamble 802 may be adapted for signal detection. That is, the signals containing the OOB preamble 802 may be adapted to facilitate signal detection and to indicate to the receiving devices that the signals are "valid" signal. The signals containing the OOB preamble may be adapted to indicate to the receiving device or devices that it is a signal containing a "valid" message from a network communication device rather than just noise or interference. Currently, the Federal Communications Commission (FCC) allows greater power spectral density in the lower bands (e.g., 2.4 GHz and 5.0 GHz bands), and therefore, signal detection may be more easily performed in these lower bands because of the higher probability that "valid" signals will be properly detected when the lower bands are used.

The signals embodying the in-band preamble 804 may be adapted for fine timing synchronization. Fine timing synchronization may relate to a process that finds boundaries of informational symbols within a received signal. Since the signals of the in-band preamble 804 have greater spectrum bandwidth (relative to the OOB preamble signals), these signals may be designed to have, for example, better correlation properties than the signals embodying the OOB preamble 802. Therefore, by including fine timing synchronization signals with the signals embodying the in-band preamble 804, more precise timing estimation and therefore better synchronization may be obtained.

Once communication using the second frequency band has been fully established as a result of communicating the OOB preamble 802 and the in-band preamble 804, in-band data 806 may be communicated via the second frequency band as shown in FIG. 8. The in-band data 806 may include for example, video streaming, real-time collaboration, video content download, and so forth.

Figure 9:
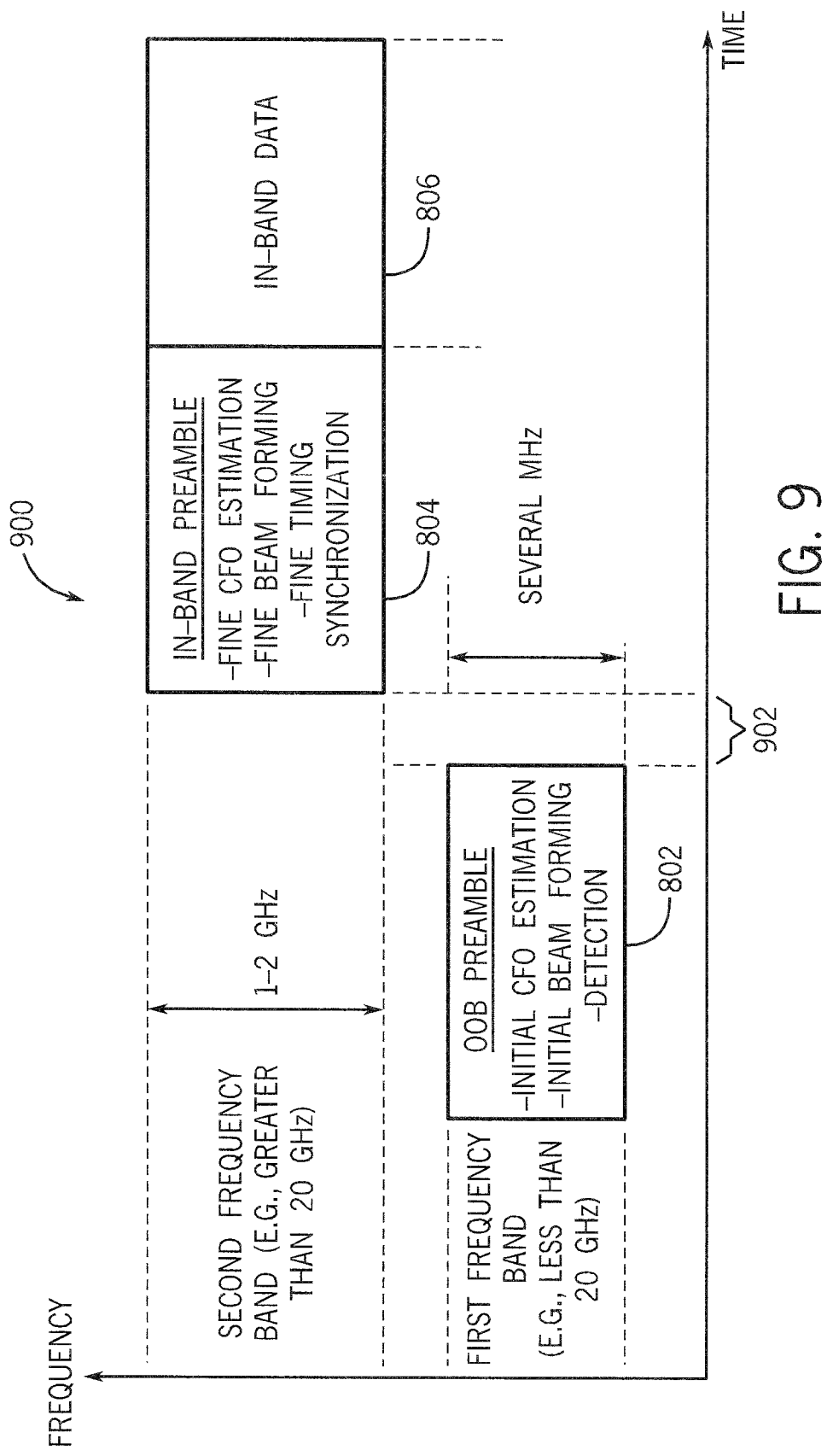
FIG. 9 illustrates another frame format in accordance with various embodiments.

FIG. 9 depicts frame format 900 that includes OOB preamble 802, in-band preamble 804, and in-band data 806, similar to the frame format 800 of FIG. 8, as shown. However, unlike the frame format 800 of FIG. 8, the frame format 900 includes a time gap 902. The time gap 902 separates the OOB preamble 802 and the higher-frequency part of the frame (e.g., in-band preamble 804) to allow the receiver circuitry of the receiving device to switch between the first and second frequency bands and to allow the subsequent relaxation processes in the circuitries, such as filters, to finish (see, for example, FIG. 7).

Figure 10:
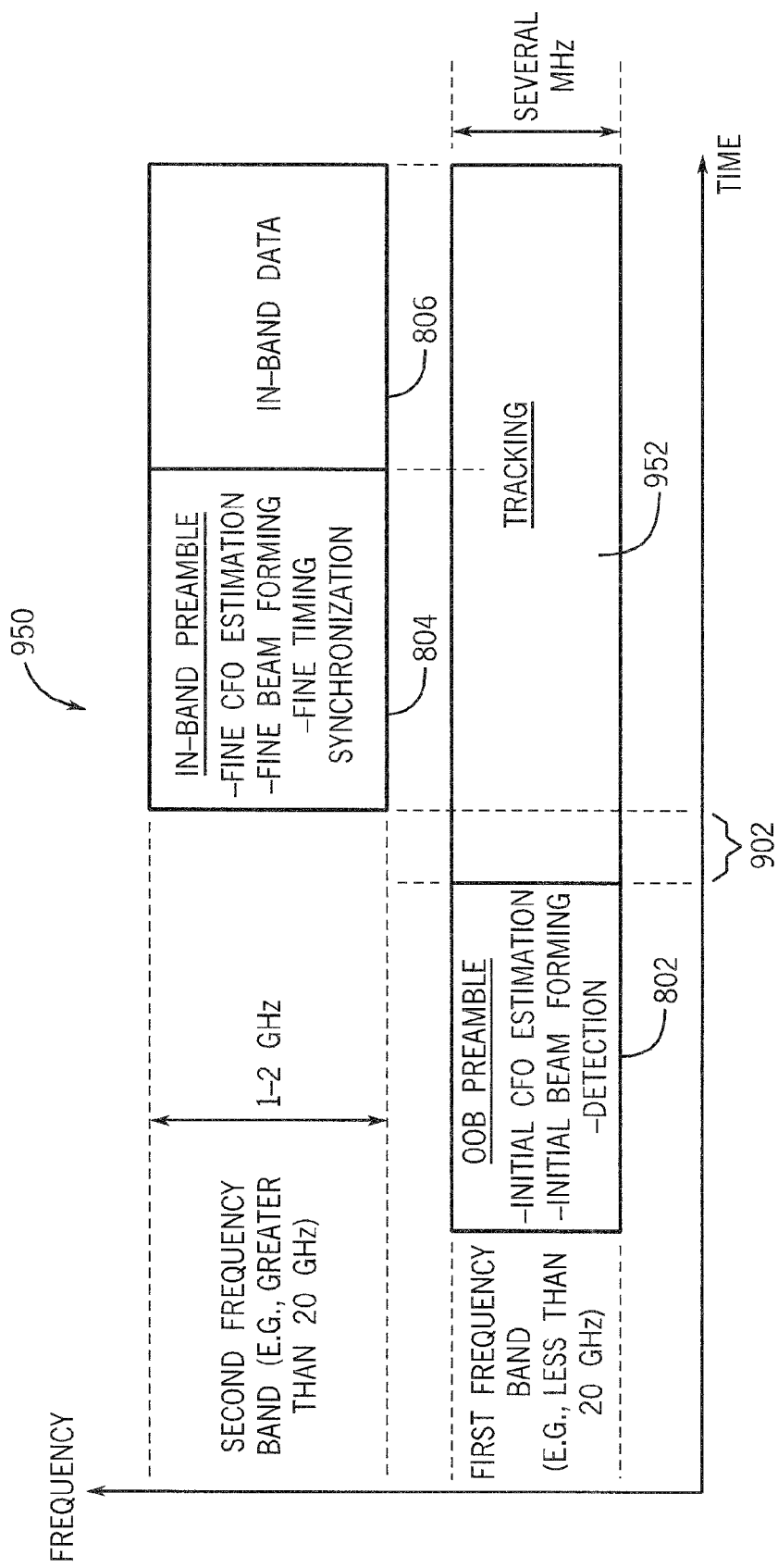
FIG. 10 illustrates yet another frame format in accordance with various embodiments.

FIG. 10 depicts still another frame format for communicating in a wireless network using a first and a second frequency band in accordance with various embodiments. The frame format 950 is similar to the frame format 900 of FIG. 9 except that the first frequency band may be used, after the time gap 902, for tracking and/or sending service information as indicated by reference 952. That is, the first frequency band may be used for tracking of beamforming, CFO, timing, and so forth, and/or for sending service information such as channel access signals. Note that in alternative embodiments, the time gap 902 may not be present. Further note that the OOB part of the frame format 950 may contain signals such as pilot or training signals.

The previous embodiments refer to "hard" coupled systems that communicate using a first and a second frequency band, wherein communication using the second frequency band is a result of the communication using the first frequency band. In other words, the hard coupled systems use the first frequency band to communicate signals (e.g., first control signals) to facilitate subsequent communication using the second frequency band.

In alternative embodiments, however, "soft" coupled systems are contemplated that may use two frequency bands independently so that signal transmission or reception using a first frequency band may overlap the signal transmission or reception by the same system using a second frequency band. For these embodiments, the first frequency band may be a lower frequency band such as those below 20 GHz (e.g., 2.4 GHz or 5.0 GHz bands) and the second frequency band may be a higher frequency band such as those above 20 GHz (e.g., in-band bands).

The soft coupled system may use the first lower frequency band for procedures that may not require a high data throughput rate such as network entry, bandwidth requests, bandwidth grants, scheduling the transmissions in a second higher frequency band, transferring feedback information that may comprise beam forming information and power control information, and so forth. In contrast, the second higher frequency band may be used for data transmission at relatively high data throughput rates.

Figure 11:
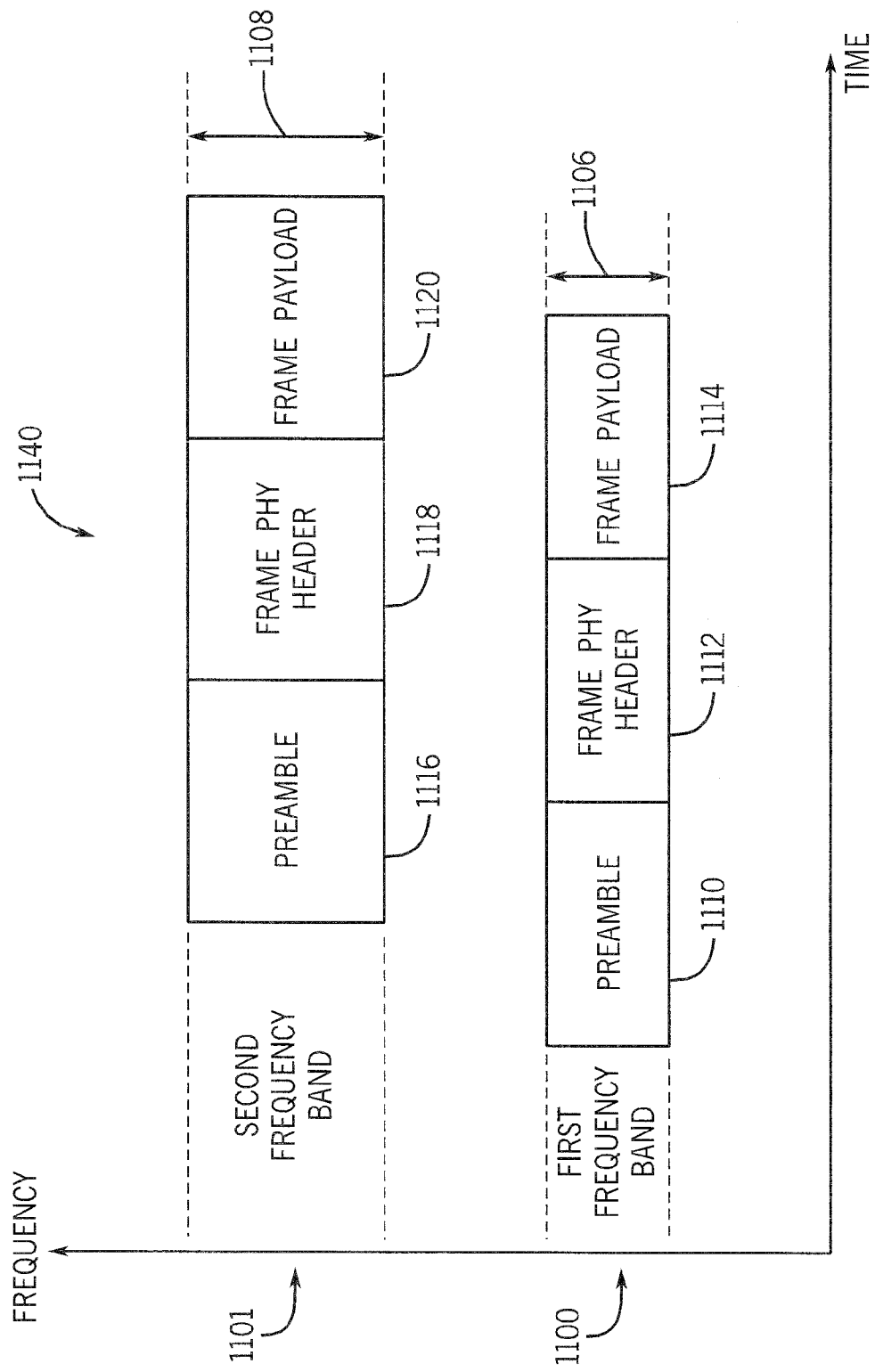
FIG. 11 illustrates two frame formats using two frequency bands of a soft coupled system adapted to communicate using the two frequency bands in accordance with various embodiments.

FIG. 11 depicts frame formats for both a first and a second frequency band for a soft coupled system. The first frame format 1102 is associated with a first frequency band 1100 while the second frame format 1104 is associated with a second frequency band 1101. The first frequency band 1100 may be a frequency band below 20 GHz while the second frequency band 1101 may be a frequency band above 20 GHz. The frame formats 1102 and 1104 may include respective preambles 1110 and 1116, frame PHY headers 1112 and 1118, and frame payloads 1114 and 1120. Each of the preambles 1110 and 1116 may be adapted for frame detection, timing and frequency synchronization, and so forth, similar to that of the hard coupled system previously described. However, unlike the hard coupled system, the preambles 1110 and 1116 of these frame formats 1102 and 1104 may be processed independently with respect to each other. The preambles of both frame formats 1102 and 1104 may be embodied in signals adapted for coarse and fine estimations of CFO, timing synchronization, beam forming, and so forth.

Both of the frame formats 1102 and 1104 may include PHY headers 1112 and 1118 to indicate at least the amount of data carried in their associated frame payloads 1114 and 1120. The PHY headers 1112 and 1118 may also indicate the modulation and/or coding type to be applied to the frame payloads 1114 and 1120, beam forming control information, power control information of the payload, and/or other parameters. The frame PHY headers 1112 and 1118 may be modulated and coded using, for example, a predetermined modulation and coding type, a predetermined beam forming, and a predetermined power control that may be applied to the PHY headers 1112 and 1118.

Both frame formats 1102 and 1104 may include a frame payload 1114 and 1120 to carry payload data. The frame payloads 1114 and 1120 of both frame formats 1102 and 1104 may include additional sub-headers to control the interpretation of the information within the payload, such as MAC layer headers that may indicate, for example, the source and/or destination addresses of the frame.

The frame payload 1114 of the first frame format 1102 may contain channel access control information such as bandwidth requests and grants. It may also contain special messages used for network entry, and test signals for measurement of distance between stations in the network, although these functionalities may be carried by the preamble 1110 in alternative embodiments. The first frame format 1102 may further include fields for sending feedback information from the destination of the packet back to its source, the feedback information relating to, for example, power control, rate control, beam forming control, for sending channel state information, receiver and/or transmitter performance indicators such as bit error ratio, current transmit power level, and so forth.

The frame payload 1120 of the second frame format 1104 may include information relating to higher network protocol layers.

The PHY headers 1112 and 1118 and/or the frame payloads 1114 and 1120 of both the first and the second frame formats 1102 and 1104 may include pilot signals for estimation and/or tracking of channel transfer functions, maintaining timing and/or frequency synchronization, and other service tasks.

Accessing of a wireless channel of a wireless network using the first frequency band 1100 may be based on contention between communication devices (e.g., stations) of the wireless network. Different techniques may be applied to resolve the collisions that may be possible due to contention. These techniques may include, for example, CSMA/CA, CSMA/CD, and so forth. Different division techniques may be used to reduce the number of collisions and include, for example, code division and frequency or time division of contention opportunities, and so forth. Accessing of the wireless channel using the first frequency band 1100 may include deterministic mechanisms provided that contention-based access takes place. Frame exchange sequences in the first frequency band 1100 may include special beacon frames transmitted periodically to facilitate the frame exchange in the first frequency band 1100. The transmission of frames in the first frequency band 1100 other than beacons may occur in substantially random moments of time.

In contrast to the above approaches for accessing a wireless channel using the first frequency band 1100, accessing of a wireless channel using the second frequency band 1101 may be deterministic and may be based on a schedule that may be derived as a result of communications using a lower frequency band (e.g., first frequency band 1100). This may allow for more effective use of the high-throughput channel in the higher second frequency band 1101 as a result of reducing the time overhead for channel access by reducing the overhead of the backing-off and retransmissions caused by collisions taking place when using, for example, random channel access methods.

The first frequency band 1100 may be a lower frequency band while the second frequency band 1101 may be a higher frequency band. The first frequency band 1100 may be associated with a first bandwidth 1106 while the second frequency band 1101 may be associated with a second bandwidth 1108, the second bandwidth 1108 being greater than the first bandwidth 1106. Selected types of payloads may be communicated via the first frequency band 1100 while other types of payloads may be communicated using the second frequency band 1101. For example, network control messages are typically short and comprised of few tens of bytes of data, while higher layer payload information may contain several thousand bytes or more. Therefore, network control messages may be communicated using the first frequency band 1100 while the second frequency band 1101 may be used in order to communicate the higher layer payload information.

Figure 12:
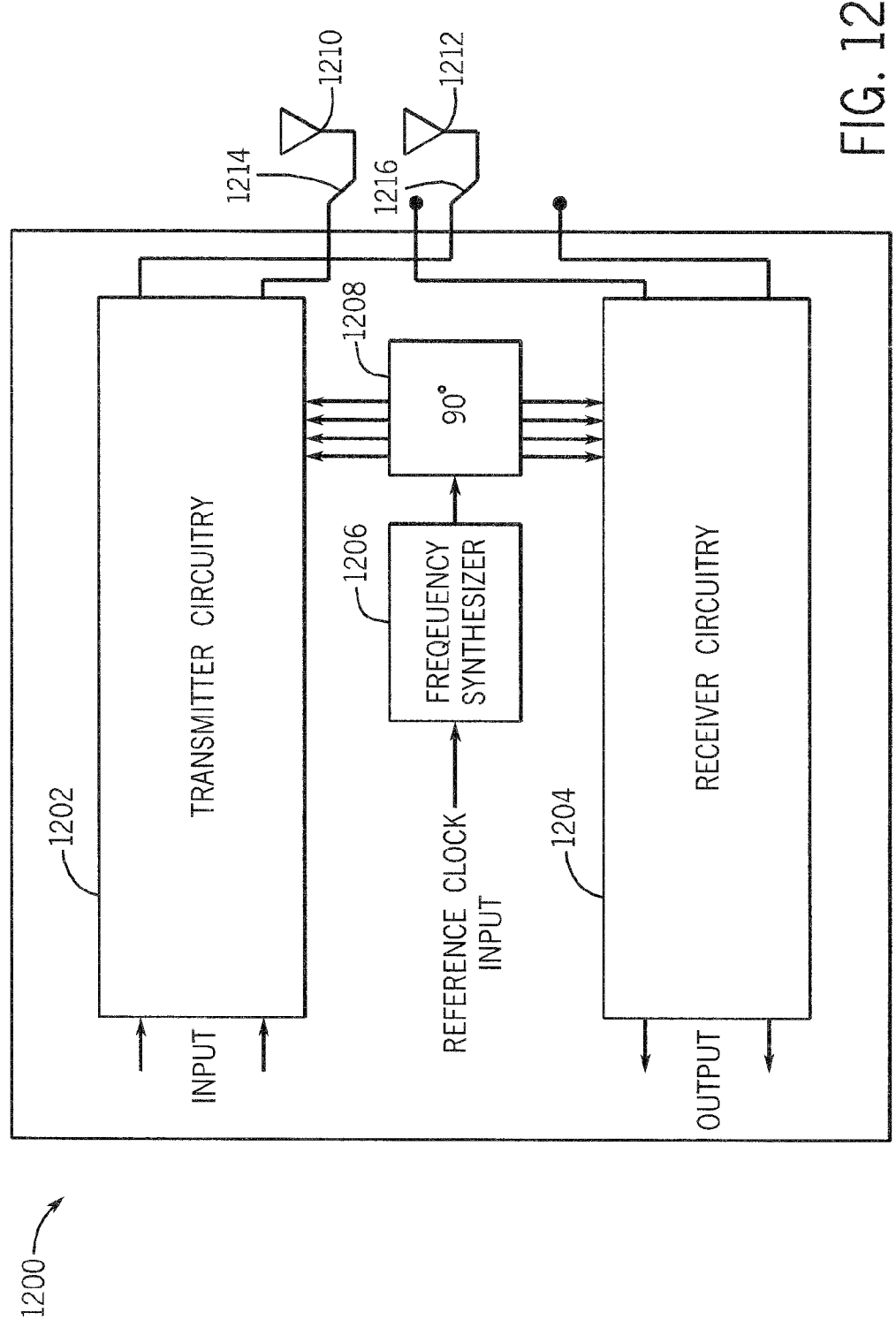
FIG. 12 illustrates a circuitry of a soft coupled system adapted to communicate using two frequency bands in accordance with various embodiments.

FIG. 12 illustrates a transmitter/receiver circuitry of a soft coupled system for independent dual-band communication. The circuitry 1200 may be comprised of a transmitter circuitry 1202 and a receiver circuitry 1204. The circuitry 1200 may be coupled to a MAC layer that may control various functionalities and may include, among other things, a frequency synthesizer 1206, a 90 degree phase splitter 1208, antennae 1210 and 1212, and switches 1214 and 1216. The frequency synthesizer 1206 may be a 2.4/5.0/60 GHz frequency synthesizer. As depicted, the transmitter and receiver circuitry 1202 and 1204 are coupled to the two antennae 1210 and 1212 via switches 1214 and 1216. In alternative embodiments, however, the transmitter and receiver circuitry 1202 and 1204 may be coupled to any number of antennas. In some embodiments, the first antenna 1210 and the second antenna 1212 may be adapted to transmit and/or receive a first and a second frequency band, respectively, wherein the first frequency band being a lower frequency band (e.g., UNII/ISM frequency bands) than the second frequency band (e.g., in-band bands). In various embodiments, switches 1214 and 1216 may be coupled to and controlled by the MAC layer to selectively communicate using, for example, an UNII/ISM frequency band and/or an in-band band.

Figure 13:
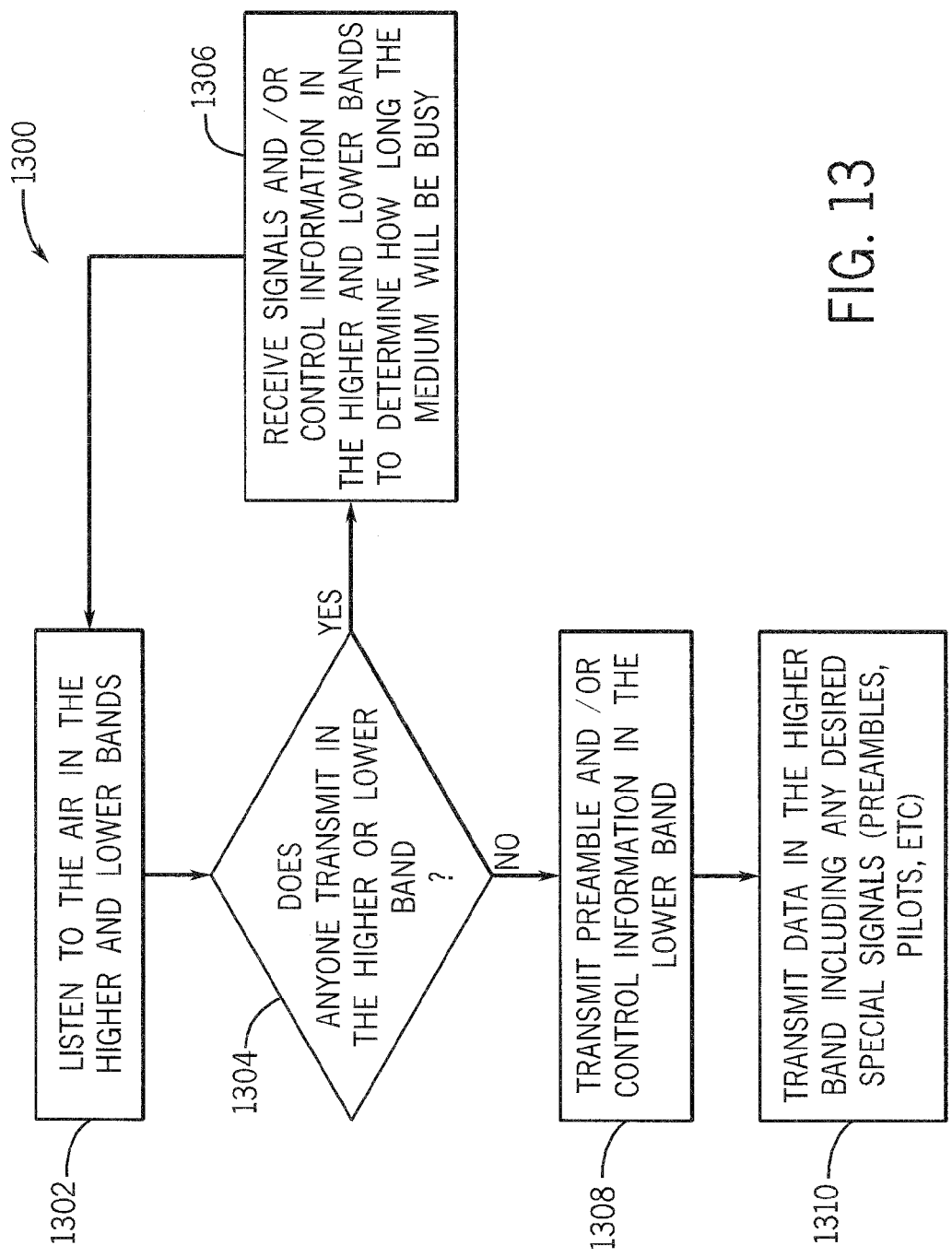
FIG. 13 illustrates another process for communicating by a communication device in a wireless network in accordance with various embodiments.

FIG. 13 illustrates another process 1300 for communicating by a communication device in a wireless network in accordance with various embodiments. The process 1300 may be a transmission procedure for a communication device to communicate with a neighboring communication device and/or a coordinating device using a lower frequency band ("lower band") such as the first frequency band and a higher frequency band ("higher band") such as the second frequency band. For example, the process 1300 may be suitable for embodiments described in connection with at least FIGS. 8-10 where communication in the higher band is preceded with communication in the lower band. Communication devices of a wireless network may be referred to as "nodes" herein. A coordinating device is described further in connection with at least FIG. 19.

At block 1302, the process 1300 includes listening, by a communication device, to the air in the higher and lower bands to determine, at block 1304, whether another communication device and/or a coordinating device transmits in the higher or lower band. The communication device may listen to the air, for example, by detecting energy at a receiver antenna in the lower and/or higher band. A determination as to whether another communication device and/or a coordinating device transmits in the higher or lower band may be based, for example, on energy detected at the receiver antenna or on information decoded from headers (e.g. 1118) and/or frame contents (e.g., 1112).

If the communication device determines that another device is transmitting, then the communication device may receive, at block 1306, signals and/or control information in the higher and/or lower bands to determine how long a medium of the other device will be busy. The received signals and/or control information may include, for example, a preamble comprising medium access control data including data for carrier sense multiple access and collision avoidance (CSMA/CA) or carrier sense multiple access and collision detection (CSMA/CD). The preamble may be a physical layer signal and may include a lower-band frame that includes information about a channel reservation for a higher band as part of a dual-band frame. Receiving lower band communication may allow early detection of transmission in the higher band. If the communication device fails to receive communication in the lower band, the communication device may be able to detect energy at the higher band.

If the communication device determines, at block 1304, that other communication/coordinating devices are not transmitting in the higher or lower band then the communication device may use a transmission protocol that initiates transmission in the lower band, at block 1308, followed by subsequent transmission in the higher band, at block 1310. The communication device may continue transmitting in the lower band when transmitting in the higher band, at block 1310.

Figure 14:
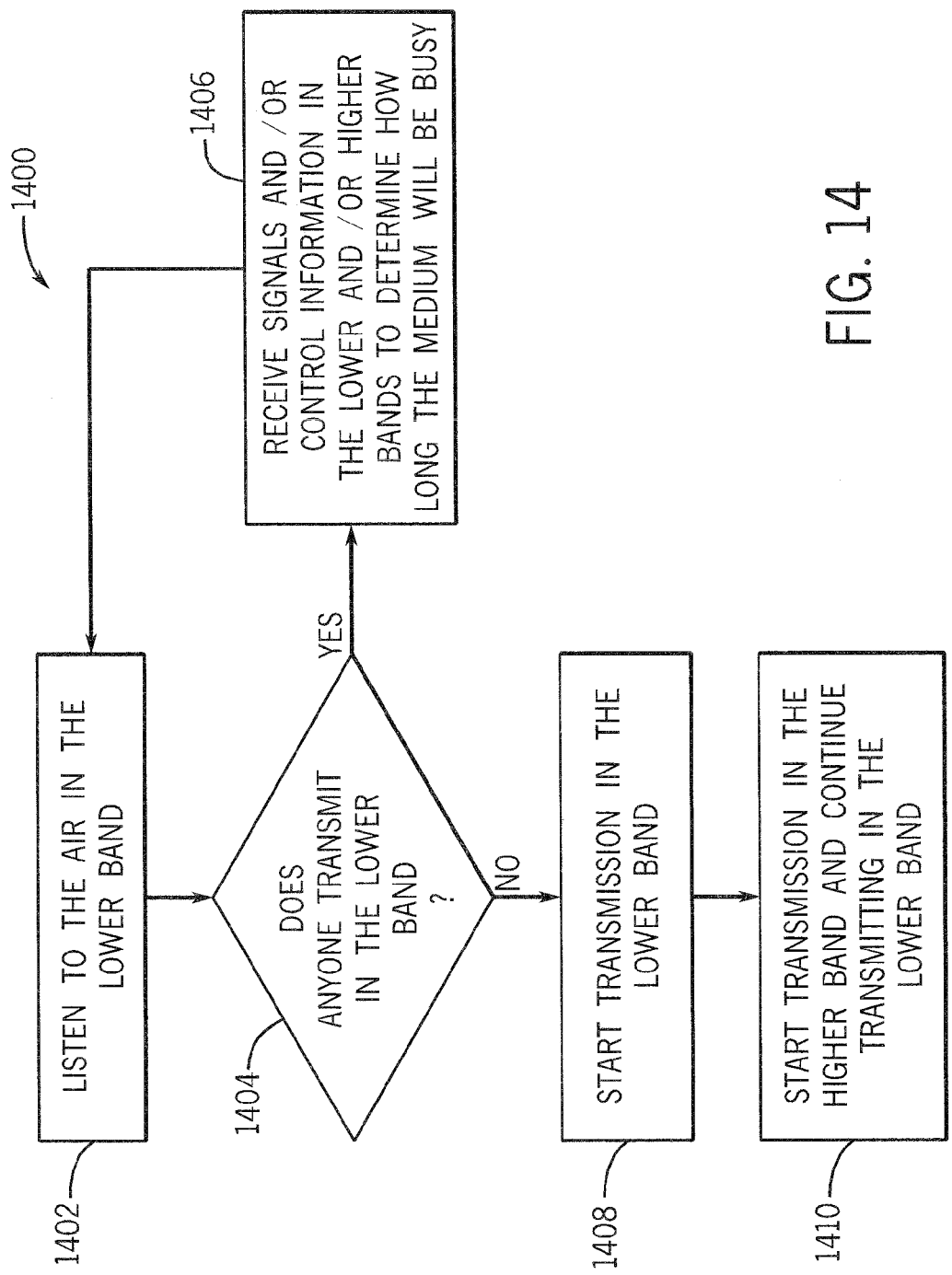
FIG. 14 illustrates yet another process for communicating by a communication device in a wireless network in accordance with various embodiments.

FIG. 14 illustrates yet another process 1400 for communicating by a communication device in a wireless network in accordance with various embodiments. The process 1400 may be suitable for a case where communication in the higher band is arranged in the lower band and synchronized at the physical layer with signals in the lower band (e.g. as described in connection with FIG. 10).

Because both the upper band and lower band are synchronized, listening to the air, at block 1402, may be performed using only the lower band. If the communication device determines that another communication/coordinating device is transmitting in the lower band, at block 1404, then the communication device may receive signals, at block 1406, and/or control information in the lower and/or higher bands to determine how long a medium of the transmitting device will be busy.

In an embodiment, signals and/or control information such as, e.g., headers and/or information associated with a transmission schedule, is received by the communication device, at block 1406, in the lower band. The communication device may use the lower band only in such embodiment to determine eligible time slots to start transmission in the lower band, at block 1408. In an embodiment where signals and/or control information are received by the communication device, at block 1406, in the higher band, the communication device may decode the signals and/or control information from the higher band. A communication device or system may be designed to implement one or both, or combinations, of such embodiments.

If other communication devices are not transmitting in the lower band, at block 1404, then the communication device may start transmission in the lower band, at block 1408. The communication device may subsequently start transmission in the higher band and may continue transmitting in the lower band, at block 1410. In an embodiment, the communication device transmits in the lower band, at block 1408, and in the higher band, at block 1410, according to embodiments described in connection with actions 512, 514, and 516 of FIG. 5.

Figure 15:
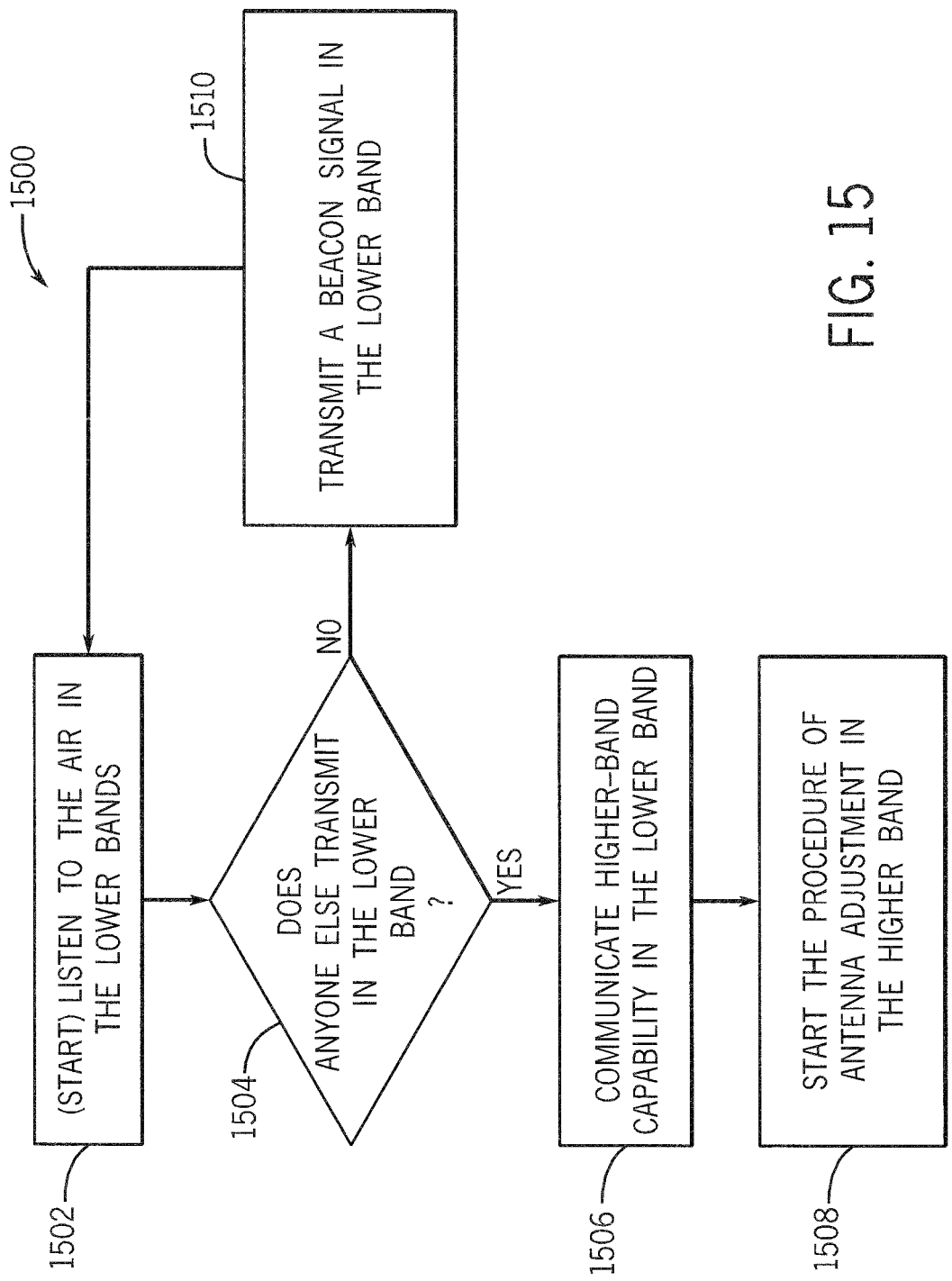
FIG. 15 illustrates a search procedure by a communication device in a wireless network in accordance with various embodiments.

FIG. 15 illustrates a search procedure 1500 by a communication device in a wireless network in accordance with various embodiments. The search procedure 1500 may depict operations performed by a communication device that is not aware of the presence of another communication/coordinating device (e.g. upon powering on the communication device).

At block 1502, the communication device may listen to the air in the lower band to determine, at block 1504, whether other communication/coordinating devices are transmitting in the lower band. For example, the communication device may determine whether a signal from another communication device is received in the lower band. If a signal from a neighboring communication device is received, the communication device may communicate with the neighboring communication device using the lower band, at block 1506, to determine the higher band capability of the neighboring communication device. If the neighboring device is capable of communicating in the higher band, the communication device may start a procedure of antenna adjustment in the higher band as described in connections with FIGS. 16 and 17.

However, if a signal is not received by the communication device at block 1504, e.g., within a pre-determined amount of time, then the communication device may continue listening to the air at block 1504. Alternatively, the communication device may transmit a beacon signal in the lower band, at block 1510, so that other communication devices may detect the presence of the communication device.

Figure 16:
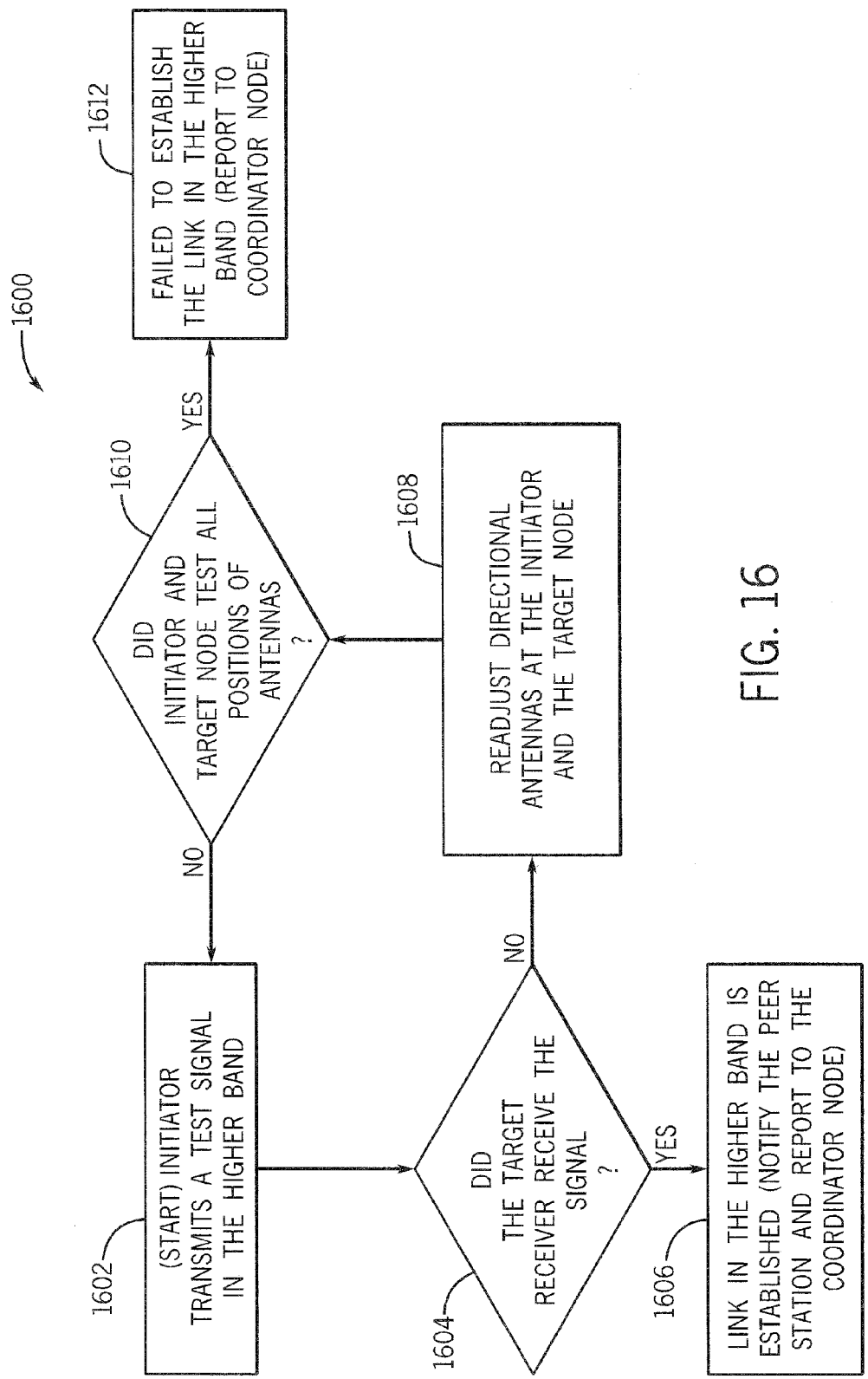
FIG. 16 illustrates an antenna adjustment/link establishment procedure by a communication device in a wireless network in accordance with various embodiments.

FIG. 16 illustrates an antenna adjustment/link establishment procedure 1600 by a communication device in a wireless network in accordance with various embodiments. The antenna adjustment/link establishment procedure 1600 may be initiated, for example, by one of the communication device or a neighboring communication/coordinating device that indicates a capability to communicate using the higher band (hereinafter "initiatior").

At block 1602, the initiator may transmit a test signal in the higher band to an intended recipient (hereinafter "target receiver") such as another communication and/or coordinating device. The test signal may be transmitted to facilitate measurements and/or adjustments by the target receiver to establish a communication link in the higher band.

If the target receiver receives the test signal at block 1604, then a link is established in the higher band at block 1606. The initiator may notify the target receiver (e.g., peer station) and/Oro coordinating device that the link in the higher band is established.

If the target receiver does not receive the test signal at block 1604, then the initiator and/or the target receiver may adjust or re-adjust respective transmitters and receivers (e.g., directional antennas) at block 1608 to allow transmission of another test signal in the higher band. In an embodiment, operations at block 1602, 1604, and 1608 are repeated until the initiator and/or the target receiver have tested all positions or combinations of positions of the antennas (e.g., directional antennas). For example, if the initiator and the target node have not tested all positions or combinations of positions, at block 1610, then operations 1602, 1604, and 1608 may be repeated until the link is established, at block 1606. If the initiator and the target node have tested all positions and/or combinations of positions of their respective antenna, then they may fail to establish a link in the higher band, at block 1612. Such failure to establish a link may be reported to a coordinating device.

Figure 17:
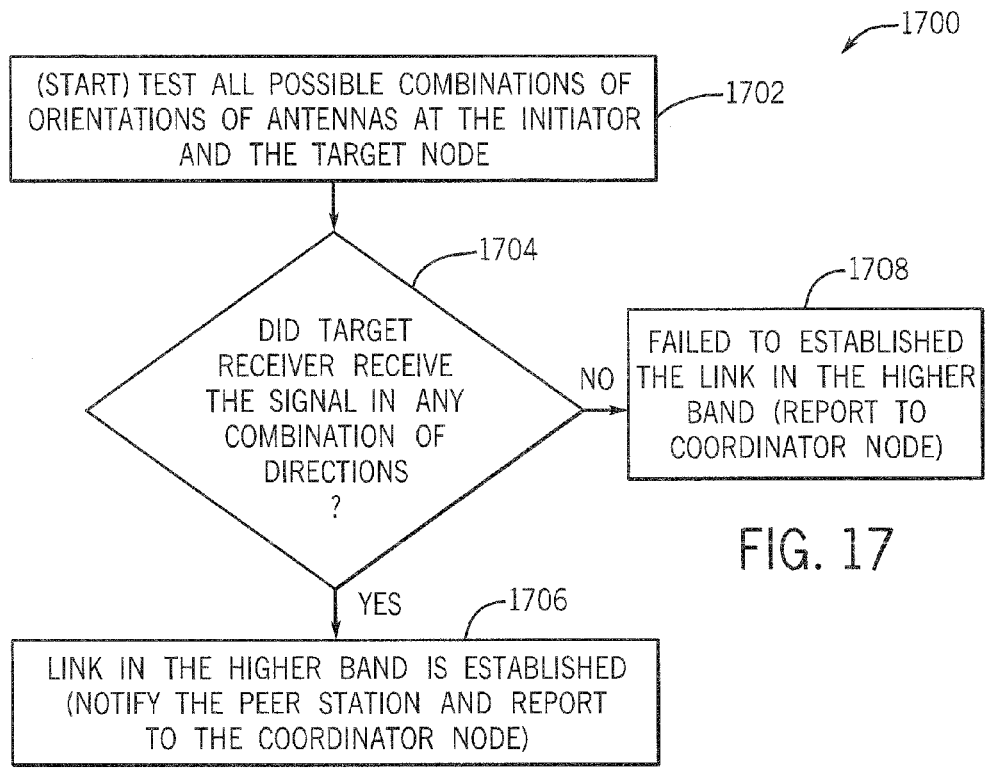
FIG. 17 illustrates another antenna adjustment/link establishment procedure by a communication device in a wireless network in accordance with various embodiments.

FIG. 17 illustrates another antenna adjustment/link establishment procedure 1700 by a communication device in a wireless network in accordance with various embodiments. At block 1702, the procedure 1700 starts with testing all possible combinations of antenna orientations at the initiator and the target node. For example, the initiator may repeatedly transmit a test signal followed by re-positioning of directional transmitters/receivers of the initiator and the target node until all combinations of antenna orientations have been tested.

If any of the tested orientations results in a received test signal by the target node hosting the target receiver, at block 1704, then a link is established in the higher band at block 1706. The initiator may notify the target receiver (e.g., peer station) and/or a coordinating device that the link in the higher band is established. Otherwise, if none of the tested orientations result in a received test signal by the target node, at block 1704, then the initiator and the target node fail to establish a link in the higher band, at block 1708. Such failure to establish a link may be reported to a coordinating device.

Figure 18:
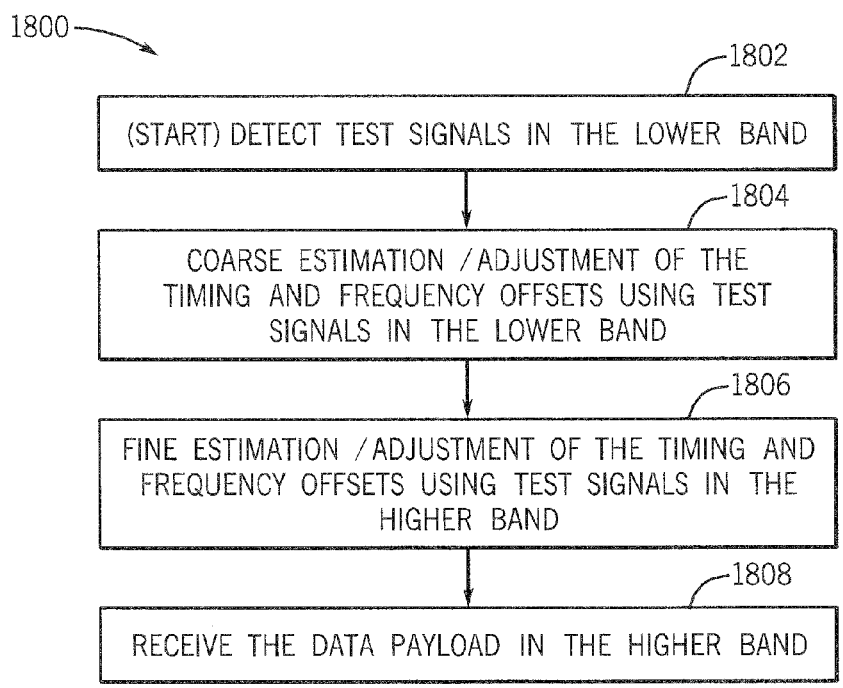
FIG. 18 illustrates a signal reception procedure by a communication device in a wireless network in accordance with various embodiments.

FIG. 18 illustrates a signal reception procedure 1800 by a communication device in a wireless network in accordance with various embodiments. The procedure 1800 may be suitable for signal reception by a communication device having synchronized signals for the upper band and lower band (e.g., using a common reference oscillator) as described in connection with FIGS. 8-10.

At block 1802, a communication device detects test signals transmitted in the lower band and performs, at block 1804, coarse estimation and/or adjustment of timing and frequency offsets using the test signals detected in the lower band. At block 1806, the communication device performs a fine estimation and/or adjustment of the timing and frequency offsets using test signals transmitted using the higher band. At block 1808, the communication device receives a data payload using the higher band.

Figure 19:
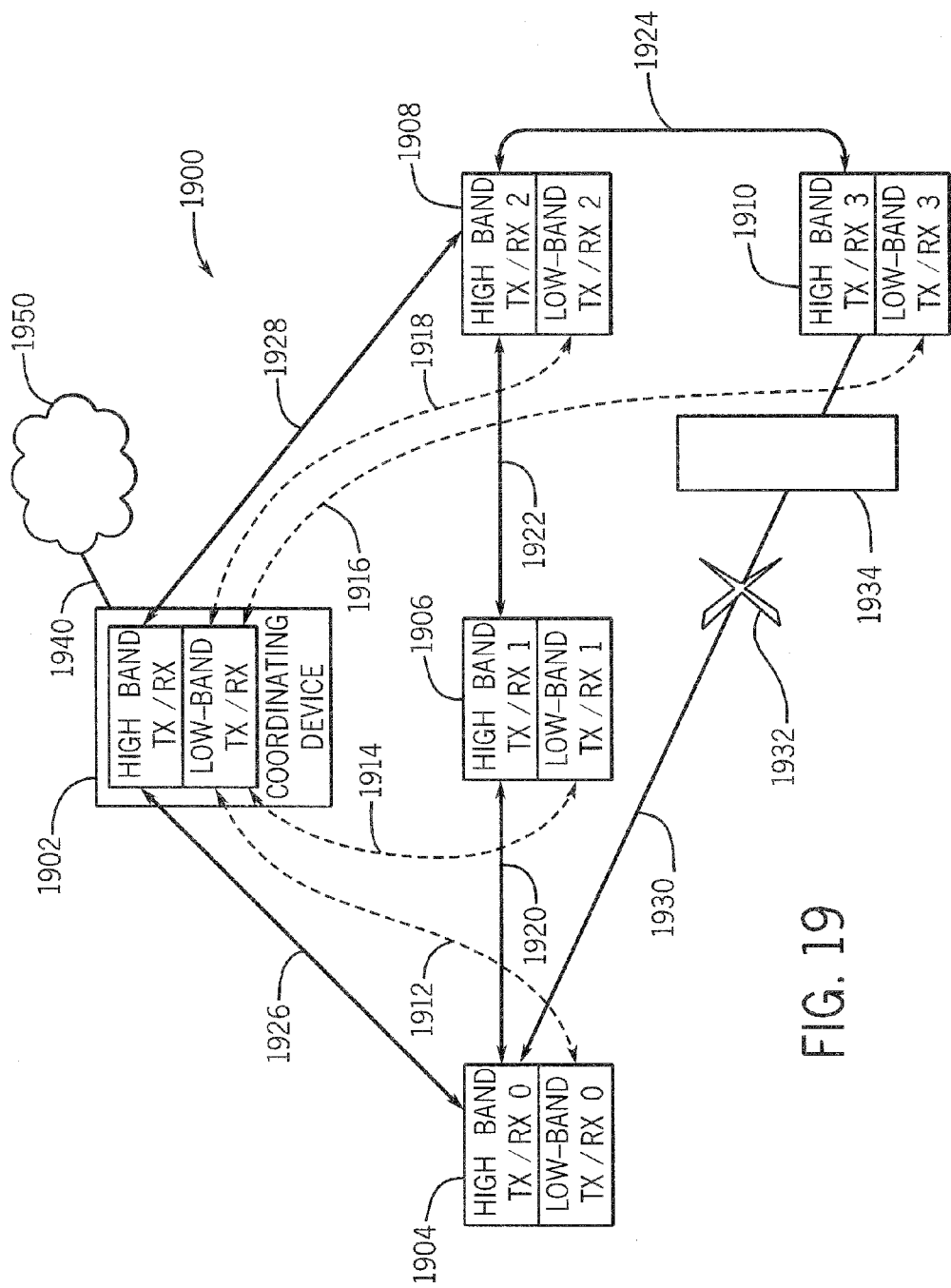
FIG. 19 illustrates a communication system using a coordinating device in accordance with various embodiments.

FIG. 19 illustrates a communication system 1900 using a coordinating device 1902 in accordance with various embodiments. One or more communication devices (e.g., 1904, 1906, 1908, 1910) may be capable of communicating in a higher band and in a lower band using, for example, transceivers (e.g., TX/RX 0, TX/RX 1, TX/RX 2, TX/RX 3) according to embodiments described herein. Higher band communication (e.g. links 1920, 1922, 1924, 1926, 1928) may be performed, for example, using directional antennas that may be mechanically and/or electronically steered. Lower band communication (e.g., 1912, 1914, 1916, 1918) may be performed, for example, using antennas that are substantially omni-directional.

Lower band communication (e.g., 1912, 1914, 1916, 1918) may be used to manage access to a channel in the upper band. For example, a coordinating device 1902 may use the lower band to assign time and/or frequency resources (e.g., a time interval) for one or more of the communication devices (e.g., 1904, 1906, 1908, 1910) to determine whether neighboring communication devices have capability, availability, and/or sufficient link quality in the higher band to establish communication using the higher band. Using the assigned time/and or frequency resource, the one or more communication devices may, for example, determine link availability of the higher band by performing link establishment procedures such as search routines using the higher band, and report the link availability to the coordinating device 1902 using the lower band. The coordinating device 1902 can collect link availability from the one or more communication devices to create a connectivity table or schedule for communication devices that can communicate with each other using the higher band.

For example, communication device 1904 may desire to communicate with communication device 1910 using the higher band, but may not be able to establish a direct link 1930 in the higher band for any of a number of reasons (e.g., signal is blocked by a structure 1934), where a failure to establish the direct link 1930 is indicated by 1932. In such a scenario, the communication device 1904 can, for example, notify the coordinating device 1902 that the communication device 1940 wants to establish higher band communication with the communication device 1910. The coordinating device 1902 can use the connectivity table/schedule to arrange data transmission from the communication device 1940 to the communication device 1910 using, for example, the higher band communication links 1920, 1922, 1924 of communication devices 1906 and 1908 to relay the information.

The coordinating device 1902 may arrange particular time and/or frequency resources for higher band link establishment between the communication devices (e.g., 1904, 1906, 1908, 1910) to avoid interference. For example, a pair of communication devices may vary directions/positions of their respective antenna systems as part of a link establishment search routine, which may produce substantial interference on higher band transmissions of other communication devices. The coordinating device 1902 may avoid such interference by allocating time intervals for higher band communication between pairs of communications devices The coordinating device 1902 may further arrange interference measurements by the communication devices using the higher band. For example, the interference measurements can be performed by the communication devices during the assigned time interval to determine link availability in the higher band. The connectivity table may include an interference level that a higher band link produces on other higher band links and/or corresponding throughput degradation experienced by the higher band links.

Based on the interference information, the coordinating device 1902 can determine/calculate a more efficient schedule of transmissions in the higher band by the communication devices. The coordinating device 1902 may, for example, allow simultaneous transmissions for links that have lower mutual interference and/or prevent simultaneous transmissions for links that have higher mutual interference. The coordinating device 1902 may determine lower and higher mutual interference by comparing the received interference levels and/or corresponding throughput degradation to one another or to a pre-determined threshold interference/degradation level. Such scheduling of transmissions based on interference information may increase aggregate throughput of information in the communication system 1900.

Using the lower band, the coordinating device 1902 may transmit a transmission schedule for communication in the higher band by the communication devices (e.g., 1904, 1906, 1908, 1910) to the communication devices. The coordinating device 1902 may, for example, broadcast a message to simultaneously notify the communication devices of the transmission schedule.

The communication devices (e.g., 1904, 1906, 1908, 1910) may perform link establishment procedures for the higher band using only the higher band. For example, an initiating communication device may perform a search routine in accordance with a transmission schedule received from the coordinating device 1902. The search routine may include, for example, transmission of test signal(s) such as preamble/pilot signals using the higher band and repositioning of beams of transceivers. A receiving communication device may receive the test signal(s) and determine whether a link quality in the higher band is sufficient and/or make beam adjustments to improve link quality. Further test signals may be transmitted by the initiating communication device using the higher band to facilitate carrier frequency offset (CFO), timing synchronization, and fine beam-forming adjustments in the higher band. Once a link is established in the higher band between the initiating communication device and the receiving communication device, one or both of the initiating and receiving communication devices may notify the coordinating device 1902 about the newly established link.

According to various embodiments, the coordinating device 1902 is a communication device having circuitry in accordance with embodiments described, for example, in FIGS. 6-7. In an embodiment, the coordinating device 1902 is an access point (AP) for wireless communication network in accordance with IEEE 802.11 (e.g., Wi-Fi), but is not limited in this regard. The coordinating device 1902 may be an AP or a Base Station that operates according to other wireless technologies.

The coordinating device 1902 may be connected with a computer network such as the Internet (e.g., 1950) by a line 1940 such as a wire or optical fiber. In other embodiments, the coordinating device 1902 may be connected with the computer network (e.g., 1950) by a wireless link (not shown). In an embodiment, the coordinating device 1902 seeks to establish higher band links with communication devices of the communication system 1900 either directly (e.g., links 1926, 1928) or through communication devices operating as relays to increase throughput for the communication system 1900.

The coordinating device 1902 may include a coordinating module to create the connectivity table based on received link availability information and/or interference information and a scheduling module to create a transmission schedule based on the connectivity table and/or information associated with the connectivity table. As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Figure 20:
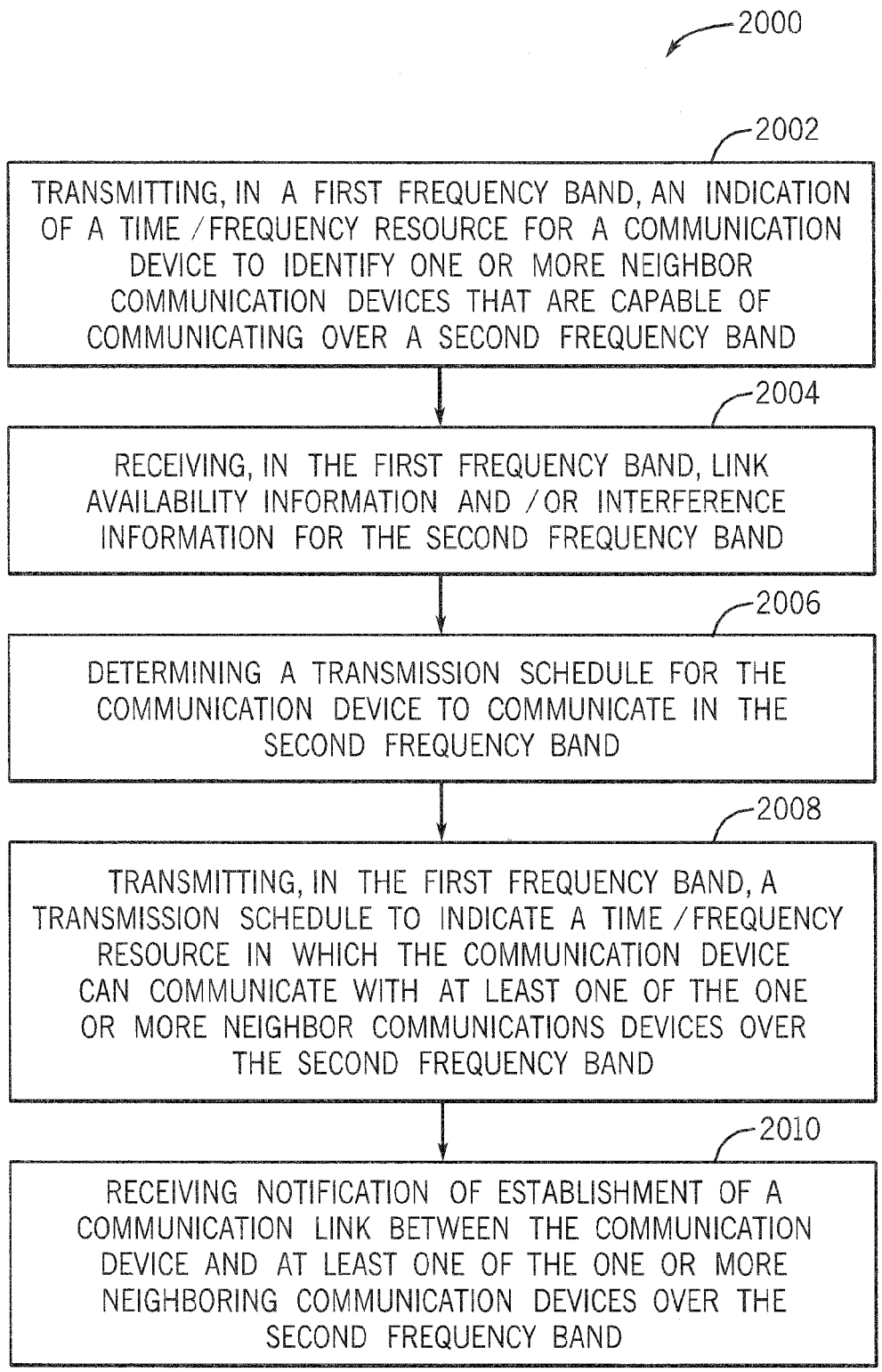
FIG. 20 illustrates a process for coordinating communication by a coordinating device in a wireless network in accordance with various embodiments.

FIG. 20 illustrates a process 2000 for coordinating communication by a coordinating device (e.g., 1902) in a wireless network in accordance with various embodiments. The actions/operations described in connection with the process 2000 may be performed, for example, by a coordinating device (e.g., 1902). At block 2002, the process 2000 includes transmitting in a first frequency band (e.g., lower band) an indication of a time/frequency resource for a communication device to identify one or more neighbor communication devices that are capable of communicating over a second frequency band.

The time/frequency resource may, for example, include a time interval for the communication device to identify, using the second frequency band or another frequency band other than the first or second frequency band, the one or more neighbor communication devices that are capable of communicating over the second frequency band. In an embodiment, the indicated time/frequency resource includes a dedicated frequency channel (e.g., second frequency band or other frequency interval). For example, if a frequency boundary is indicated or specified, the time/frequency resource may include a time interval and if a time boundary is indicated or specified, the time/frequency resource may include a frequency interval such as a channel, band or one or more subcarriers (which are a fraction of a channel or band) when the system is using OFDM modulation.

At block 2004, the process 2000 includes receiving, in the first frequency band, link availability information and/or interference information for the second frequency band. The link availability information and/or interference information may be received from the communication device. A connectivity module that is part of or coupled to the coordinating device may create a connectivity table having, for example, pairs of communication devices that are capable of directly communicating using the second frequency band. The connectivity table may be based on link availability information and/or interference information obtained by the communication device.

In an embodiment, receiving interference information includes receiving interference measurements performed by the communication device such as an indication of an interference level(s). The interference measurements may be performed by one or more communication devices, including the communication device. The interference information may include information indicative of a source of the interference such as an identification of a particular station or direction associated with the interference. The coordinating device may distribute such interference information to facilitate correction of the interference (e.g., by adjusting antenna position of affected receivers/transmitters). The link availability information and/or the interference information for the second frequency band may be obtained during the indicated time/frequency resource (e.g., the time resource being a time interval and the frequency resource being the second frequency band) to identify the one or more neighbor communication devices that are capable of communicating over the second frequency band.

At block 2006, the process 2000 includes determining a transmission schedule for the communication device to communicate in the second frequency band. The transmission schedule may be determined based at least in part on the received interference information. In an embodiment, the transmission schedule is determined at least in part by comparing the interference levels to allow simultaneous transmission for at least two communication devices that have mutual interference levels below a threshold level using the second frequency band and to prevent simultaneous transmission for at least another two communication devices that have mutual interference levels above the threshold level using the second frequency. The transmission schedule may be determined by a scheduling module that is either part of or coupled to the coordinating device and may be based at least in part on the received link availability information and/or interference information.

For example, consider an example where a transmitting communication device seeks to transmit to a receiving communication device with an interfering communication device (e.g., a transmission from the interfering communication device may interfere with reception of a signal by the receiving communication device from the transmitting communication device). If the interfering communication device creates an interference level on the receiving communication device that is below a predetermined threshold, e.g., as compared by the coordinating device or module having similar functionality coupled to the coordinating device, the coordinating device may allow simultaneous transmission of the transmitting communication device to the receiving communication device and the interfering communication device to, e.g., another communication device. If the interfering communication device creates an interference level on the receiving communication device that is above a predetermined threshold, then the coordinating device may prevent simultaneous transmission of the transmitting communication device to the receiving communication device and the interfering communication device to, e.g., the other device.

At block 2008, the process 2000 includes transmitting, in the first frequency band, a transmission schedule to indicate a time/frequency resource in which the communication device can communicate with at least one of the one or more neighboring communication devices over the second frequency band. The time/frequency resource may include a time period or a particular frequency interval, or combinations thereof. For example, the coordinating device may schedule a frequency subchannel or multiple time slots/frequency subchannels for communication using the second frequency band.

The transmission schedule may be transmitted, for example, by a beacon transmission to all communication devices within range to receive the beacon transmission. In other embodiments, the transmission schedule may be distributed to the communication devices by other means such as unicast messaging (e.g., polling).

At block 2010, the process 2000 includes receiving notification of establishment of a communication link, the communication link being over the second frequency band and being between the communication device and at least one of the one or more neighboring communication devices. The notification may be received, for example, by one or both of the communication device and the other linked communication device using any suitable frequency band.

Figure 21:
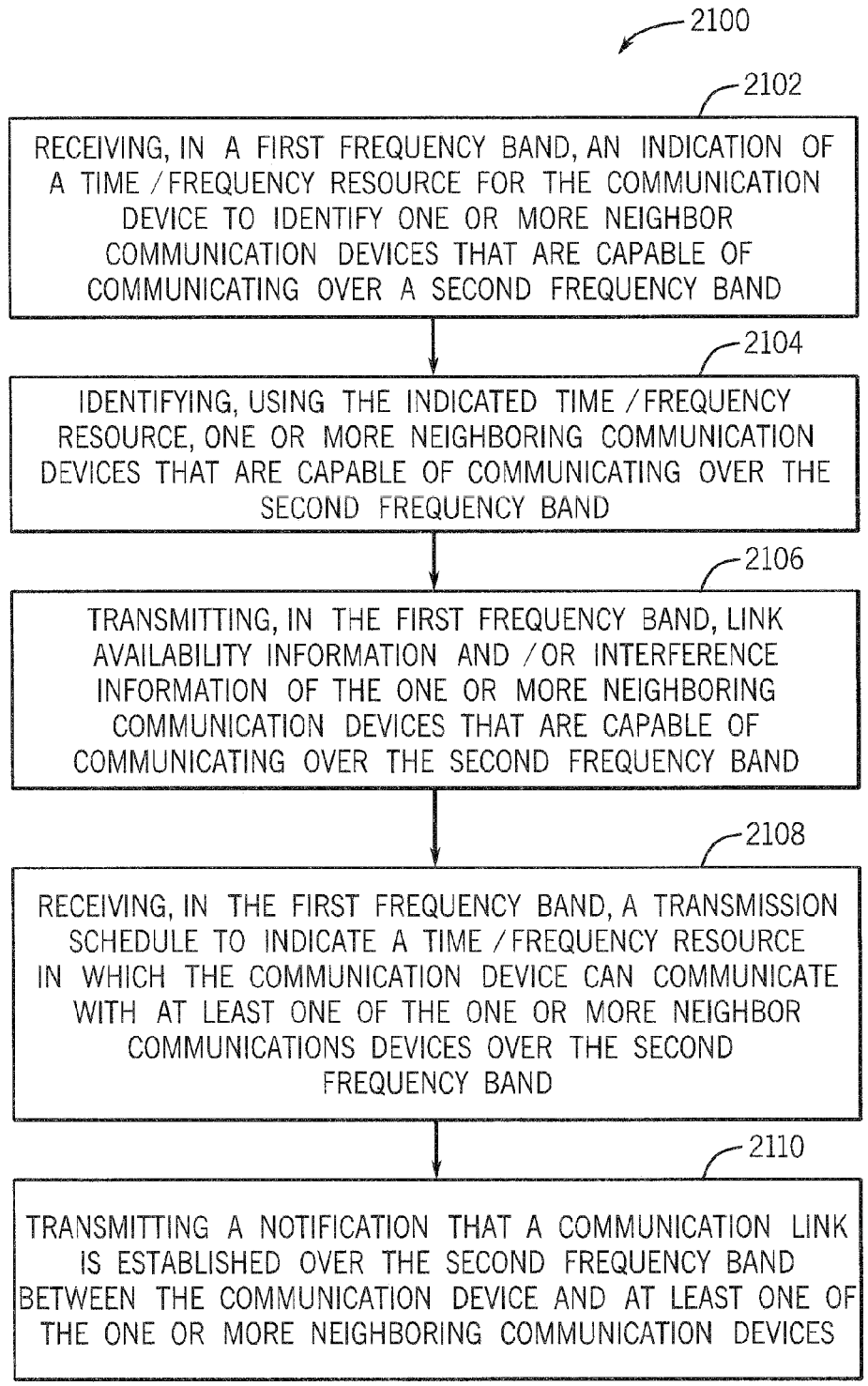
FIG. 21 illustrates a process for coordinating communication by a communication device in a wireless network in accordance with various embodiments.

FIG. 21 illustrates a process 2100 for coordinating communication by a communication device (e.g., 1904) in a wireless network in accordance with various embodiments. The actions/operations described in connection with the process 2100 may be performed, for example, by a communication device (e.g., 1904). At block 2102, the process 2100 includes receiving, in a first frequency band, an indication of a time/frequency resource for the communication device to identify one or more neighbor communication devices that are capable of communicating over a second frequency band. The indication of the time/frequency resource may be received from a coordinating device (e.g., 1902). The time/frequency resource may comport with embodiments already described in connection with at least FIG. 20.

At block 2104, the process 2100 includes identifying, using the indicated time/frequency resource, one or more neighboring communication devices that are capable of communicating over the second frequency band. Said identifying may include transmitting search routine signals associated with link establishment as described herein.

At block 2106, the process 2100 includes transmitting, in the first frequency band, link availability information and/or interference information of the one or more neighboring communication devices that are capable of communicating over the second frequency band. Said transmitting of interference information may include, for example, interference measurements including interference levels, the interference measurements being performed by one or more communication devices, including the communication device.

At block 2108, the process 2100 includes receiving, in the first frequency band, a transmission schedule to indicate a time/frequency resource in which the communication device can communicate with at least one of the one or more neighboring communication devices over the second frequency band. The transmission schedule may be based, for example, on the transmitted link availability and/or interference information. The time/frequency resource may comport with embodiments already described in connection with at least FIG. 20.

At block 2110, the process 2100 includes transmitting a notification that a communication link is established over the second frequency band between the communication device and at least one of the one or more neighboring communication devices. The notification may be transmitted by one or both of the communication device and the other linked communication device.

Figure 22:
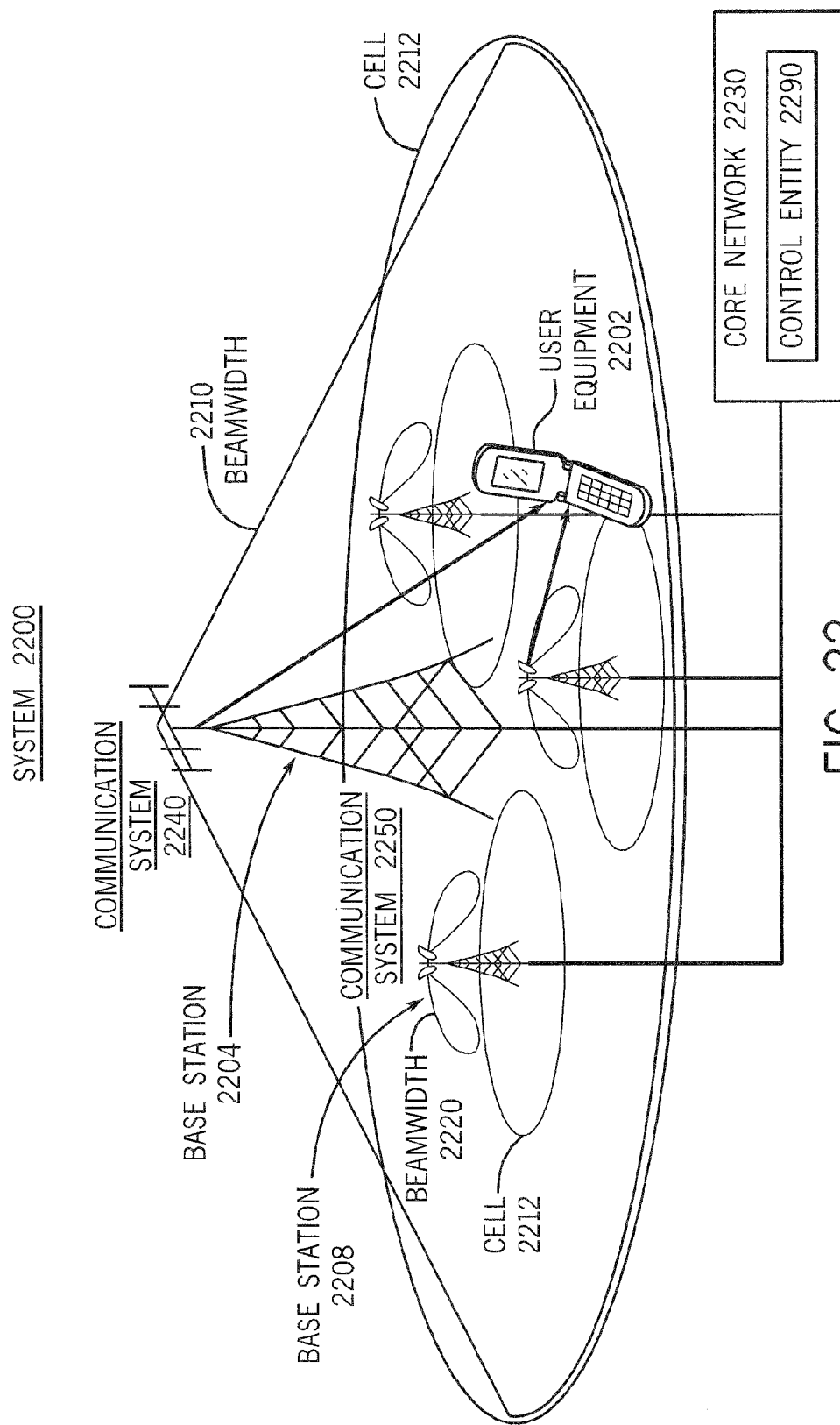
FIG. 22 illustrates a communication system with two different types of wireless communication systems.

FIG. 22 illustrates a system 2200 with two different types of wireless communication systems 2240, 2250 operating in different frequency bands, with each frequency band having a different beamwidth and corresponding advantages, as previously described. In general, the communication system 2240 may utilize a wider beamwidth 2210 having a larger coverage area and lower throughput suitable for control information, and the communication system 2250 may utilize a narrower beamwidth 2220 having a smaller coverage area and higher throughput suitable for data information, although both beamwidths 2210, 2220 may be used to communicate both control information and data information at varying levels of performance. The wireless communication systems 2240, 2250 are particularly suitable for outdoor operating environments, such as a broadband wireless personal area network (WPAN), wireless video area network (WVAN), wireless local area network (WLAN), wireless metropolitan area network (WMAN), a wireless wide area network (WWAN), and so forth. Although system 2200 illustrates only two wireless communication systems 2240, 2250 for clarity, it may be appreciated that more than two wireless communication systems may be utilized in some embodiments. Furthermore, although system 2200 illustrates two wireless communication systems 2240, 2250, it may be appreciated that the systems 2240, 2250 may be combined into a single wireless system operating in accordance with a single unified standard, such as a fifth generation (5G) standard, for example.

System 2200 comprises a first communication system 2240. The first communication system 2240 may comprise a cellular radio network. The cellular radio network may have one or more base stations 2204. Each base station 2204 may service a cell 2212 in the cellular radio network by transmitting RF electromagnetic signals in a certain beamwidth 2210. Each base station 2204 may further support multi-carrier operations and therefore may communicate with mobile stations, such as user equipment (UE) 2202, on various carrier frequencies. In a fourth generation (4G) wireless standard, such as the Institute of Electrical and Electronics Engineers (IEEE) 802.16m, 802.16p, and the 3rd Generation Partnership Project (3GPP) Long Term Evolution (LTE) and LTE Advanced (LTE ADV) standards, multi-carrier operation may support larger bandwidths and meet International Mobile Telecommunications Advanced (IMT-ADV) specifications for system capacity. Each base station 2204 in a network may use different carrier frequencies. The base stations may be configured with different carrier frequencies according to factors such as, but not limited to, the available technology and regional market demand.

In one embodiment, for example, the communications system 2240 may be implemented by any communication system operating using a frequency band lower than 10 GHz, such as a 3GPP LTE or LTE ADV system, among others. 3GPP LTE and LTE ADV are standards for wireless communication of high-speed data for mobile phones and data terminals. They are based on Global System for Mobile Communications (GSM)/Enhanced Data Rates for GSM Evolution (EDGE) and Universal Mobile Telecommunications System (UMTS)/High Speed Packet Access (HSPA) technologies, increasing capacity and speed using new modulation techniques. Alternatively, the communication system 2240 may be implemented in accordance with the Worldwide Interoperability for Microwave Access (WiMAX) or the WiMAX II standard, among others. WiMAX is a wireless broadband technology based on the IEEE 802.16 series of standards. WiMAX II is an advanced Fourth Generation (4G) system based on the IEEE 802.16m and IEEE 802.16j series of standards for International Mobile Telecommunications (IMT) Advanced 4G series of standards. Although some embodiments may describe the communications system 2240 as a LIE, LTE ADV, WiMAX or WiMAX II system or standards by way of example and not limitation, it may be appreciated that the communications system 2240 may be implemented as various other types of mobile broadband communications systems and standards, such as a Universal Mobile Telecommunications System (UMTS) system series of standards and variants, a Code Division Multiple Access (CDMA) 2000 system series of standards and variants (e.g., CDMA2000 1.times.RTT, CDMA2000 EV-DO, CDMA EV-DV, and so forth), a High Performance Radio Metropolitan Area Network (HIPERMAN) system series of standards as created by the European Telecommunications Standards Institute (ETSI) Broadband Radio Access Networks (BRAN) and variants, a Wireless Broadband (WiBro) system series of standards and variants, a Global System for Mobile communications (GSM) with General Packet Radio Service (GPRS) system (GSM/GPRS) series of standards and variants, an Enhanced Data Rates for Global Evolution (EDGE) system series of standards and variants, a High Speed Downlink Packet Access (HSDPA) system series of standards and variants, a High Speed Orthogonal Frequency-Division Multiplexing (OFDM) Packet Access (HSOPA) system series of standards and variants, a High-Speed Uplink Packet Access (HSUPA) system series of standards and variants, 3rd Generation Partnership Project (3GPP) Rel. 8 and 9 of Long Term Evolution (LTE)/System Architecture Evolution (SAE), LTE ADV, and so forth. The embodiments are not limited in this context.

System 2200 comprises a second communication system 2250. The communication system 2250 may also comprise a cellular radio network different from the communication system 2240. The cellular radio network may have one or more base stations 2208. As with base stations 2204, each base station 2208 may service a cell 2222 in the cellular radio network by transmitting RF electromagnetic signals having a certain beamwidth 2220. Further, each base station 2208 may support multi-carrier operations and therefore may communicate with mobile stations, such as user equipment (UE) 2202, on various carrier frequencies. Examples for communication system 2250 may include without limitation any communication system operating using a frequency band greater than 20 GHz, such as millimeter-wave (mmWave) systems. Examples of mmWave systems may include without limitation a system as defined by one or more Wireless Gigabit Alliance (WiGig) series of specifications, IEEE 802.11ad series of specifications, IEEE 802.15 series of specifications, and other 60 GHz mmWave wireless systems. Another example for communication system 2250 may include a Local Multipoint Distribution Service (LMDS) system operating in the 28 GHz and 31 GHz frequency bans. The embodiments are not limited in this context.

In one embodiment, the communication system 2240 operates in a first frequency band, and the communication system 2250 operates in a second frequency band, with the first frequency band lower than the second frequency band. The communication system 2240 and the first frequency band may be associated with a first beamwidth 2210, while the communication system 2250 and the second frequency band may be associated with a second beamwidth 2220. In one embodiment, the first beamwidth 2210 may be broader or greater than the second beamwidth 2220. In one embodiment, the first beamwidth 2210 may be narrower or smaller than the second beamwidth 2220. In one embodiment, the first and second beamwidths 2210, 2220 may have a same beamwidth. It is worthy to note that both systems 2240, 2250 may use beamforming techniques that may adjust beamwidths 2210, 2220, respectively, on an instantaneous basis, and therefore beamwidths may be compared for a given time instance, an average beamwidth, or other statistical measurement.

The first frequency band may be lower than the second frequency band. For instance, the first frequency band may have a center frequency of less than 20 GHz, and the second frequency band may have a center frequency of more than 20 GHz. More particularly, the first frequency band may comprise one or more frequencies within a 700 MHz to 2.5 GHz range, as used in the 3GPP LTE and LTE ADV standards, among others. The second frequency band may comprise one or more frequencies within a 59 GHz to 62 GHz range, as used in the IEEE 802.11ad standard, and the 28 GHz to 31 GHz range, as used in the LMDS standard, among others. The embodiments are not limited to these examples.

The base stations 2204, 2208 may be connected to a core network 2230. The core network 2230 may include, for example, the coordinating device 1902 as described with reference to FIG. 19 and a control entity 2290. The control entity 2290 may include logic to coordinate interoperability between the communication systems 2240, 2250, such as a establishing and managing a frame synchronization period common to both systems, as described further below.

The communication systems 2240, 2250 may communicate with one or more user equipment 2202. User equipment 2202 may comprise a mobile or fixed wireless device. The user equipment 2202 may comprise various wireless interfaces and/or components to support wireless communication, such as one or more radios, transmitters, receivers, transceivers, chipsets, amplifiers, filters, control logic, network interface cards (NICs), antennas, antenna arrays, and so forth. Examples of an antenna may include, without limitation, an internal antenna, a directional antenna, an omni-directional antenna, a monopole antenna, a dipole antenna, an end fed antenna, a circularly polarized antenna, a micro-strip antenna, a diversity antenna, a dual antenna, an antenna array, and so forth. Certain devices may include antenna arrays of multiple antennas to implement various adaptive antenna techniques and spatial diversity techniques. In various embodiments, user equipment 2202 may comprise one or more RF antennas coupled to receiver circuitry to receive electromagnetic representations of the first, second, and/or third signals, as previously defined. In one embodiment, for example, user equipment 2202 may comprise one or more omni-directional antennas coupled to receiver circuitry to receive electromagnetic representations of the first signals. In one embodiment, for example, user equipment 2202 may comprise one or more directional antennas coupled to receiver circuitry to receive electromagnetic representations of the second and third signals.

Examples of user equipment 2202 may include, without limitation, a station, a subscriber station, a mobile station, a wireless client device, a wireless station (STA), a laptop computer, ultra-laptop computer, portable computer, personal computer (PC), notebook PC, handheld computer, personal digital assistant (PDA), cellular telephone, combination cellular telephone/PDA, smart phone, tablet computer, pager, messaging device, media player, digital music player, set-top box (STB), appliance, workstation, user terminal, mobile unit, consumer electronics, television, digital television, high-definition television, television receiver, high-definition television receiver, and so forth. The embodiments are not limited in this context.

The user equipment 2202 may each include or implement a dual-band radio architecture having one or more co-located radios capable of communicating information using different frequency bands. Each wireless device may have a radio architecture utilizing multiple radios co-located within the single wireless device, with each radio operating at a different frequency band corresponding to the first and second frequency bands used by the first and second communication systems 2240, 2250, respectively. A control element, such as a controller, may be implemented to coordinate and synchronize operations between the multiple co-located radios. Specific radios and corresponding operating frequency bands for a given implementation may be selected in accordance with the advantages of a given radio to perform media operations or control operations. Combining the advantages of multiple co-located radios within a single wireless device may enhance the overall communications capabilities for a wireless device. Alternatively, the user equipment 2202 may utilize a single radio capable of operating in multiple frequency bands. The embodiments are not limited in this context.

Figure 23:
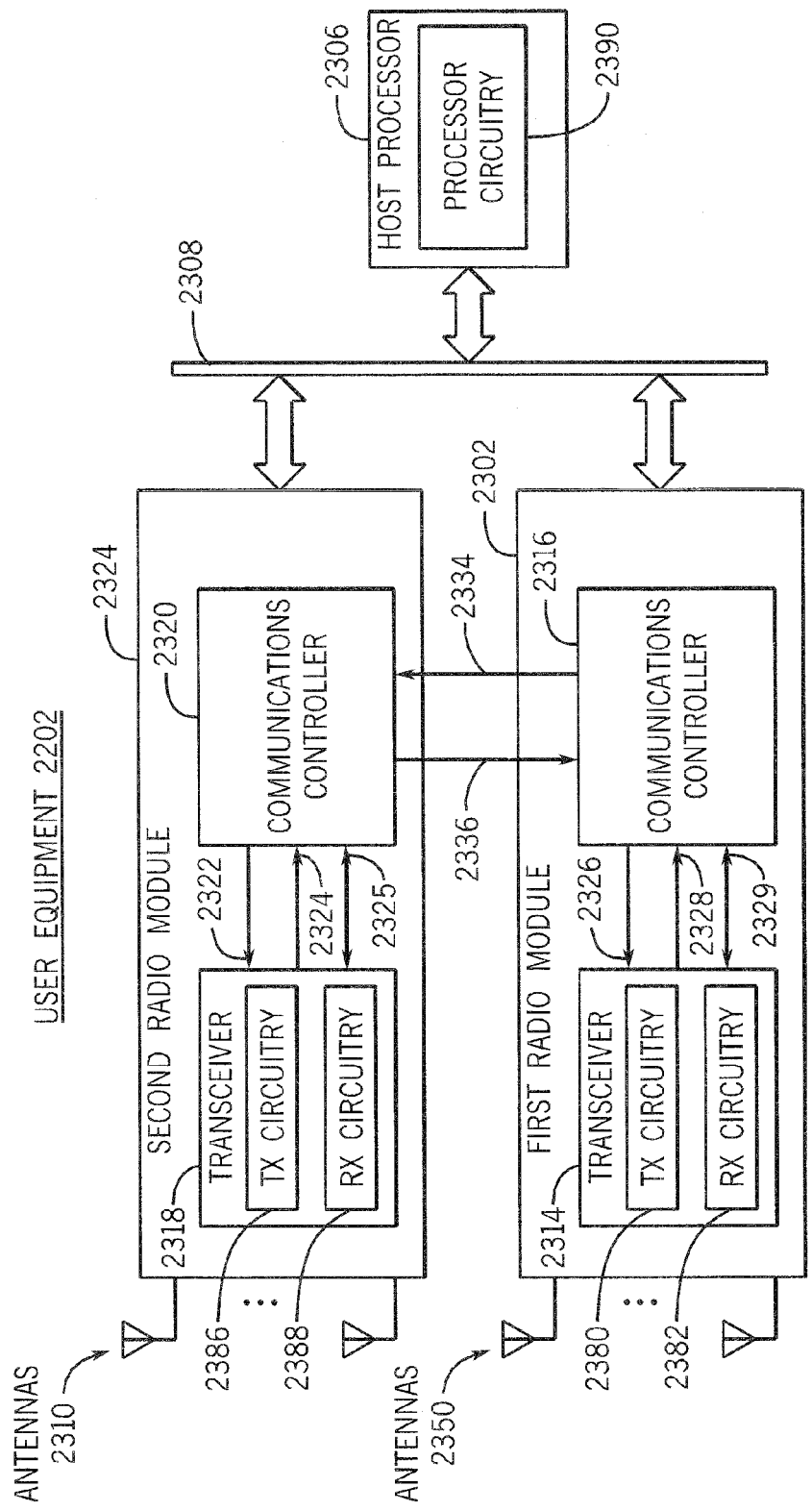
FIG. 23 illustrates exemplary user equipment suitable for use with two different types of wireless communication systems.

FIG. 23 illustrates an exemplary embodiment of user equipment 2202 arranged for wireless communication with different types of communication systems, such as communication systems 2240, 2250. In particular, FIG. 23 shows user equipment 2202 comprising various elements. The embodiments, however, are not limited to these depicted elements. FIG. 23 shows that user equipment 2202 may include a first radio module 2302 coupled to a set of one or more antennas 2310, a second radio module 2304 coupled to a set of one or more antennas 2350, a host processor 2306, and an interconnection medium 2308 to couple the host processor 2306 with the first and second radio modules 2302, 2304. These elements may be implemented in hardware, software, firmware, or in any combination thereof.

Although user equipment 2202 only shows two radio modules 2302, 2304, it may be appreciated that user equipment 2202 may include more than two radio modules (and associated elements) as desired for a given implementation. Further, although user equipment 2202 illustrates separate sets of antennas 2310, 2350 for each of the first and second radio modules 2302, 2304, respectively, it may be appreciated that the radio modules 2302, 2304 may share one or more antennas from a single antenna array via some form of shared antenna structure. The embodiments are not limited in this context.

First radio module 2302 and second radio module 2304 (and/or additional radio modules) may communicate with remote devices across different types of wireless links. For example, first radio module 2302 and second radio module 2304 may communicate across various data networking links with the base stations 2204, 2208, respectively. In one embodiment, for example, first radio module 2302 is a 3GPP LTE or LTE ADV device and second radio module 2304 is a mmWave device, such as an IEEE 802.11ad device. The embodiments, however, are not limited to these examples.

FIG. 23 shows that first radio module 2302 includes a transceiver 2314 and a communications controller 2316. Transceiver 2314 may transmit and receive wireless signals through one or more antennas 2310. As described above, these signals may be associated with wireless data networks, such as a 3GPP LTE or LTE ADV link. However, the embodiments are not limited to such.

Communications controller 2316 controls the operation of transceiver 2314. For instance, communications controller 2316 may schedule transmission and reception activity for transceiver 2314. Such control and scheduling may be implemented through one or more control directives 2326. Control directive(s) 2326 may be based on operational status information 2328, which communications controller 2316 receives from transceiver 2314. Also, such control directives may be based on status messages and/or commands 2336 received from radio module 2304. The embodiments, however, are not limited to these examples.

Further, communications controller 2316 may perform operations on payload information 2329 that it exchanges with transceiver 2314. Examples of such operations include error correction encoding and decoding, packet encapsulation, various media access control protocol functions, and so forth.

As shown in FIG. 23, second radio module 2304 includes a transceiver 2318 and a communications controller 2320. Transceiver 2318 may also transmit and/or receive wireless signals through one or more antennas 2350. As described above, these signals may also be associated with wireless data networks, such as an IEEE 802.118d link. However, the embodiments are not limited to such.

Communications controller 2320 controls the operation of transceiver 2318. This may involve scheduling transmission and reception activity for transceiver 2318. Such control and scheduling may be implemented through one or more control directives 2322. Control directive(s) 2322 may be based on operational status information 2324, which communications controller 2320 receives from transceiver 2318. Also, such control directives may be based on status messages and/or commands 2334 received from radio module 2302. The embodiments, however, are not limited to these examples.

Additionally, communications controller 2320 may perform operations on payload information 2325 that it exchanges with transceiver 2318. Examples of such operations include error correction encoding and decoding, packet encapsulation, various media access control protocol functions, and so forth.

In addition to performing the control operations described above, communications controllers 2316, 2320 may provide coordination between radio modules 2302, 2304. This coordination may involve the exchange of information. For instance, FIG. 23 shows that communications controller 2316 may send status messages and/or commands 2334 to controller 2320. Conversely, communications controller 2320 may send status messages and/or commands 2336 to communications controller 2316. These messages may be implemented as signals allocated to various signal lines. In such allocations, each message is a signal. However, further embodiments may alternatively employ data messages. Such data messages may be sent across various connections. Exemplary connections include parallel interfaces, serial interfaces, and bus interfaces. Further, as systems on a chip (SoC) develop, the separate communication controllers 2316, 2320 may in fact be the same piece of silicon or the same core processor. The communication controllers 2316, 2320 may actually be different function calls or software modules operating on the same chip. In that case, the messages may not use different physical connections such as parallel interfaces, serial interfaces, or bus interfaces. When the functions collapse into one chip, these messages may be passed as message queues, shared via stacks, sent via semaphores or flags, and so forth. The embodiments are not limited in this context.

Host processor 2306 may exchange information with radio modules 2302, 2304. As shown in FIG. 23, such exchanges may occur across interconnection medium 2308. For instance, host processor 2306 may send information to these radio modules for wireless transmission. Conversely, radio modules 2302 and 2304 may send information to host processor 2306 that was received in wireless transmissions. In addition, host processor 2306 may exchange information with radio modules 2302 and 2304 regarding their configuration and operation. Examples of such information include control directives sent from host processor 2306 to radio modules 2302, 2304.

Interconnection medium 2308 provides for couplings among elements, such as first radio module 2302, second radio module 2304, and host processor 2306. Thus, interconnection medium 2308 may include, for example, one or more bus interfaces. Exemplary interfaces include Universal Serial Bus (USB) interfaces, Serial Peripheral Interconnect (SPI) interfaces, Secure Digital Input Output (SDIO) interfaces, as well as various computer system bus interfaces. Additionally or alternatively, interconnection medium 2308 may include one or more point-to-point connections (e.g., parallel interfaces, serial interfaces, etc.) between various element pairings. In some cases, the host processor 2306 may be in the same physical chip as the communication controllers 2316, 2320. The interconnection medium 2308 may therefore be software rather than a physical interface such as USB, SDIO, SPI, bus, parallel, and so forth. As such cases, the interconnection medium 2308 may be implemented as message queues, semaphores, function calls, stack, global variables, pointers, and so forth. The embodiments are not limited in this context.

In various embodiments, the transceivers 2314, 2318 of the user equipment 2202 may include transmitter circuitry and/or receiver circuitry, such as transmitter circuitry 2380, 2386 and/or receiver circuitry 2382, 2388 of the transceivers 2314, 2318, respectively. The transmitter circuitry 2380, 2386 and the receiver circuitry 2382, 2388 may be the same or similar to the transmitter circuitry 702, 1202 and the receiver circuitry 704, 1204 as described with reference to circuitry 700, 1200, respectively, in FIGS. 7, 12, respectively. It may be appreciated that references to a specific transmitter circuitry or receiver circuitry may be applicable to other types of transmitter circuitry or receiver circuitry as described herein. For instance, some embodiments for the user equipment 2202 may be described with reference to the receiver circuitry 2382 or the receiver circuitry 2388, although other embodiments may use any of the receiver circuitry 704, 1204, 2382 or 2388. The embodiments are not limited in this context.

In one embodiment, the transceivers 2314, 2318 of the user equipment 2202 may include receiver circuitry 2382, 2388 coupled to processor circuitry. Examples of processor circuitry may include without limitation communications controllers 2316, 2320, host processor 2306, processor circuitry 2390 of the host processor 2306, and other processing devices, circuits or architectures.

In the illustrated embodiment shown in FIG. 23, the receiver circuitry 2382 may be arranged to receive first signals in a first frequency band associated with a first beamwidth 2210. The receiver circuitry 2388 may be arranged to receive second signals in a second frequency band associated with a second beamwidth 2220. The first signals may be received from the base station 2204 and comprise, for example, control information which includes a frame synchronization parameter. The second signals may be received from the base station 2208 and comprise, for example, control information which includes frame alignment signals.

It is worthy to note that although some embodiments are described with the base station 2204, the base station 2208 and the user equipment 2202 exchanging a frame synchronization parameter for frame alignment operations during real-time operations, it may be appreciated that the frame synchronization parameter may be a standardized element in a wireless standard and may be implemented by the communications systems 2240, 2250, the base stations 2204, 2208, and the user equipment 2202 during a design and manufacture stage of each of these elements. Additionally or alternatively, the frame synchronization parameter may be distributed to the communications systems 2240, 2250, the base stations 2204, 2208, and the user equipment 2202 during initialization operations for each of these elements. The embodiments are not limited in this context.

The processor circuitry 2390 may be arranged to activate or deactivate the receiver circuitry 2382, 2388 to receive the frame alignment signals based on the frame synchronization parameter. Once the frame alignment signals are detected, the processor circuitry may activate the receiver circuitry 2388 to receive third signals in the second frequency band, the third signals comprising payload data.

A frame synchronization parameter may be used for timing synchronization between communication frames (or frames) in the communication systems 2240, 2250. A frame synchronization parameter represents a defined time interval, such as a frame synchronization period (or system period), selected so that typical timing scales in both the communication system 2240 (e.g., first frequency band or lower frequency band) and the communication system 2250 (e.g., second frequency band or upper frequency band) are integer multiples or fractions of the selected frame synchronization period.

The control entity 2290 of the core network 2230 may automatically establish an initial frame synchronization parameter for the communication systems 2240, 2250, and dynamically update the frame synchronization parameter in response to changes in operating conditions for the communication systems 2240, 2250 or user instructions (e.g., a system provider or administrator). Alternatively, a user such as a system provider or system administrator may define the frame synchronization parameter, and enter the defined frame synchronization parameter into the control entity 2290 to store, propagate and manage on behalf of the communication systems 2240, 2250. The embodiments are not limited in this context.

Figure 24:
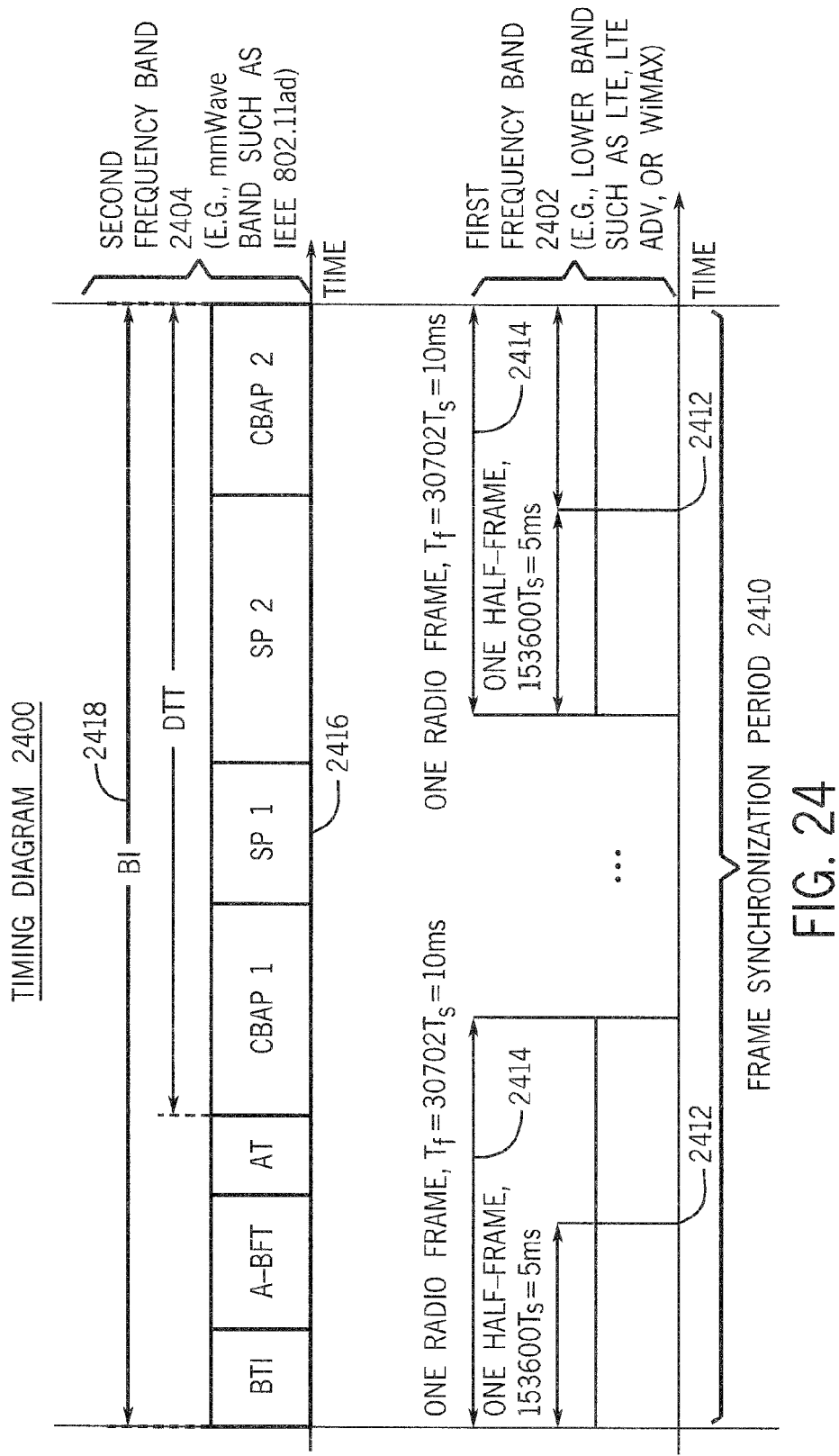
FIG. 24 illustrates a timing diagram with a frame synchronization period common for two different types of wireless communication systems.

FIG. 24 illustrates a timing diagram 2400 with a frame synchronization period 2410 common for two different types of wireless communication systems 2240, 2250. As shown in FIG. 24, one or more communication frames 2412 (e.g., radio frames) may be communicated between the base station 2204 of the communication system 2240 and the user equipment 2202 in a first frequency band 2402. Further, one or more communication frames 2416 (e.g., radio frames) may be communicated between the base station 2208 of the communication system 2250 and the user equipment 2202 in a second frequency band 2404.

Normally, when receiving a stream of framed data, the user equipment 2202 may perform frame synchronization operations. Frame synchronization is the process by which incoming frame alignment signals are identified, permitting the data bits within the frame to be extracted for decoding or retransmission. This process is sometimes referred to as "framing." Frame alignment signals are distinctive bit sequences and/or distinct waveforms used to synchronize a transmission by indicating the end of header information (e.g., control information or control bits) and the start of data (e.g., data information or data bits). In other words, frame alignment signals allow the user equipment 2202 to distinguish control bits from data bits in a stream of framed data. Examples of frame alignment signals may include without limitation a syncword, sync character, preamble, space of a defined length in a frame, self-synchronizing code, framing bit, non-information bit, and so forth. In some cases, frame alignment signals may be sent simultaneously with data bits, such as in OFDM modulation, for example. In such cases, the timing of frame alignment signals with respect to data bits is predefined and may be fixed, which allows indicating the timing of data bits via the frame alignment signals. The embodiments are not limited in this context.

A problem occurs, however, when attempting to perform frame synchronization using multiple communication systems 2240, 2250. One advantage of a dual-mode communication system such as the communication system 2200 is that the first frequency band 2402 of the communication system 2240 may be used for OOB signaling to rapidly acquire and establish a communication channel between the communication system 2250 and the user equipment 2202 over the second frequency band 2404 for high-speed data communications, such as high-definition (HD) video, for example. However, before acquiring second or third signals from the base station 2208 of the communication system 2250, the user equipment 2202 needs to detect frame alignment signals, such as beacons, transmitted in the second frequency band 2404. Since the user equipment 2202 does not have any a priori knowledge of when frame alignment signals are to be transmitted by the base station 2208, the receiver circuitry 2382 (or 2388) needs to continuously scan the second frequency band 2404 in order to detect the frame alignment signals. The extensive scanning operations by the receivers consume significant amounts of power, which is a scarce resource for mobile devices. Furthermore, frames 2412, 2416 of the communication systems 2240, 2250, respectively, are not necessarily aligned. Therefore, the user equipment 2202 cannot use known timing associated with frames 2412 in the first frequency band 2402 to estimate timing associated with frames 2416 in the second frequency band 2404. This problem is further exacerbated in the case where multiple mmWave systems (e.g., multiple communication systems 2250) are used since additional operations are needed to determine which mmWave signals are detected, which consumes even greater amounts of power.

To solve these and other problems, the control entity 2290 may establish and store a frame synchronization period 2410 that may be used to synchronize frames 2412, 2416 transmitted in the frequency bands 2402, 2404, respectively. The control entity 2290 may define, generate, select, or otherwise establish a frame synchronization period 2410. The frame synchronization period 2410 may then be used to set timing scales in both the communication system 2240 (e.g., first frequency band or lower frequency band) and the communication system 2250 (e.g., second frequency band or upper frequency band) that are integer multiples or fractions of the selected frame synchronization period 2410.

The processor circuitry 2390 of the user equipment 2202 may receive first signals from the first communication system 2240 associated with the first beamwidth 2210. The first signals may include a frame synchronization parameter 2410. A frame synchronization parameter 2410 may comprise or represent a reference time interval for the second communication system 2250 associated with the second beamwidth 2220. An example of a reference time interval may comprise a frame synchronization period 2418. In one embodiment, for example, the reference time interval is equally divisible by one or more frames 2412 of the first communication system 2240 associated with the first beamwidth 2210.

In one embodiment, the control entity 2290 may set a frame synchronization period 2410 to a beacon interval 2418 of a mmWave communication system, such as the second communication system 2250, for example. The beacon interval 2418 is a time interval between beacon frames transmissions, and is configurable for various systems. A particular beacon interval 2418 may be selected or configured to be equally divisible by one or more frames 2412 of a cellular communication system, such as the first communication system 2240, for example. For instance, assume the beacon interval 2418 is set to 100 milliseconds (ms) for the second communication system 2250. The 100 ms is equally divisible into 10 radio frames 2412 of the first communication system 2240, where one radio frame $T_f 307200 T_s = 10$ ms, and one half-frame $153600 T_s = 5$ ms. It may be appreciated that other definitions for the frame synchronization period 2410 with respect to different time scales of the protocols in the first frequency band 2402 (e.g., lower band) and the second frequency band 2404 (e.g., upper band) are also possible. The embodiments are not limited in this context.

Figure 25:
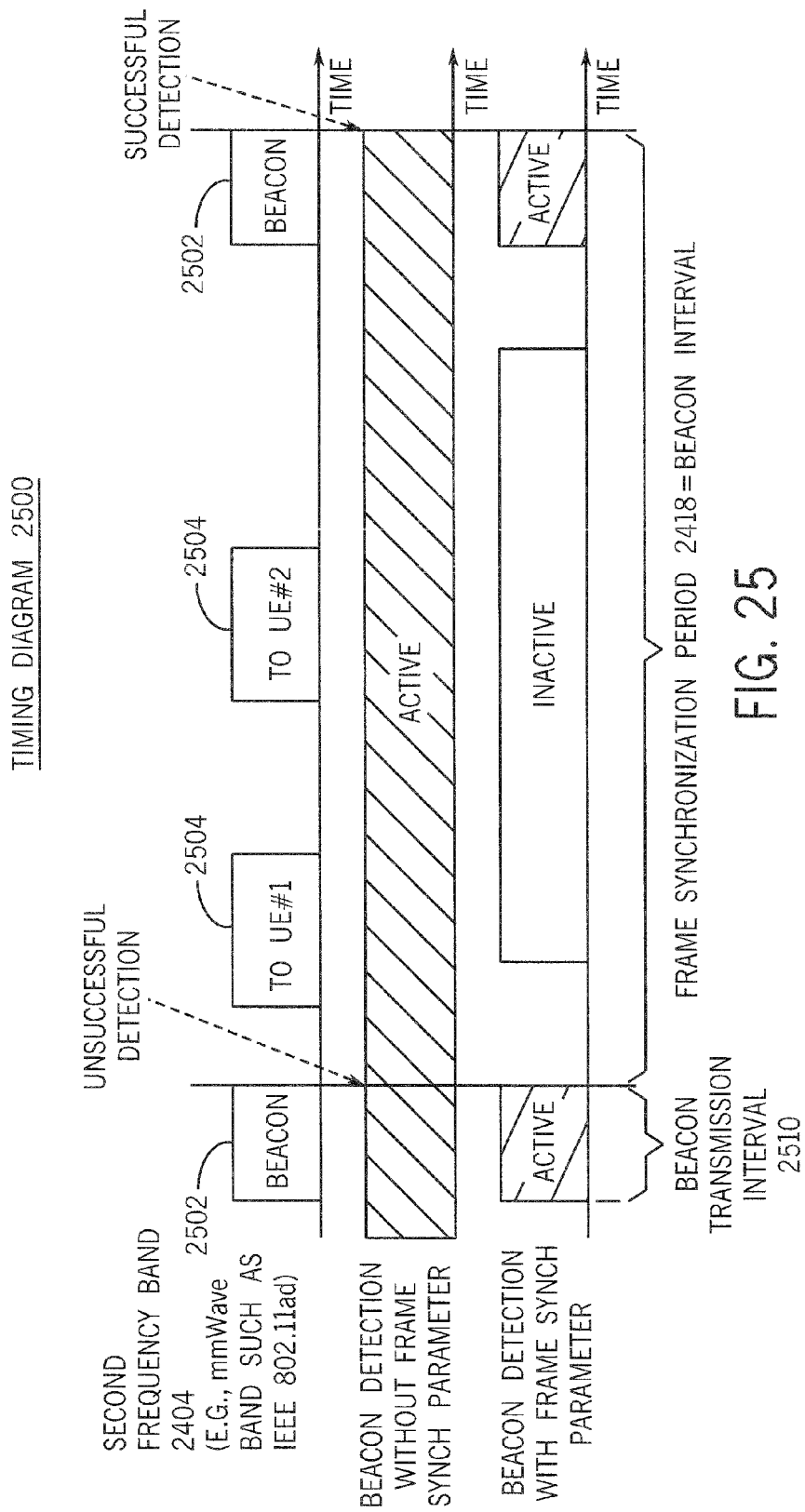
FIG. 25 illustrates a timing diagram to synchronize frames from two different types of wireless communication systems using a frame synchronization period.

FIG. 25 illustrates a timing diagram 2500 to synchronize frames from two different types of wireless communication systems 2240, 2250 using a frame synchronization period 2418. As previously described, the user equipment 2202 may utilize a frame synchronization parameter representing a frame synchronization period 2418 to synchronize frames 2412, 2416 transmitted in the frequency bands 2402, 2404, respectively. As a result, the frames 2412, 2416 transmitted by the communication systems 2240, 2250, respectively, are aligned. As such, the user equipment 2202 can use known timing associated with frames 2412 in the first frequency band 2402 to accurately estimate or predict timing associated with frames 2416 in the second frequency band 2404. To conserve power, the user equipment 2202 may activate or deactivate the receiver circuitry 2388 of the transceiver 2318 of the second radio module 2304 to detect and receive the frame alignment signals as they are scheduled to arrive, thereby reducing power consumption for the user equipment 2202.

The timing diagram 2500 further illustrates this technique. As shown in FIG. 25, the timing diagram illustrates two different types of signals transmitted by the second frequency band 2404. The first type of signal is a beacon 2502. The second type of signal is a payload data 2504 and/or any other signals except beacons. The processor circuitry 2390 of the user equipment 2202 may activate the receiver circuitry 2388 (or 2382) of the transceiver 2318 of the second radio module 2304 to detect and receive the beacons 2502 during a beacon transmission interval 2510. The processor circuitry 2390 may deactivate the receiver circuitry 2388 (or 2382) during a time interval defined by the frame synchronization parameter to conserve power, that is, the beacon interval where no beacons 2502 are transmitted. By way of contrast, conventional solutions would cause the receiver circuitry 2388 (or 2382) to be continuously active to detect and acquire a beacon 2502. In this manner, the user equipment 2202 may utilize power more efficiently, thereby extending battery life for the user equipment 2202.

Figure 26:
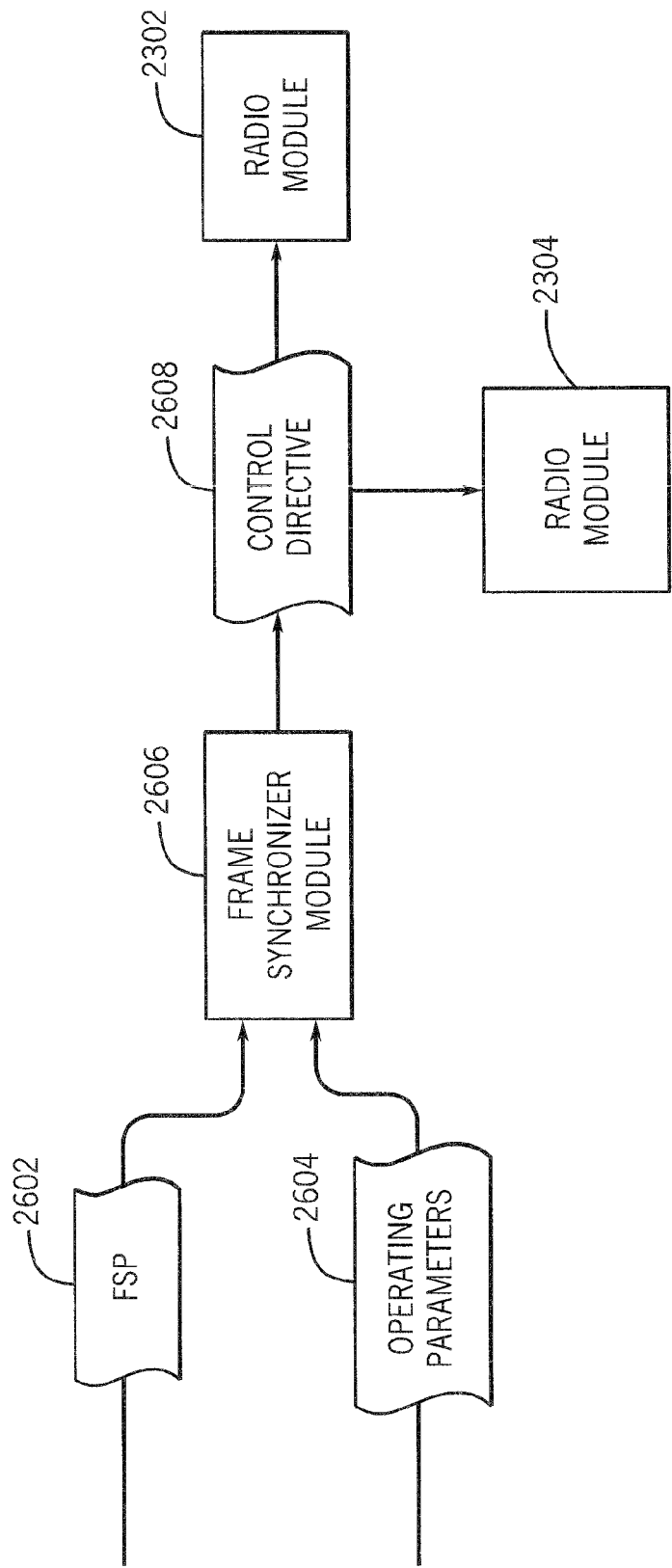
FIG. 26 illustrates an operating environment to detect frame alignment signals using a frame synchronization period.

FIG. 26 illustrates an operating environment 2600 to detect frame alignment signals using a frame synchronization period 2418. In the illustrated embodiment shown in FIG. 26, a frame synchronizer module 2606 may receive as input a frame synchronization parameter 2602 and one or more operating parameters 2604. The operating parameters 2604 may be used to provide information needed by the frame synchronizer module 2606 to begin synchronizing frames 2412, 2416, such as N number of last received frames 2412, a counter value, a timer value, and so forth. The frame synchronizer module 2606 may comprise computer program instructions that when executed by the processor circuitry 2390 causes the frame synchronizer module 2606 to output control directives 2608. The control directives 2608 may be of at least two types, including a first type to activate receiver circuitry 2388 (or 2382) and a second type to deactivate receiver circuitry 2388. Deactivation may include various power states ranging from a fully power state to completely powered down state, such as defined by the Advanced Configuration and Power Interface (ACPI) specification. The ACPI specification provides an open standard for device configuration and power management by an operating system (OS) of the user equipment 2202. The frame synchronizer module 2606 may send the control directives 2608 to the radio modules 2302, 2304, as appropriate.

Figure 27:
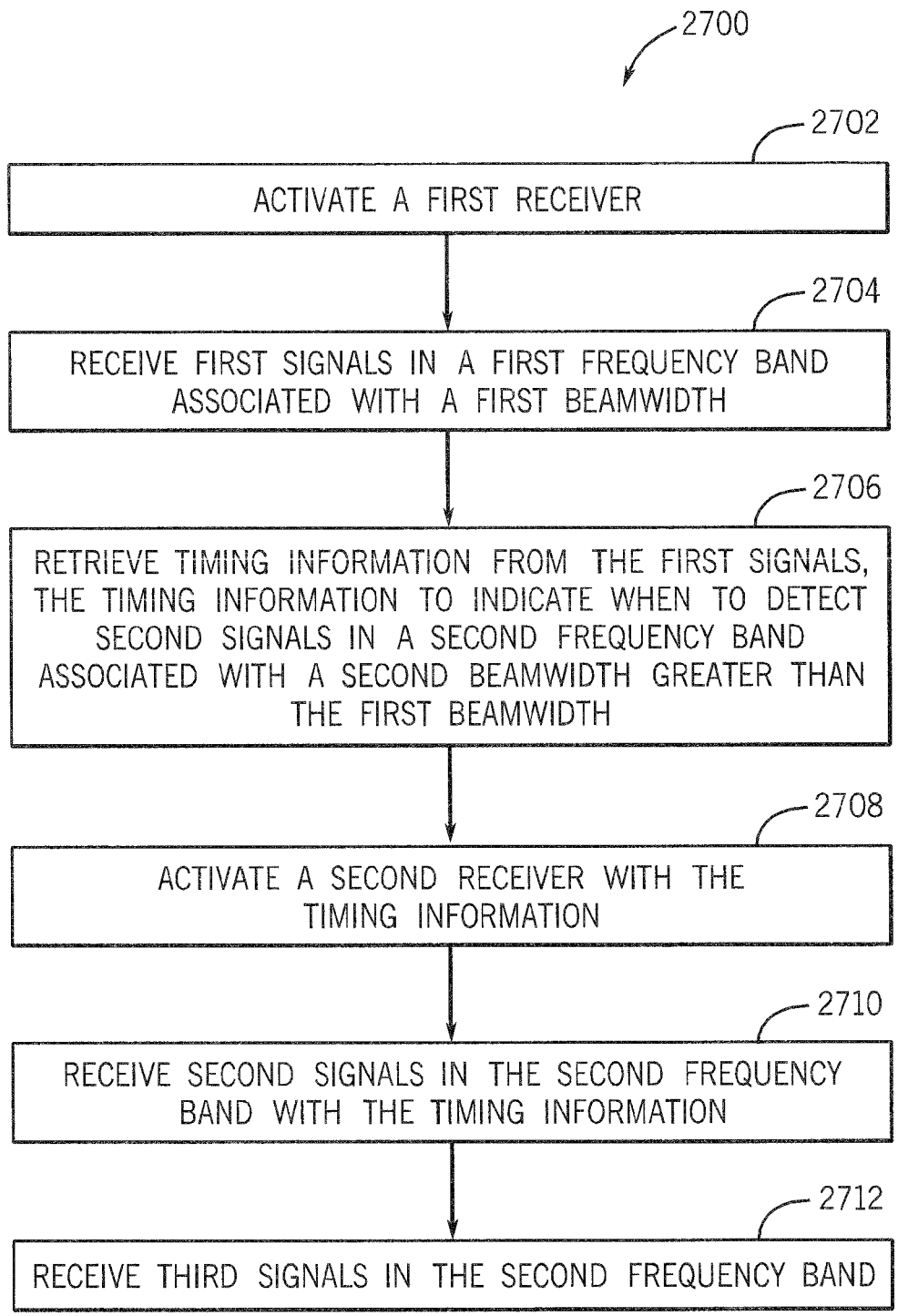
FIG. 27 illustrates a process for controlling a wireless receiver to detect frame alignment signals using a frame synchronization period

FIG. 27 illustrates a process 2700 for controlling a wireless receiver to detect frame alignment signals using a frame synchronization period 2418. The actions/operations described in connection with the process 2700 may be performed, for example, by a user device 2202.

At block 2702, the process 2700 includes activating a first receiver, such as the receiver portion of the transceiver 2314 as described with reference to FIG. 23. For instance, when the user equipment 2202 enters the cell 2212 of the first communication system 2240, it begins to receive control signals from the base station 2204. The user equipment 2202 may activate the receiver circuitry 2382 of the transceiver 2314 of the first radio module 2302 to establish a communication channel between the base station 2204 and the user equipment 2202. At some point, the user equipment 2202 may continue moving within the cell 2212 until it enters the cell 2222 of the second communication system 2250. At this point, the user equipment 2202 is within transmission range of both base stations 2204, 2208.

At block 2704, the process 2700 includes receiving first signals in a first frequency band associated with a first beamwidth. For instance, when the user equipment 2202 enters the cell 2212, it may begin receiving control signals from the base station 2204 over the first frequency band 2402 with information to assist in pre-configuring the user equipment 2202 for establishing a communication channel with the second communication system 2250 using the second frequency band 2404. The information may be used for signal detection, coarse beamforming, CFO estimation, timing synchronization, and other operations useful in acquiring signals from the base station 2208.

At block 2706, the process 2700 includes retrieving timing information from the first signals, the timing information to indicate when to detect second signals in a second frequency band associated with a second beamwidth narrower than the first beamwidth. For instance, the user equipment 2202 may receive first signals in the first frequency band 2402 transmitted using a beamwidth 2210. The first signals in the first frequency band 2402 may be comprised of signals and control information that includes timing information, such as a frame synchronization parameter 2602, to synchronize timing of frames 2412, 2416 of the communication systems 2240, 2250, respectively. The user equipment 2202 may use the first signals to facilitate detection and receipt of second signals in the second frequency band 2402 transmitted using a beamwidth 2220. The second beamwidth 2220 may be narrower than the first beamwidth 2210, thereby providing a potentially higher data rate relative to the wider first beamwidth 2210.

In one embodiment, the frame synchronizer module 2606 may retrieve timing information comprising a frame synchronization parameter 2602 representing a frame synchronization period common to the first communication system 2240 arranged for communicating information over the first frequency band 2402 and the second communication system 2250 arranged for communicating information over the second frequency band 2404. The frame synchronization period 2418 may match a defined interval of the second communication system 2250, such as multiples of a beacon interval of the second communication system 2250, for example. At the same time, the frame synchronization period 2418 may match a defined interval of the first communication system 2240, such as a multiple of a defined interval of the first communication system 2240. In one embodiment, for example, the frame synchronization period 2418 may evenly match one or more frames 2412 (e.g., radio frames) of the first communication system 2240.

At block 2708, the process 2700 includes activating a second receiver, such as the receiver portion of the transceiver 2318 as described with reference to FIG. 23. For instance, the frame synchronizer module 2606 may receive the frame synchronization parameter 2602 as input, and output a control directive 2608 to activate the receiver circuitry 2388 of the transceiver 2318 of the second radio module 2304.

At block 2710, the process 2700 includes receiving second signals in the second frequency band with the timing information. The second signals may be comprised of signals and control information to facilitate signal detection, fine beamforming, CFO estimation, timing synchronization, and other information useful for allowing the user equipment 2202 to rapidly establish a communication channel with the base station 2208 of the second communication system 2250. In one embodiment, for example, the second signals may comprise one or more beacons 2502.

At block 2712, the process 2700 includes receiving third signals in the second frequency band. For instance, once the receiver circuitry 2388 acquires and locks onto a beacon 2502, the receiver circuitry 2388 may begin to receive third signals in the second frequency band 2404. The third signals may comprise the subsequent data or data signals to be communicated (e.g., transmitted and/or received) using the second frequency band 2404, which may include signals for tracking of the beamforming. CFO, timing, and so forth, as well as various types of data including, for example, data relating to video streaming, realtime and/or non-realtime collaboration, video content download, audio and text content download and/or upload, and so forth. Alternatively, the user equipment 2202 may start transmitting its own data via transmitter circuitry 2386 without (or before) receiving the third signals.

In various embodiments, the frame synchronizer module 2606 may utilize the frame synchronization parameter 2602, which represents a frame synchronization period 2410, to synchronize communication frames 2412, 2416 in the frequency bands 2402, 2404, respectively. In one embodiment, the frame synchronizer module 2606 may utilize the frame synchronization parameter 2602 to synchronize with first time boundaries of first communication frames 2412 in the first frequency band 2402 using the frame synchronization period. In one embodiment, the frame synchronizer module 2606 may utilize the frame synchronization parameter 2602 to determine second time boundaries of second communication frames 2416 in the second frequency band 2404 using the first time boundaries of the first communication frames 2412. For instance, since the start time boundary and the end time boundary of the first communication frames 2412 are known, and the start time boundary and the end time boundary of the second communication frames 2416 are a known multiple of the size of the first communication frames 2412, the frame synchronization parameter 2602 may predict or estimate a time when a beacon 2502 has been transmitted in the second frequency band 2404. The frame synchronizer module 2606 may issue a control directive 2608 to activate a receiver of the second radio module 2304 at or just before the estimated time to receive second communication frames 2416 in the second frequency band 2404 at one or more of the second time boundaries. The frame synchronizer module 2606 may issue a control directive 2608 to deactivate the receiver of the second radio module 2304 to conserve power at one or more of the second time boundaries.

Referring again to the control entity 2290, in addition to automatically and dynamically establishing a frame synchronization period 2410 to synchronize frames between the communication systems 2240, 2250, the control entity 2290 may establish different frame alignments signals for different cells 2222. In this manner, the reliability of detection and acquisition in the mmWave band may be further improved by making mmWave preambles specific for each mmWave cell, e.g., by making different mmWave cells use different preambles. The information about the nearest mmWave cell (or set of cells) that user equipment 2202 can potentially associate with is communicated to the user equipment 2202 in the lower band. The user equipment 2202 uses this information to limit the number of hypotheses when detecting preambles of beacon frames thus improving the detection performance and reducing power consumption. This may be especially advantageous during the mmWave network entry or re-entry phase.

Figure 28:
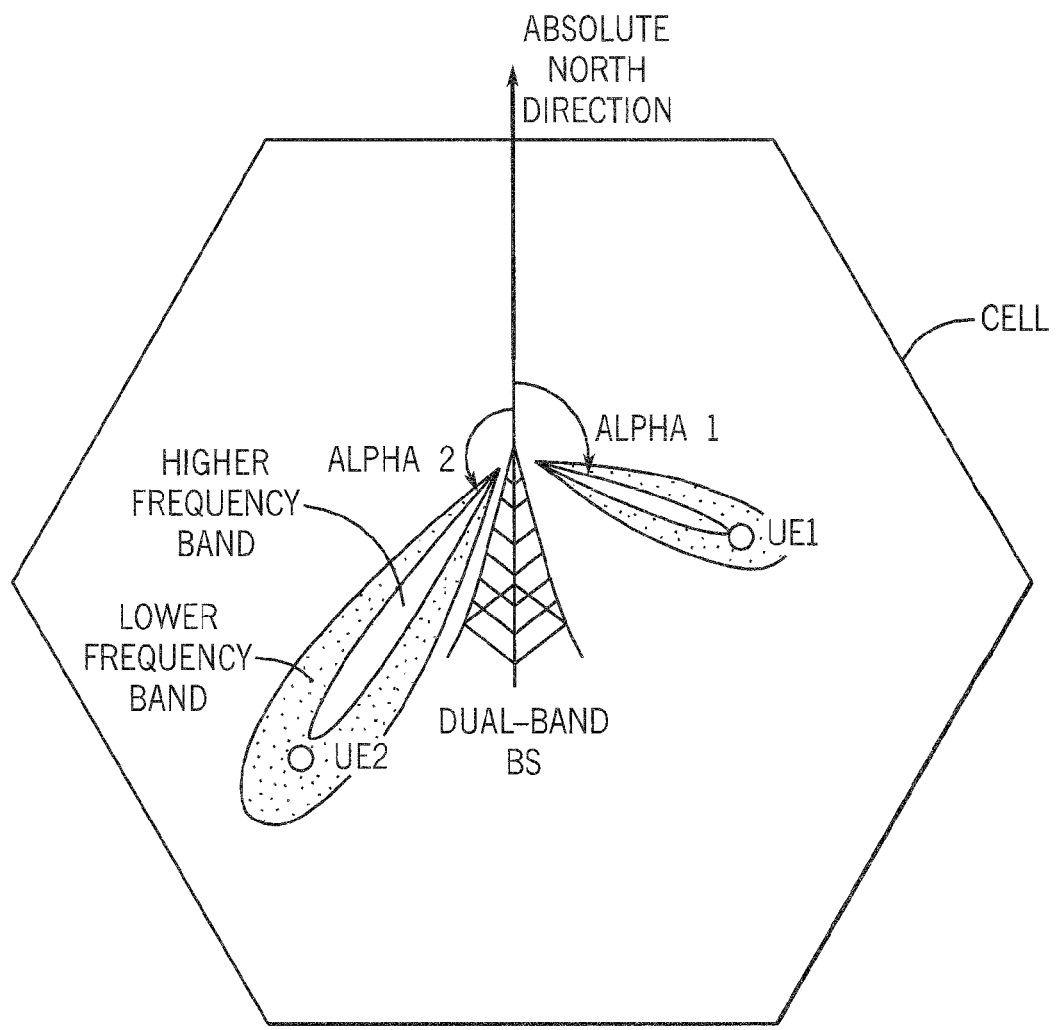
FIG. 28 is a system depiction for one embodiment.

In accordance with some embodiments inter-band beamforming assistance may be provided by the lower frequency band. In some embodiments, the beam forming is first performed in the lower frequency band by the base station and the mobile station. The information about the beams formed in the lower frequency band may then be used to pretune antenna systems of the base station and user equipment in the higher frequency band. In some embodiments the antenna systems of both the lower frequency band and the higher frequency band may be co-located or may be close enough to one another that they can be approximated as co-located transmitters. Thus referring to FIG. 28, the directions from the co-located base station to the user equipment (UE) 1 and 2 from both co-located antenna systems are substantially the same. In FIG. 28, the angle alpha 1 is the direction from absolute north direction to user equipment 1 from the dual band base station and the angle alpha 2 is the angle to the user equipment 2 from absolute north direction relative to the dual band base station.

Initial estimation of beam directions for alpha 1 and alpha 2 in this example may be done in the lower frequency band in some embodiments using training signals which may be preambles or pilot tones or both, to mention some examples.

Due to antenna system sizes, the beam width in the higher frequency band may be less than the beam width in the lower frequency band. Therefore beam direction refinement may be applied in the high frequency band to improve the beam forming accuracy. However, since the course beam direction is already known from the lower band measurements, a beam refinement procedure takes less time and less power than the complete higher frequency band beam search procedure needed in conventional single band systems, in some embodiments.

Beam searching procedures commonly used in the lower band may be also applicable. These may involve a user equipment sending sounding signals so that the base station is able to estimate the beam direction. The procedures may also include the base station sending a series of training signals beam-formed differently and having the user equipment select the best beam forming settings from the series.

After this step, the base station and the user equipment generally know where (or in which direction) the partner station is and steer the beams of the higher frequency band in this direction.

In the case of multi-path propagation in the lower frequency band, the beamforming angle estimation may use a line of sight component for more precise measurements. In the case of non-line of sight environments, the strongest beams may be used for beamforming purposes. In some embodiments, the strongest component beam direction of the non-line of sight channel in the lower frequency band is likely to correspond to the optimal propagation path in the higher frequency band as reflected from the same strongest reflector.

Since, in the lower frequency band, propagation conditions tend to be better because the path loss is less severe, the coverage area in that band is typically higher. Special power adjustment may be used to make the coverage of the base station in the lower frequency band and the higher frequency band substantially equal. For example, such coverage adjustment may be useful for picocells covered by the base station.

Other methods of coverage adjustment for different bands include using antenna systems of different directivity for different bands. In some cases, the higher frequency band of the base station may use more directed antennas with higher gain in the higher frequency band and antennas with wider beams and lower gains in the lower frequency band. With such an approach, the lower frequency band part of the base station may be based on the macrocell, and the higher frequency coverage may be extended to those limits by using highly directional antennas.

Figure 29:
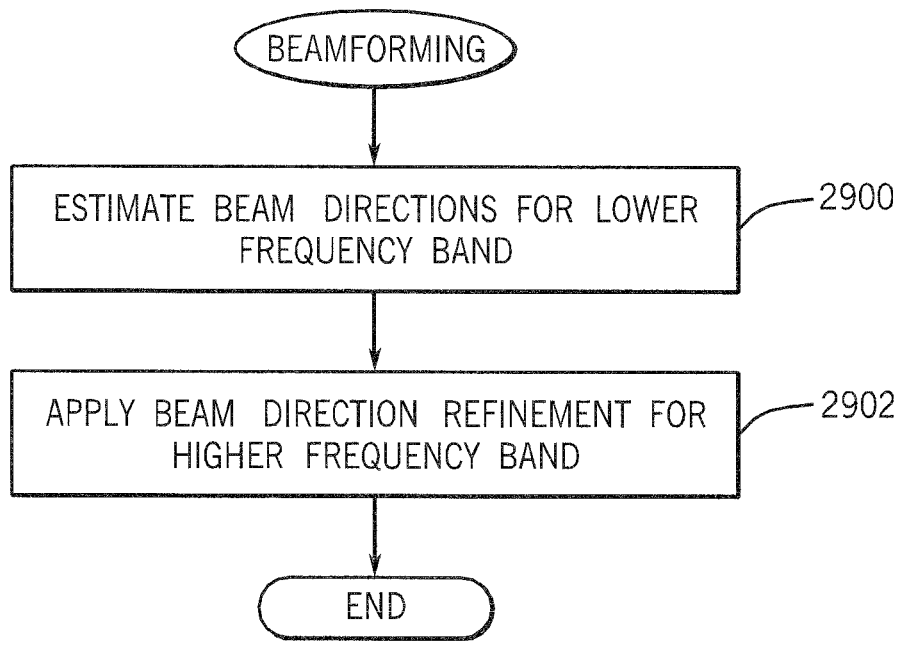
FIG. 29 is a flow chart for one embodiment.
Figure 30:
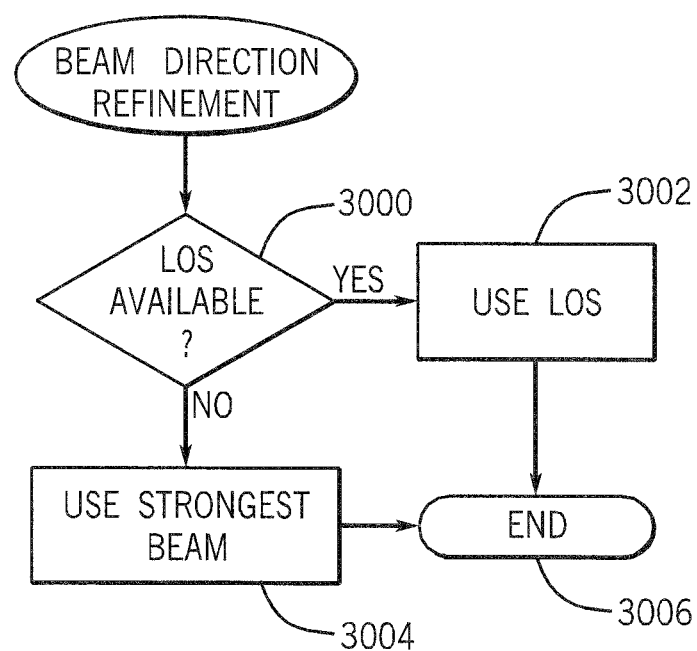
FIG. 30 is a flow chart for another embodiment.

In accordance with some embodiments of the present invention, the sequences of FIGS. 29 and 30 may be implemented in software, firmware and/or hardware. In software and firmware embodiments, they may be implemented by computer executed instructions stored in one or more non-transitory computer readable media such as magnetic, optical or semiconductor storages.

The beamforming sequence of FIG. 29 begins by estimating beam directions for the lower frequency band as indicated in block 2900. Then beam direction refinement is applied for the higher frequency band as indicated in block 2902.

The sequence of FIG. 30 gives a sequence for beam direction refinement. A check at diamond 3000 determines whether a line of sight (LOS) from the base station to the user equipment is available. If so, the line of sight is used as indicated in block 3002. If not, the strongest beam is used as indicated in block 3004.

Figure 31:
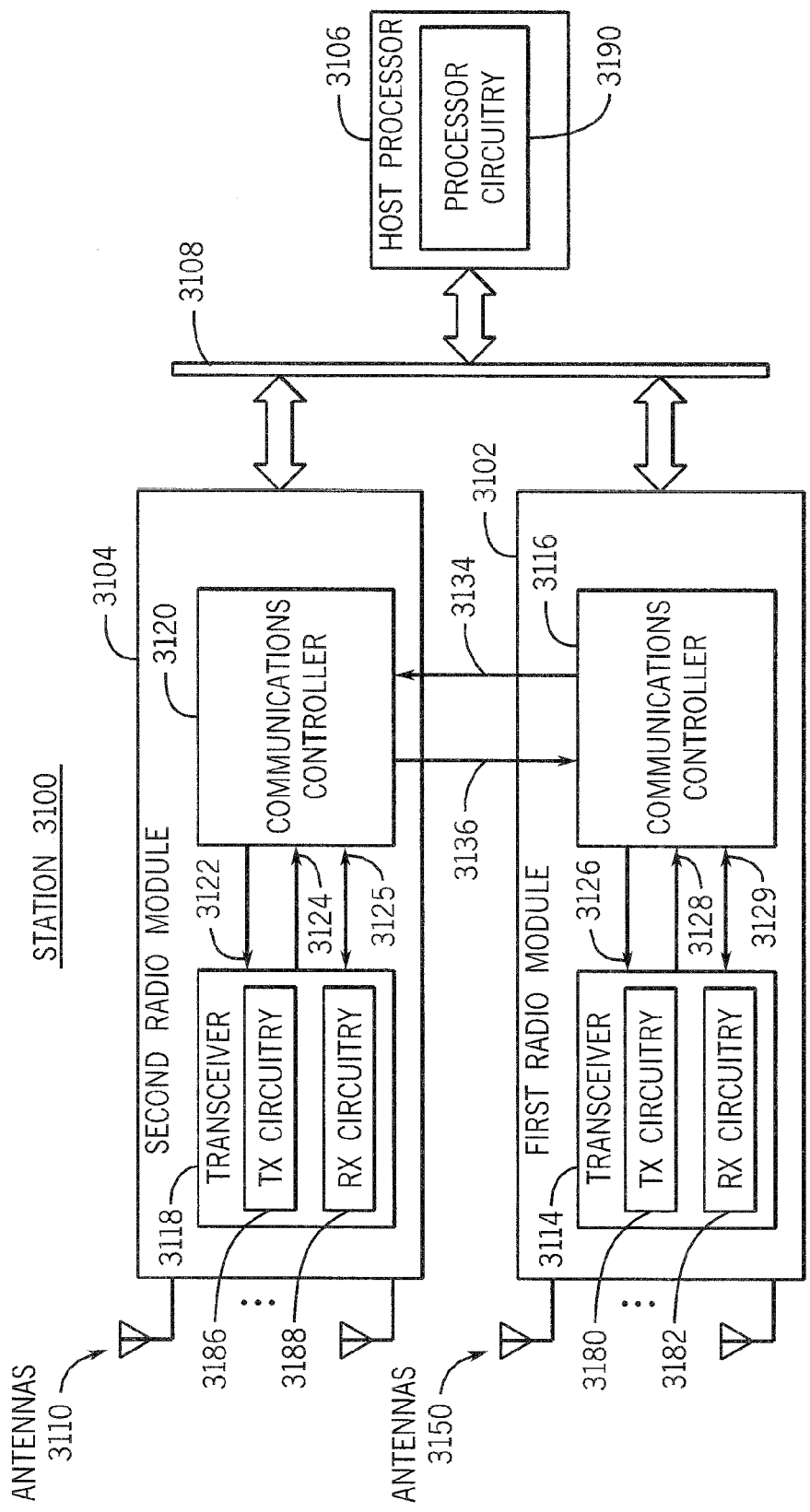
FIG. 31 is a schematic depiction of a station according to one embodiment.

FIG. 31 illustrates an exemplary embodiment of a user equipment and/or a base station 3100 arranged for wireless communication with different types of communication systems, such as communication systems 2240, 2250. In particular, FIG. 31 shows a user equipment and/or base station comprising various elements. The embodiments, however, are not limited to these depicted elements. FIG. 31 shows that user equipment and/or base station may include a first radio module 3102 coupled to a set of one or more antennas 3150, a second radio module 3104 coupled to a set of one or more antennas 3110, a host processor 3106, and an interconnection medium 3108 to couple the host processor 3106 with the first and second radio modules 3102, 3104. These elements may be implemented in hardware, software, firmware, or in any combination thereof.

It may be appreciated that the user equipment and/or base station may include more than two radio modules (and associated elements) as desired for a given implementation. Further, although the user equipment and/or base station illustrates separate sets of antennas 3110, 3150 for each of the first and second radio modules 3102, 3104, respectively, it may be appreciated that the radio modules 3102, 3104 may share one or more antennas from a single antenna array via some form of shared antenna structure. The embodiments are not limited in this context.

First radio module 3102 and second radio module 3104 (and/or additional radio modules) may communicate with remote devices across different types of wireless links. For example, first radio module 3102 and second radio module 3104 may communicate across various data networking links with the base stations or user equipment. In one embodiment, for example, first radio module 3102 is a 3GPP LTE or LTE ADV device and second radio module 3104 is a mmWave device, such as an IEEE 802.11ad device. The embodiments, however, are not limited to these examples.

FIG. 31 shows that first radio module 3102 includes a transceiver 3114 and a communications controller 3116. Transceiver 3114 may transmit and receive wireless signals through one or more antennas 3150. As described above, these signals may be associated with wireless data networks, such as a 3GPP LTE or LTE ADV link. However, the embodiments are not limited to such.

Communications controller 3116 controls the operation of transceiver 3114. For instance, communications controller 3116 may schedule transmission and reception activity for transceiver 3114. Such control and scheduling may be implemented through one or more control directives 3126. Control directive(s) 3126 may be based on operational status information 3128, which communications controller 3116 receives from transceiver 3114. Also, such control directives may be based on status messages and/or commands 3136 received from radio module 3104. The embodiments, however, are not limited to these examples.

Further, communications controller 3116 may perform operations on payload information 3129 that it exchanges with transceiver 3114. Examples of such operations include error correction encoding and decoding, packet encapsulation, various media access control protocol functions, and so forth.

As shown in FIG. 31, second radio module 3104 includes a transceiver 3118 and a communications controller 3120. Transceiver 3118 may also transmit and/or receive wireless signals through one or more antennas 3110. As described above, these signals may also be associated with wireless data networks, such as an IEEE 802.11ad link. However, the embodiments are not limited to such.

Communications controller 3120 controls the operation of transceiver 3118. This may involve scheduling transmission and reception activity for transceiver 3118. Such control and scheduling may be implemented through one or more control directives 3122. Control directive(s) 3122 may be based on operational status information 3124, which communications controller 3120 receives from transceiver 3118. Also, such control directives may be based on status messages and/or commands 3134 received from radio module 3102. The embodiments, however, are not limited to these examples.

Additionally, communications controller 3120 may perform operations on payload information 3125 that it exchanges with transceiver 3118. Examples of such operations include error correction encoding and decoding, packet encapsulation, various media access control protocol functions, and so forth.

In addition to performing the control operations described above, communications controllers 3116, 3120 may provide coordination between radio modules 3102, 3104. This coordination may involve the exchange of information. For instance, FIG. 31 shows that communications controller 3116 may send status messages and/or commands 3134 to controller 3120. Conversely, communications controller 3120 may send status messages and/or commands 3136 to communications controller 3116. These messages may be implemented as signals allocated to various signal lines. In such allocations, each message is a signal. However, further embodiments may alternatively employ data messages. Such data messages may be sent across various connections. Exemplary connections include parallel interfaces, serial interfaces, and bus interfaces. Further, as systems on a chip (SoC) develop, the separate communication controllers 3116, 3120 may in fact be the same piece of silicon or the same core processor. The communication controllers 3116, 3120 may actually be different function calls or software modules operating on the same chip. In that case, the messages may not use different physical connections such as parallel interfaces, serial interfaces, or bus interfaces. When the functions collapse into one chip, these messages may be passed as message queues, shared via stacks, sent via semaphores or flags, and so forth. The embodiments are not limited in this context.

Host processor 3106 may exchange information with radio modules 3102, 3104. As shown in FIG. 31, such exchanges may occur across interconnection medium 2308. For instance, host processor 3106 may send information to these radio modules for wireless transmission. Conversely, radio modules 3102 and 3104 may send information to host processor 3106 that was received in wireless transmissions. In addition, host processor 3106 may exchange information with radio modules 3102 and 3104 regarding their configuration and operation. Examples of such information include control directives sent from host processor 3106 to radio modules 3102, 3104. Host processor may implement the sequences of FIGS. 29 and 30 in some embodiments.

Interconnection medium 3108 provides for couplings among elements, such as first radio module 3102, second radio module 3104, and host processor 3106. Thus, interconnection medium 2308 may include, for example, one or more bus interfaces. Exemplary interfaces include Universal Serial Bus (USB) interfaces, Serial Peripheral Interconnect (SPI) interfaces, Secure Digital Input Output (SDIO) interfaces, as well as various computer system bus interfaces. Additionally or alternatively, interconnection medium 3108 may include one or more point-to-point connections (e.g., parallel interfaces, serial interfaces, etc.) between various element pairings. In some cases, the host processor 3106 may be in the same physical chip as the communication controllers 3116, 3120. The interconnection medium 3108 may therefore be software rather than a physical interface such as USB, SDIO, SPI, bus, parallel, and so forth. As such cases, the interconnection medium 3108 may be implemented as message queues, semaphores, function calls, stack, global variables, pointers, and so forth. The embodiments are not limited in this context.

In various embodiments, the transceivers 3114, 3118 of the user equipment/base station may include transmitter circuitry and/or receiver circuitry, such as transmitter circuitry 3180, 3186 and/or receiver circuitry 3182, 3188 of the transceivers 3114, 3118, respectively. The transmitter circuitry 3180, 3186 and the receiver circuitry 3182, 3188 may be the same or similar to the transmitter circuitry 702, 1202 and the receiver circuitry 704, 1204 as described with reference to circuitry 700, 1200, respectively, in FIGS. 7, 12, respectively. It may be appreciated that references to a specific transmitter circuitry or receiver circuitry may be applicable to other types of transmitter circuitry or receiver circuitry as described herein. For instance, some embodiments for the user equipment may be described with reference to the receiver circuitry 3182 or the receiver circuitry 3188, although other embodiments may use any of the receiver circuitry 704, 1204, 3182 or 3188. The embodiments are not limited in this context.

In one embodiment, the transceivers 3114, 3118 of the user equipment may include receiver circuitry 3182, 3188 coupled to processor circuitry. Examples of processor circuitry may include without limitation communications controllers 3116, 3120, host processor 3106, processor circuitry 3190 of the host processor 3106, and other processing devices, circuits or architectures.

In the illustrated embodiment shown in FIG. 31, the receiver circuitry 3182 may be arranged to receive first signals in a first frequency band associated with a first beamwidth. The receiver circuitry 3188 may be arranged to receive second signals in a second frequency band associated with a second beamwidth. The first signals may be received from the base station and comprise, for example, control information which includes a frame synchronization parameter. The second signals may be received from the base station and comprise, for example, control information which includes frame alignment signals.

It is worthy to note that although some embodiments are described with the base station, the base station and the user equipment exchanging a frame synchronization parameter for frame alignment operations during real-time operations, it may be appreciated that the frame synchronization parameter may be a standardized element in a wireless standard and may be implemented by the communications systems, the base stations, and the user equipment during a design and manufacture stage of each of these elements. Additionally or alternatively, the frame synchronization parameter may be distributed to the communications systems, the base stations, and the user equipment during initialization operations for each of these elements. The embodiments are not limited in this context.

The processor circuitry 3190 may be arranged to activate or deactivate the receiver circuitry 3182, 3188 to receive the frame alignment signals based on the frame synchronization parameter. Once the frame alignment signals are detected, the processor circuitry may activate the receiver circuitry 3188 to receive third signals in the second frequency band, the third signals comprising payload data.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the present disclosure. Those with skill in the art will readily appreciate that embodiments in accordance with the present disclosure may be implemented in a very wide variety of ways. This application is intended to cover any adaptations or variations of the embodiments discussed herein. Therefore, it is manifestly intended that embodiments in accordance with the present disclosure be limited only by the claims and the equivalents thereof.

What is claimed is:

1. A method comprising:
   using a second frequency band for communication;
   using a first frequency band, having a lower frequency than the second frequency band and a wider beam width, for beam forming assistance for the second frequency band;
   using the beam forming assistance from the first frequency band to fine tune the beam for the second frequency band;
   receiving a frame in an initiator in said first frequency band from a remote device; and
   transmitting over the first frequency band, a communication to the remote device to determine the remote device's capability to transmit on said second frequency band;
   repositioning directional transmitters and receivers of said initiator and said remote device; and
   thereafter transmitting a test signal to establish a link between the initiator and the remote device.

2. The method of claim 1 wherein beamforming includes determining one or more beam directions.

3. The method of claim 1 including making the beam width of the second frequency band less than the beam width of the first frequency band.

4. The method of claim 1 including using one or more line of sight components for beamforming in said first frequency band.

5. The method of claim 1 including using one or more strongest beams for beamforming in said first frequency band.

6. The method of claim 1 including using power adjustment to equalize coverage of the first and second frequency bands.

7. The method of claim 1 including using antenna systems of different directivity for different bands.

8. The method of claim 1 including using line of sight, if available and otherwise using strongest beam for beamforming in said first frequency band.

9. The method of claim 1 including using a dual frequency band base station for said first and second frequencies.

10. The method of claim 9 including using millimeter wave frequency for said band.

11. One or more non-transitory computer readable media storing instructions executed by a processor to perform a sequence comprising:
  estimating beam directions for a first frequency band;
  applying beam direction refinement for a second frequency band having a higher frequency than said first frequency band and a narrower beam width;
  using said first frequency band for beam forming assistance for the second frequency band;
  using said beam forming assistance from the first frequency band to fine tune the beam for the second frequency band;
  receiving a frame in an initiator in said first frequency band from a remote device; and
  transmitting over the first frequency band, a communication to the remote device to determine the remote device's capability to transmit on said second frequency band;
  repositioning directional transmitters and receivers of said initiator and said remote device; and
  thereafter transmitting a test signal to establish a link between the initiator and the remote device.

12. The media of claim 11 further storing instructions to perform a sequence including determining one or more beam directions.

13. The media of claim 11 further storing instructions to perform a sequence including making the beam width of the second frequency band less than the beam width of the first frequency band.

14. The media of claim 11 further storing instructions to perform a sequence including using one or more line of sight component for beamforming in said first frequency band.

15. The media of claim 11 further storing instructions to perform a sequence including using one or more strongest beams for beamforming in said first frequency band.

16. The media of claim 11 further storing instructions to perform a sequence including using power adjustment to equalize coverage of the first and second frequency bands.

17. The media of claim 11 further storing instructions to perform a sequence including using antenna systems of different directivity for different bands.

18. The media of claim 11 further storing instructions to perform a sequence including using line of sight, if available and otherwise using strongest beam for beamforming in said first frequency band.

19. The media of claim 11 further storing instructions to use a dual frequency band base station for said first and second frequencies.

20. The media of claim 11 further storing instructions to use a millimeter wave frequency for said band.

21. An apparatus comprising:
  a first transmitter to transmit in a lower frequency band; and
  a second transmitter to transmit in a higher frequency band and narrower beam width for beam forming assistance for the lower frequency band and said second transmitter to obtain beam direction refinement from said first transmitter in a dual band millimeter-wave system using collocated transmitters, said second transmitter to use the assistance from the first transmitter to fine tune the beam for the second transmitter, receive a frame in an second transmitter in said first frequency band from a remote device; and transmit over the first frequency band, a communication to the remote device to determine the remote device's capability to transmit on said second frequency band; reposition directional transmitters and receivers of said second transmitter and said remote device; and thereafter transmit a test signal to establish a link between the initiator and the remote device.

22. The apparatus of claim 21 including a controller to determine one or more beam directions.

23. The apparatus of claim 21 including a controller to make a beam width of the second frequency band less than the beam width of the first frequency band.

24. The apparatus of claim 21 including a controller to use one or more line of sight components for beamforming in said first frequency band.

25. The apparatus of claim 21 including a controller to use one or more strongest beams for beamforming in said first frequency band.

26. The apparatus of claim 21 including a controller to use power adjustment to equalize coverage of the first and second frequency bands.

27. The apparatus of claim 21 including a controller to use antenna systems of different directivity for different bands.

28. The apparatus of claim 21 including a controller to use line of sight, if available and otherwise using strongest beam for beamforming in said first frequency band.

29. The apparatus of claim 21 that is a base station.

30. The apparatus of claim 21 that is a mobile station.

* * * * *